(12) United States Patent
Van Baelen

(10) Patent No.: US 11,387,637 B2
(45) Date of Patent: Jul. 12, 2022

(54) MODULAR HYBRID CLOSURE

(71) Applicant: COMMSCOPE CONNECTIVITY BELGIUM BVBA, Kessel-Lo (BE)

(72) Inventor: David Jan Irma Van Baelen, Winksele (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 0 days.

(21) Appl. No.: 16/857,994

(22) Filed: Apr. 24, 2020

(65) Prior Publication Data

US 2020/0381910 A1   Dec. 3, 2020

Related U.S. Application Data

(63) Continuation of application No. 16/073,471, filed as application No. PCT/EP2017/051908 on Jan. 30, 2017, now Pat. No. 10,637,220.

(Continued)

(51) Int. Cl.
*H02G 3/08* (2006.01)
*G02B 6/44* (2006.01)
(Continued)

(52) U.S. Cl.
CPC ............. *H02G 3/088* (2013.01); *G02B 6/445* (2013.01); *G02B 6/4444* (2013.01);
(Continued)

(58) Field of Classification Search
None
See application file for complete search history.

(56) References Cited

U.S. PATENT DOCUMENTS 4,650,933 A   3/1987   Benda et al.
4,768,961 A   9/1988   Lau
(Continued)

FOREIGN PATENT DOCUMENTS

AU   2008264211 A1   1/2009
CN   203101690 U    7/2013
(Continued)

OTHER PUBLICATIONS

ADC Telecommunications, Inc., "DSX-3 Digital Signal Cross-Connect (DSX3) System Application Guide," Document No. ADCP-80-323, 1st Edition, Issue 2, Dec. 1996, p. 1-10; p. 1-11.

(Continued)

*Primary Examiner* — Xanthia C Cunningham
(74) *Attorney, Agent, or Firm* — Merchant & Gould P.C.

(57) ABSTRACT

A hybrid cable distribution system wherein a feeder cable is received by a box. The feeder cable can be a hybrid cable including optical fibers and copper wire (coax). The box may be used only for copper signal handling (such as coaxial signal handling), and then at a later date, the box may be used for receiving fiber signals. Customers can directly connect to the feeder fan out device by connecting a tail of a drop splice module that is spliced to an individual distribution cable to the feeder fan out device. This connection creates a point-to-point connection. The number of fan out devices in the system can be increased or decreased as needed. Alternatively, a splitter input can be connected to the feeder fan out device, such as through a pigtail extending from the splitter, wherein the splitter splits the signal as desired into a plurality of outputs. The outputs of the splitters can be in the form of connectors or adapters. The connectors or adapters are then connected to tails of drop splice modules that are spliced to individual distribution cables so that customers can receive a split signal. The cable distribution (Continued)

system allows for mixing of connection types to the customer(s) such as a direct connection (point-to-point), or a split signal connection. Further, the types of splitters can be mixed and varied as desired. Further, the types of fan out devices can be mixed and varied as desired.

11 Claims, 48 Drawing Sheets

Related U.S. Application Data

(60) Provisional application No. 62/288,267, filed on Jan. 28, 2016.

(51) Int. Cl.
*H02G 3/16* (2006.01)
*H02G 15/08* (2006.01)
*H02G 15/113* (2006.01)

(52) U.S. Cl.
CPC .......... *G02B 6/4451* (2013.01); *G02B 6/4454* (2013.01); *G02B 6/4472* (2013.01); *H02G 3/083* (2013.01); *H02G 3/086* (2013.01); *H02G 3/16* (2013.01); *H02G 15/085* (2013.01); *H02G 15/113* (2013.01); *G02B 6/4416* (2013.01); *G02B 6/4466* (2013.01); *G02B 6/4477* (2013.01)

(56) References Cited

U.S. PATENT DOCUMENTS

| | | | |
|---|---|---|---|
| 4,770,639 A | 9/1988 | Lau | |
| 4,797,114 A | 1/1989 | Lau | |
| 4,820,200 A | 4/1989 | Lau | |
| 4,840,568 A | 6/1989 | Burroughs et al. | |
| 5,171,183 A * | 12/1992 | Pollard | G06F 1/20 |
| | | | 361/679.31 |
| 5,189,410 A | 2/1993 | Kosugi et al. | |
| 5,199,878 A | 4/1993 | Dewy et al. | |
| 5,214,673 A | 5/1993 | Morgenstern et al. | |
| 5,297,000 A * | 3/1994 | Freige | G06F 1/183 |
| | | | 361/692 |
| 5,317,663 A | 5/1994 | Beard et al. | |
| 5,339,379 A | 8/1994 | Kutsch et al. | |
| 5,363,465 A | 11/1994 | Korkowski et al. | |
| 5,393,249 A | 2/1995 | Morgenstern et al. | |
| 5,432,875 A | 7/1995 | Korkowski et al. | |
| 5,467,062 A | 11/1995 | Burroughs | |
| 5,497,444 A | 3/1996 | Wheeler | |
| 5,582,525 A | 12/1996 | Louwagie et al. | |
| 5,613,030 A | 3/1997 | Hoffer et al. | |
| 5,627,925 A | 5/1997 | Alferness et al. | |
| 5,685,741 A | 11/1997 | Dewey et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,740,298 A | 4/1998 | Macken et al. | |
| 5,768,463 A | 6/1998 | Foss et al. | |
| 5,946,440 A | 8/1999 | Puetz | |
| 6,061,492 A | 5/2000 | Strause et al. | |
| 6,116,961 A | 9/2000 | Henneberger et al. | |
| 6,208,796 B1 | 3/2001 | Williams Vigliaturo | |
| 6,226,111 B1 | 5/2001 | Chang et al. | |
| 6,229,699 B1 * | 5/2001 | Kerrigan | G06F 1/181 |
| | | | 174/138 G |
| 6,263,136 B1 | 7/2001 | Jennings et al. | |
| 6,307,998 B2 | 10/2001 | Williams Vigliaturo | |
| 6,328,608 B1 | 12/2001 | Olson et al. | |
| 6,363,183 B1 | 3/2002 | Koh | |
| 6,370,294 B1 | 4/2002 | Pfeiffer et al. | |
| 6,418,262 B1 | 7/2002 | Puetz et al. | |
| 6,424,781 B1 | 7/2002 | Puetz et al. | |
| 6,427,035 B1 | 7/2002 | Mahony | |
| 6,507,691 B1 | 1/2003 | Hunsinger et al. | |
| 6,511,330 B1 | 1/2003 | Norris | |
| 6,532,332 B2 | 3/2003 | Solheid et al. | |
| 6,535,682 B1 | 3/2003 | Puetz et al. | |
| 6,554,652 B1 | 4/2003 | Musolf et al. | |
| 6,556,738 B2 | 4/2003 | Pfeiffer et al. | |
| 6,556,763 B1 | 4/2003 | Puetz et al. | |
| 6,579,014 B2 | 6/2003 | Melton et al. | |
| 6,591,051 B2 | 7/2003 | Solheid et al. | |
| 6,599,024 B2 | 7/2003 | Zimmel | |
| 6,614,953 B2 | 9/2003 | Strasser et al. | |
| 6,616,459 B2 | 9/2003 | Norris | |
| 6,632,106 B2 | 10/2003 | Musolf et al. | |
| RE38,311 E | 11/2003 | Wheeler | |
| 6,647,197 B1 | 11/2003 | Marrs et al. | |
| 6,668,108 B1 | 12/2003 | Helkey et al. | |
| 6,688,780 B2 | 2/2004 | Duran | |
| 6,719,382 B2 | 4/2004 | Sucharczuk et al. | |
| 6,760,531 B1 | 7/2004 | Solheid et al. | |
| 6,761,594 B2 | 7/2004 | Johnsen et al. | |
| 6,792,191 B1 | 9/2004 | Clapp, Jr. et al. | |
| 6,810,193 B1 | 10/2004 | Mueller | |
| 6,822,874 B1 | 11/2004 | Marler | |
| 6,824,312 B2 | 11/2004 | McClellan et al. | |
| 6,830,465 B2 | 12/2004 | Norris et al. | |
| 6,832,035 B1 | 12/2004 | Daoud et al. | |
| 6,848,952 B2 | 2/2005 | Norris | |
| 6,850,685 B2 | 2/2005 | Tinucci et al. | |
| 6,863,446 B2 | 3/2005 | Ngo | |
| 6,885,798 B2 | 4/2005 | Zimmel | |
| 6,890,187 B2 | 5/2005 | Norris | |
| 6,937,807 B2 | 8/2005 | Franklin et al. | |
| 6,983,095 B2 | 1/2006 | Reagan et al. | |
| 7,029,322 B2 | 4/2006 | Ernst et al. | |
| 7,118,284 B2 | 10/2006 | Nakajima et al. | |
| 7,142,764 B2 | 11/2006 | Allen et al. | |
| 7,149,398 B2 | 12/2006 | Solheid et al. | |
| 7,190,874 B1 | 3/2007 | Barth et al. | |
| 7,194,181 B2 | 3/2007 | Holmberg et al. | |
| 7,218,827 B2 | 5/2007 | Vongseng et al. | |
| 7,218,828 B2 | 5/2007 | Feustel et al. | |
| 7,233,731 B2 | 6/2007 | Solheid et al. | |
| 7,303,220 B2 | 12/2007 | Zellak | |
| 7,310,474 B2 | 12/2007 | Kanasaki et al. | |
| 7,333,606 B1 | 2/2008 | Swam et al. | |
| 7,333,706 B2 | 2/2008 | Parikh et al. | |
| 7,346,254 B2 | 3/2008 | Kramer et al. | |
| 7,376,322 B2 | 5/2008 | Zimmel et al. | |
| 7,376,323 B2 | 5/2008 | Zimmel | |
| 7,400,813 B2 | 7/2008 | Zimmel | |
| 7,418,181 B2 | 8/2008 | Zimmel et al. | |
| 7,418,184 B1 | 8/2008 | Gonzales et al. | |
| 7,453,706 B2 | 11/2008 | Clark et al. | |
| 7,470,068 B2 | 12/2008 | Kahle et al. | |
| 7,495,931 B2 | 2/2009 | Clark et al. | |
| 7,509,016 B2 | 3/2009 | Smith et al. | |
| 7,536,075 B2 | 5/2009 | Zimmel | |
| 7,593,617 B2 | 9/2009 | Klunder et al. | |
| 7,606,459 B2 | 10/2009 | Zimmel et al. | |
| 7,636,507 B2 | 12/2009 | Lu et al. | |
| 7,697,812 B2 | 4/2010 | Parikh et al. | |
| 7,706,656 B2 | 4/2010 | Zimmel | |
| 7,751,673 B2 | 7/2010 | Anderson et al. | |
| 7,760,984 B2 | 7/2010 | Solheid et al. | |
| 7,816,602 B2 | 10/2010 | Landry et al. | |
| 7,835,611 B2 | 11/2010 | Zimmel | |
| 7,853,112 B2 | 12/2010 | Zimmel et al. | |
| 7,885,505 B2 | 2/2011 | Zimmel | |
| 7,912,336 B2 | 3/2011 | Zimmel | |
| 8,019,191 B2 | 9/2011 | Laurisch | |
| 8,023,791 B2 | 9/2011 | Zimmel et al. | |
| 8,086,084 B2 | 12/2011 | Bran de Leon et al. | |
| 8,107,816 B2 | 1/2012 | Bolster et al. | |
| 8,121,457 B2 | 2/2012 | Zimmel et al. | |
| 8,180,192 B2 | 5/2012 | Zimmel | |
| 8,189,983 B2 | 5/2012 | Brunet et al. | |
| 8,297,708 B2 | 10/2012 | Mizobata et al. | |
| 8,331,753 B2 | 12/2012 | Zimmel et al. | |

(56) References Cited

U.S. PATENT DOCUMENTS

| | | | |
|---|---|---|---|
| 8,340,491 B2 | 12/2012 | Zimmel | |
| 8,346,045 B2 | 1/2013 | Zimmel et al. | |
| 8,488,934 B2 | 7/2013 | Zhou et al. | |
| 8,494,329 B2 | 7/2013 | Nhep et al. | |
| 8,520,997 B2 | 8/2013 | Zimmel | |
| 8,542,972 B2 | 9/2013 | Zimmel | |
| 8,547,694 B2 * | 10/2013 | Tang | H05K 7/20727 361/679.5 |
| 8,554,044 B2 | 10/2013 | Bran de Leon et al. | |
| 8,577,198 B2 | 11/2013 | Solheid et al. | |
| 8,634,689 B2 | 1/2014 | Zimmel | |
| 8,660,429 B2 | 2/2014 | Bolster et al. | |
| 8,705,928 B2 | 4/2014 | Zimmel et al. | |
| 8,774,585 B2 | 7/2014 | Kowalczyk et al. | |
| 8,798,428 B2 | 8/2014 | Zimmel et al. | |
| 8,929,708 B2 | 1/2015 | Pimentel et al. | |
| 9,146,371 B2 | 9/2015 | Zimmel | |
| 9,197,346 B2 | 11/2015 | Bolster et al. | |
| 9,213,159 B2 | 12/2015 | Zimmel et al. | |
| 9,239,442 B2 | 1/2016 | Zhang | |
| 9,247,660 B2 * | 1/2016 | Bell | H05K 5/0021 |
| 9,274,285 B2 | 3/2016 | Courchaine et al. | |
| 9,335,504 B2 | 5/2016 | Solheid et al. | |
| 9,417,401 B2 | 8/2016 | Zhang | |
| 9,494,760 B2 | 11/2016 | Simmons et al. | |
| 9,563,017 B2 | 2/2017 | Zimmel et al. | |
| 9,678,292 B2 | 6/2017 | Landry et al. | |
| 9,888,610 B2 * | 2/2018 | Liu | H05K 7/20181 |
| 10,031,305 B2 | 7/2018 | Leeman et al. | |
| 10,058,011 B2 * | 8/2018 | Graczyk | H05K 7/20736 |
| 10,545,305 B2 | 1/2020 | Leeman et al. | |
| 10,606,009 B2 | 3/2020 | Van Baelen et al. | |
| 10,637,220 B2 | 4/2020 | Van Baelen | |
| 10,732,370 B2 | 8/2020 | Van Baelen et al. | |
| 2003/0011287 A1 * | 1/2003 | Searby | G06F 1/20 312/223.2 |
| 2004/0175090 A1 | 9/2004 | Vastmans et al. | |
| 2005/0053341 A1 | 3/2005 | Zimmel | |
| 2005/0129379 A1 | 6/2005 | Reagan et al. | |
| 2005/0232551 A1 | 10/2005 | Chang et al. | |
| 2005/0232565 A1 | 10/2005 | Heggestad et al. | |
| 2006/0008231 A1 | 1/2006 | Reagan et al. | |
| 2006/0228086 A1 | 10/2006 | Holmberg et al. | |
| 2007/0036503 A1 | 2/2007 | Solheid et al. | |
| 2007/0147765 A1 | 6/2007 | Gniadek et al. | |
| 2007/0165995 A1 | 7/2007 | Reagan et al. | |
| 2007/0189691 A1 | 8/2007 | Barth et al. | |
| 2007/0189692 A1 | 8/2007 | Zimmel et al. | |
| 2008/0031585 A1 | 2/2008 | Solheid et al. | |
| 2008/0079341 A1 | 4/2008 | Anderson et al. | |
| 2008/0124038 A1 | 5/2008 | Kowalczyk et al. | |
| 2008/0170824 A1 | 7/2008 | Hendrickson et al. | |
| 2008/0175550 A1 | 7/2008 | Coburn et al. | |
| 2009/0002941 A1 * | 1/2009 | Mongia | H05K 5/0217 361/690 |
| 2009/0022468 A1 | 1/2009 | Zimmel | |
| 2009/0060440 A1 | 3/2009 | Wright et al. | |
| 2009/0067802 A1 | 3/2009 | Hoehne et al. | |
| 2009/0103879 A1 | 4/2009 | Tang et al. | |
| 2009/0110359 A1 | 4/2009 | Smith et al. | |
| 2009/0263097 A1 | 10/2009 | Solheid et al. | |
| 2009/0290842 A1 | 11/2009 | Bran de Leon et al. | |
| 2009/0317047 A1 | 12/2009 | Smith et al. | |
| 2009/0324187 A1 | 12/2009 | Wakileh et al. | |
| 2010/0061043 A1 * | 3/2010 | Hsieh | F16M 13/00 361/679.01 |
| 2010/0129030 A1 | 5/2010 | Giraud et al. | |
| 2010/0183274 A1 * | 7/2010 | Brunet | G02B 6/4455 385/135 |
| 2010/0226654 A1 | 9/2010 | Smith et al. | |
| 2010/0310221 A1 | 12/2010 | Le Dissez | |
| 2010/0322580 A1 | 12/2010 | Beamon et al. | |
| 2010/0329623 A1 | 12/2010 | Smith et al. | |
| 2010/0329624 A1 | 12/2010 | Zhou et al. | |
| 2011/0013875 A1 | 1/2011 | Bran de Leon et al. | |
| 2011/0026894 A1 | 2/2011 | Rudenick et al. | |
| 2011/0058785 A1 | 3/2011 | Solheid et al. | |
| 2011/0091170 A1 | 4/2011 | Bran de Leon et al. | |
| 2011/0164853 A1 | 7/2011 | Corbille et al. | |
| 2011/0211799 A1 | 9/2011 | Conner et al. | |
| 2011/0262095 A1 | 10/2011 | Fabrykowski et al. | |
| 2011/0274403 A1 | 11/2011 | LeBlanc et al. | |
| 2011/0293235 A1 | 12/2011 | Nieves et al. | |
| 2012/0027355 A1 | 2/2012 | LeBlanc et al. | |
| 2013/0056090 A1 * | 3/2013 | Tang | H05K 7/20181 137/215 |
| 2013/0114930 A1 | 5/2013 | Smith et al. | |
| 2013/0114937 A1 | 5/2013 | Zimmel et al. | |
| 2013/0170810 A1 | 7/2013 | Badar et al. | |
| 2013/0188966 A1 | 7/2013 | Wu et al. | |
| 2013/0231041 A1 * | 9/2013 | Li | G06F 1/20 454/318 |
| 2013/0243386 A1 | 9/2013 | Pimentel et al. | |
| 2014/0219622 A1 | 8/2014 | Coan et al. | |
| 2014/0334790 A1 * | 11/2014 | Zhang | G02B 6/3897 385/134 |
| 2015/0003008 A1 * | 1/2015 | Larsen | G06F 1/206 361/679.46 |
| 2015/0036279 A1 * | 2/2015 | Erdman | G06F 1/1632 361/679.31 |
| 2015/0062805 A1 * | 3/2015 | Katsumata | F28D 15/0275 361/679.49 |
| 2015/0110442 A1 | 4/2015 | Zimmel et al. | |
| 2015/0137461 A1 | 5/2015 | Coenegracht et al. | |
| 2015/0156914 A1 * | 6/2015 | Kwak | H01L 23/473 361/689 |
| 2015/0241654 A1 | 8/2015 | Allen et al. | |
| 2015/0286023 A1 | 10/2015 | Van Baelen et al. | |
| 2015/0301301 A1 | 10/2015 | Mullaney | |
| 2015/0355428 A1 | 12/2015 | Leeman et al. | |
| 2016/0095259 A1 * | 3/2016 | Campbell | H05K 7/20181 165/138 |
| 2016/0227670 A1 * | 8/2016 | Liu | H05K 7/20181 |
| 2016/0370551 A1 | 12/2016 | Hill et al. | |
| 2017/0097486 A1 | 4/2017 | Barrantes et al. | |
| 2017/0123175 A1 * | 5/2017 | Van Baelen | G02B 6/445 |
| 2017/0153407 A1 | 6/2017 | Van Baelen et al. | |
| 2019/0022568 A1 * | 1/2019 | Chernansky | B01D 46/0005 |
| 2019/0056559 A1 | 2/2019 | Leeman et al. | |
| 2020/0183116 A1 | 6/2020 | Leeman et al. | |

FOREIGN PATENT DOCUMENTS

| | | |
|---|---|---|
| CN | 103238095 A | 8/2013 |
| DE | 41 30 706 A1 | 3/1993 |
| DE | 42 29 510 A1 | 3/1994 |
| DE | 202 01 170 U1 | 5/2002 |
| DE | 103 50 954 A1 | 5/2005 |
| DE | 10 2009 008 068 A1 | 8/2010 |
| EP | 0 730 177 A2 | 9/1996 |
| EP | 0 828 536 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 626 300 A1 | 2/2006 |
| EP | 2 434 317 A1 | 3/2012 |
| GB | 2 300 978 A | 11/1996 |
| JP | 2007-121398 A | 5/2007 |
| JP | 2010-122597 A | 6/2010 |
| WO | 96/36896 | 11/1996 |
| WO | 00/07053 A | 2/2000 |
| WO | 00/75706 A2 | 12/2000 |
| WO | 02/099528 A1 | 12/2002 |
| WO | 02/103429 A2 | 12/2002 |
| WO | 03/093889 A1 | 11/2003 |
| WO | 2005/045487 A2 | 5/2005 |
| WO | 2006/127397 A1 | 11/2006 |
| WO | 2010/040256 A1 | 4/2010 |
| WO | 2010/134157 A1 | 11/2010 |
| WO | 2012/074688 A2 | 6/2012 |
| WO | 2012/112344 A1 | 8/2012 |

(56) References Cited

FOREIGN PATENT DOCUMENTS

| WO | 2013/117598 A1 | 8/2013 | |
|---|---|---|---|
| WO | 2015/193384 A2 | 12/2015 | |
| WO | WO-2015193384 A2 * | 12/2015 | ........... G02B 6/3897 |
| WO | 2016/066780 A1 | 5/2016 | |

OTHER PUBLICATIONS

ADC Telecommunications, Inc., "DSX-1 Digital Signal Cross Connect PIX-DSX-1—Fifth Edition," dated Oct. 1994, 36 Pages.

ADC Telecommunications, Inc., "DSX-3 Digital Signal Cross-Connect, Front and Rear Cross-Connect Products, 2nd Edition," Doc. No. 274, dated Oct. 2004, 65 pages.

ADC Telecommunications, Inc., OmniReach FTTP Solutions, Doc. No. 1276550, dated May 2004, 12 pages.

ADC Telecommunications, Inc., "PxPlus™ DS1 Digital Signal Cross-Connect," dated Jan. 1997, 12 pages.

AFLGlobal: "LGX Optical Coupler Modules" May 17, 2012 XP002744968 retrieved from the Internet: URL.https://web.archive.org/web/20120517022939/http://www.aflglobal.com/Products/Fiber-Inside-Plant/Couplers-Splitters/Optical-Coupler-Modules.aspx.

International Search Report and Written Opinion for Application No. PCT/EP2013/077292 dated May 28, 2014.

International Search Report and Written Opinion for Application No. PCT/EP2015/063620 dated Feb. 5, 2016.

International Search Report and Written Opinion for Application No. PCT/EP2016/079513 dated Mar. 3, 2017.

International Search Report and Written Opinion of the International Searching Authority for International Patent Application No. PCT/EP2017/051908 dated Jul. 18, 2017, 19 pages.

\* cited by examiner

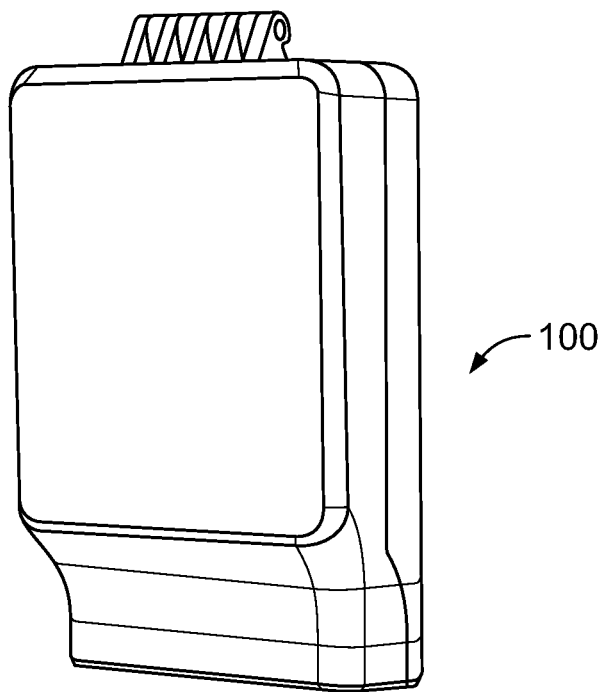
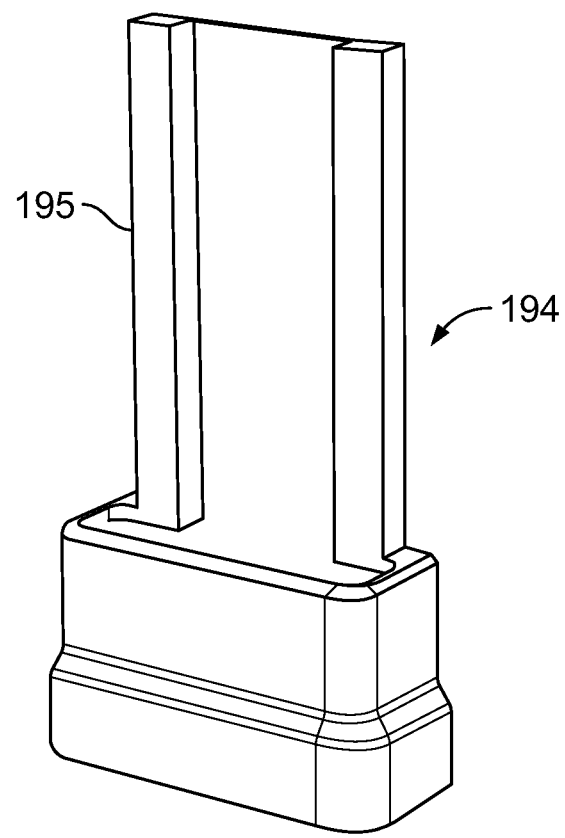
FIG. 48

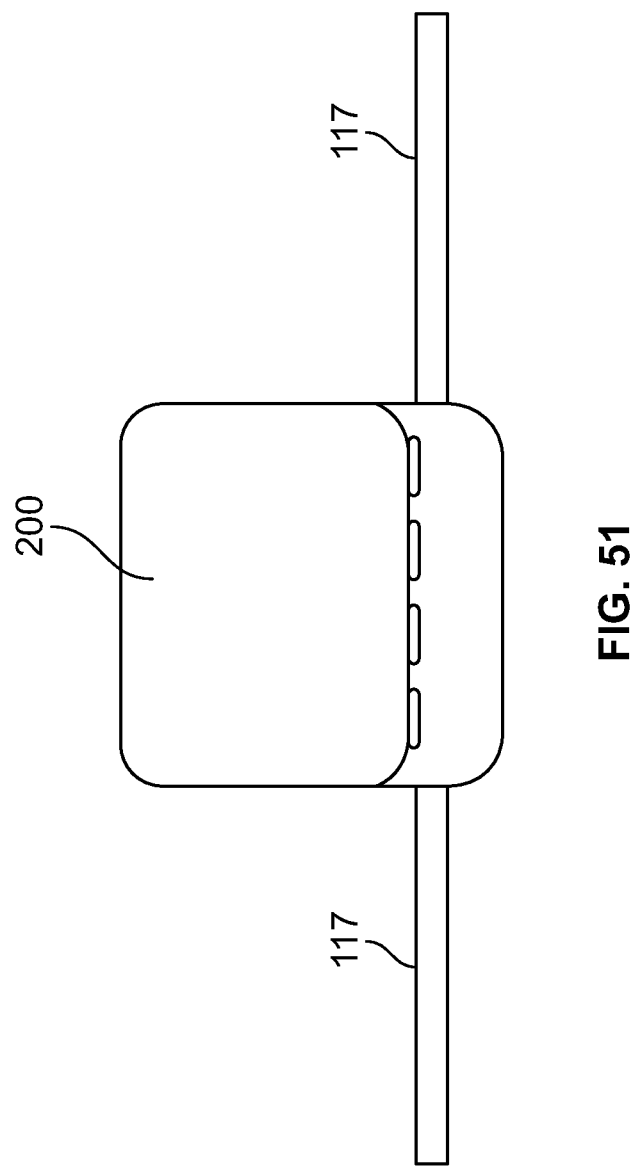

MODULAR HYBRID CLOSURE

CROSS-REFERENCE TO RELATED APPLICATION

This application is a Continuation of U.S. patent application Ser. No. 16/073,471, filed on Jul. 27, 2018, now U.S. Pat. No. 10,637,220, which is a National Stage Application of PCT/EP2017/051908, filed on Jan. 30, 2017, which claims the benefit of U.S. Patent Application Ser. No. 62/288,267, filed on Jan. 28, 2016, the disclosures of which are incorporated herein by reference in their entireties. To the extent appropriate, a claim of priority is made to each of the above disclosed applications.

BACKGROUND

As demand for telecommunications increases, networks are being extended in more and more areas. In facilities such as single family homes, multiple dwelling units (MDU's), apartments, condominiums, businesses, etc., boxes are used to provide subscriber access points to a telecommunications network. Cables are also used to interconnect the subscriber access points provided by boxes with subscribers at subscriber locations (e.g., at each residence).

Various boxes for telecommunications equipment are known. The boxes used for subscriber access points can have various forms depending on such factors as the environment, the space requirements for containing telecommunications equipment, and the type of technician access needed for the telecommunications equipment. These and other considerations are related to box design and usability. There is a continued need for improvement in box designs.

SUMMARY

A hybrid cable distribution system is provided wherein a feeder cable is received by a box. The feeder cable can be a hybrid cable including optical fibers and copper wire (coax). In one example, in accordance with the present disclosure, the box may be used only for copper signal handling (such as coaxial signal handling), and then at a later date, the box may be used for receiving fiber signals.

The box can include a copper-splitter mounted to the outside for splitting a coaxial signal. Inside the box, fibers from the feeder cable are spliced to a feeder fan out device. Customers can directly connect to the feeder fan out device by connecting a tail of a drop splice module that is spliced to an individual distribution cable to the feeder fan out device. This connection creates a point-to-point connection. The number of fan out devices in the system can be increased or decreased as needed. Alternatively, a splitter input can be connected to the feeder fan out device, such as through a pigtail extending from the splitter, wherein the splitter splits the signal as desired into a plurality of outputs. The outputs of the splitters can be in the form of connectors or adapters. The connectors or adapters are then connected to tails of drop splice modules that are spliced to individual distribution cables so that customers can receive a split signal.

The cable distribution system allows for mixing of connection types to the customer(s) such as a direct connection (point-to-point), or a split signal connection. Further, the types of splitters can be mixed and varied as desired, such as 1:4, 1:8, 1:16, etc., or other. Further, the types of fan out devices can be mixed and varied as desired, such as fan out devices having 8, 16, outputs, etc., or other. Other combinations are possible.

The fan out devices and splitters can be stored within the box in a vertical or horizontal stacking arrangement. In such an arrangement, the fan out devices and splitters can be stacked on top of one another, or next to one another, in an internal tray. The tray can be secured to a base of a box. The tray is also configured to hold a plurality drop splice modules and a plurality of splice trays for splicing a feeder cable.

The fan out devices, splitters, and drop splice modules can be stored in an environmental resistant box. For example, the box can have a lid and a base including a seal therebetween. Further, the box can include a gel seal to provide a watertight seal for all cables entering and exiting the box. In some embodiments, the box is rated at IP54 and in other embodiments, the box is rated at IP68.

The inputs and outputs of the splitters and fan out devices can be in the form of connectors or adapters mounted at or within the device housings, or connectors or adapters on the ends of stubs extending from the housings. The stubs (semi-rigid) can improve density and improve connector and/or adapter access through movement of the stubs. Preferably, the stubs are not so flexible that the stubs become easily tangled up with each other.

The connectors and adapters utilized in the cable distribution system can be any desired connection type, such as SC type or LC type. MPO types may also be used. Ferruleless connections may also be used.

Growing capacity may occur where the customer wants more splitters and point-to-point (double density) at the same location. Therefore, the number of fan out devices and splitters can be increased. Alternatively, additional boxes can be interconnected to the initially installed box; a ruggedized fan-out stub of a second box can be spliced to the feeder cable of the initially installed box and routed to the new box, and the new box can be installed similar to the first box. Depending on the feeder cable, more boxes or cabinets can be connected. In another example, growing capacity can occur where the customer wants a second box at a nearby location, such as a somewhere else in the neighborhood.

In one aspect of the present disclosure, a telecommunications enclosure is disclosed. The telecommunications enclosure includes an outer shell that has a first half and a second half. The telecommunications enclosure includes a tray positioned within at least one of the first and second halves of the outer shell. The tray includes a first storage location for receiving at least one splice module. The splice module is connectable to a feeder cable. The tray includes a second storage location for receiving a plurality of fan out modules and/or a plurality of splitter modules. The tray includes a fourth storage location for receiving at least one drop splice module. The at least one drop splice module is connectable to a distribution cable.

In another aspect of the present disclosure, a telecommunications system is disclosed. A telecommunications system includes a first enclosure that has at least one splice module spliced to a feeder cable. The telecommunications system includes a second enclosure that has at least one fan out device. The at least one splice module of the first enclosure has an output connected to the at least one fan out device of the second enclosure.

In another aspect of the present disclosure, a telecommunications enclosure is disclosed. The telecommunications enclosure includes an outer shell that has a first half and a second half. The telecommunications enclosure includes a tray that is positioned within at least one of the first and second halves of the outer shell. The tray includes at least one splice module. The splice module is connected to a feeder cable. The tray includes at least one fan out module connected to the at least one splice module. The tray includes at least one splitter module connected to an output of the at least one fan out module. The tray includes at least one drop splice module. The at least one drop splice module is connected to a distribution cable and is connectable to an output of the splitter module or to an output of the at least one fan out module to provide a point-to-point connection or a split output.

In another aspect of the present disclosure, a telecommunications enclosure is disclosed. The telecommunications enclosure includes an outer shell that has a first half and a second half. The telecommunications enclosure includes a tray that is positioned within at least one of the first and second halves of the outer shell. The tray includes at least one splice module. The splice module is connected to a feeder cable. The tray includes at least one fan out module connected to the at least one splice module. The tray includes at least one drop splice module. The at least one drop splice module is connected to a distribution cable and is connectable to an output of the at least one fan out module to provide a point-to-point connection.

In another aspect of the present disclosure, a telecommunication drop splice cassette is disclosed. The telecommunication drop splice cassette includes an input pig-tail attached to a main body. The telecommunication drop splice cassette includes a splice area that is disposed on the main body and a cable fixation area that is configured for connecting to a distribution cable.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

FIG. 16 shows how each component within the box interacts with one another.

FIG. 19 shows the box configured for eight customers and sealed with a gel seal; FIG. 20 shows the box configured for eight customers and sealed with a gel seal; FIG. 21 shows the box configured for sixteen customers and sealed with a gel seal; FIG. 22 shows the box configured for sixteen customers and does not include a gel seal.

FIG. 23 shows the box configured for eight customers and does not include a gel seal; FIG. 24 shows the box configured for eight customers and does not include a gel seal; FIG. 25 shows the box configured for sixteen customers and does not include a gel seal.

FIG. 35 shows a 1:4 splitter; FIG. 36 shows 2×1:4, 1×1:8, and 1×1:16 splitters.

FIGS. 47-50 show the box mounted on a pedestal; in FIG. 49 cable slack can be stored under the pedestal.

FIG. 51 shows a box according to another embodiment of the present disclosure.

DETAILED DESCRIPTION

Figure 1:
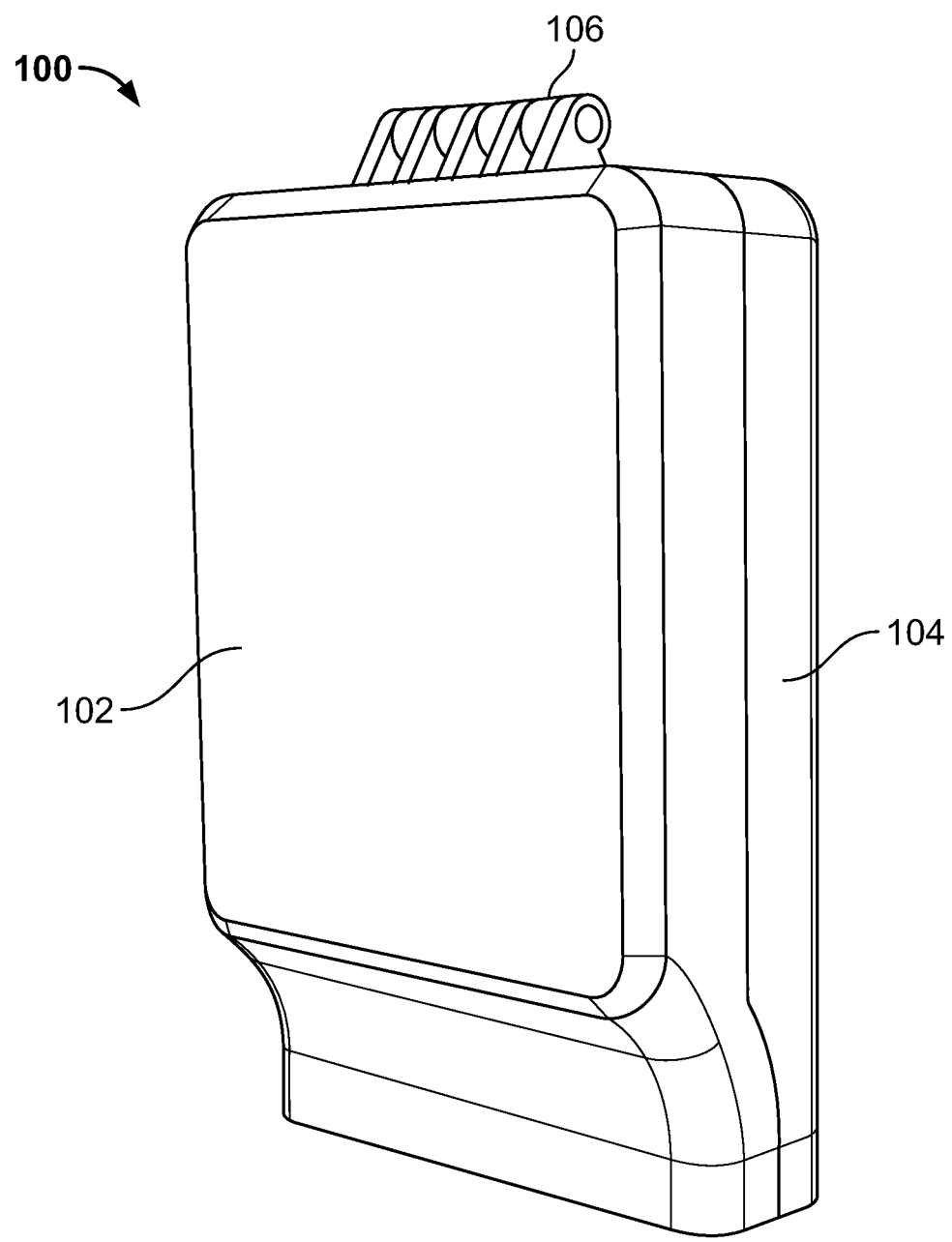
FIGS. 1-2 show an example telecommunications box in accordance with aspects of the present disclosure, in a closed position.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIGS. 1-51, a distribution box 100 is shown. Various embodiments of the box 100 are described and shown in the Figures, including an enclosure structure including a base, a cover, and a coax signal splitter for splitting a coaxial signal. The box is configured for use in a variety of different environments. For example, the box can be mounted to a pole outside, on a wall inside or outside, on a pedestal mount, underground within a manhole, or within a cabinet. In the depicted embodiments, a single box can be configured to serve up to thirty-two customers.

Further, the box is configured for use in an environment where it is perceived that a migration from copper wire transmission to fiber optic transmission is imminent. For example, during the initial install, the network may be purely copper wire transmission (coaxial), then transition to a coax/fiber (hybrid) network, and, finally, to a fully fiber optic network.

Figure 2:
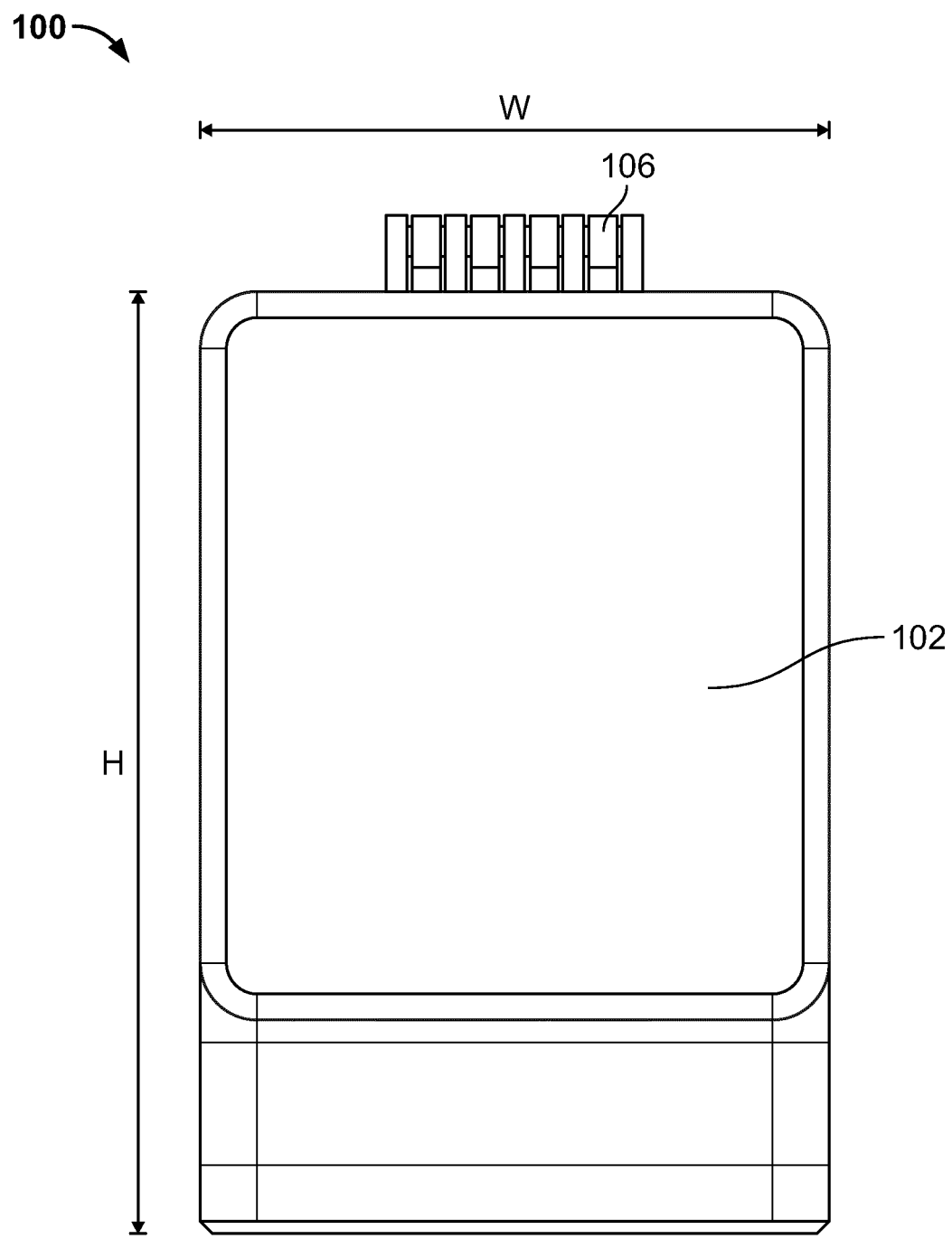

FIGS. 1 and 2 show the box 100 closed. The box 100 is shown having a cover 102 and a base 104. In the depicted embodiments, the cover is attached via a hinge 106 to the base 104. The box 100 is configured for use indoors and outdoors. In some embodiments, a seal (not shown) exists between the cover 102 and the base 104 allowing the box to be IP54 rated. The box 100 can have a width W of about 24 centimeters, a height H of about 35 centimeters, and a depth of about 13 centimeters.

Figure 3:
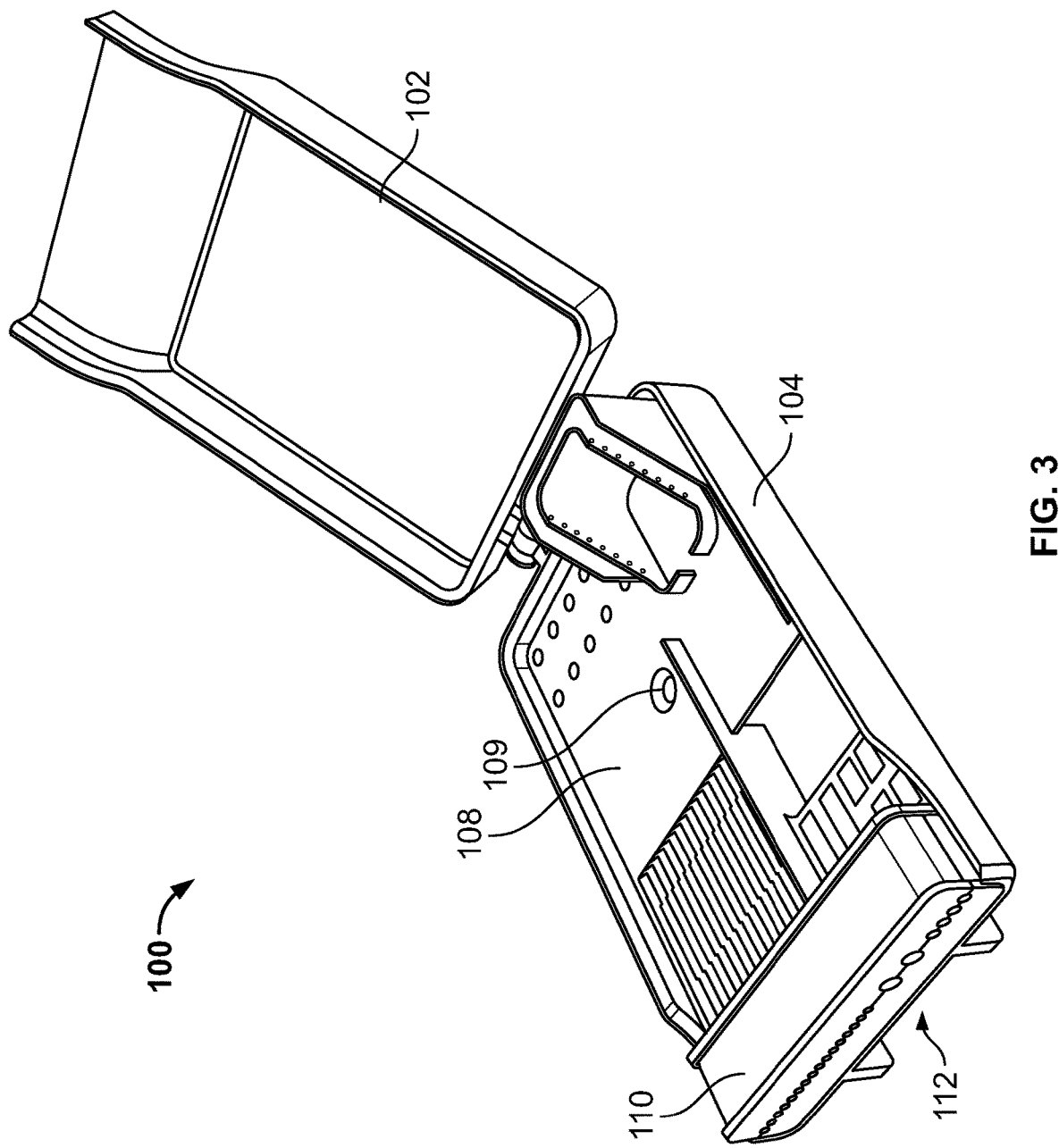
FIGS. 3-5 show the box opened, with a cover positioned away from a base for access to an interior of the box.
Figure 4:
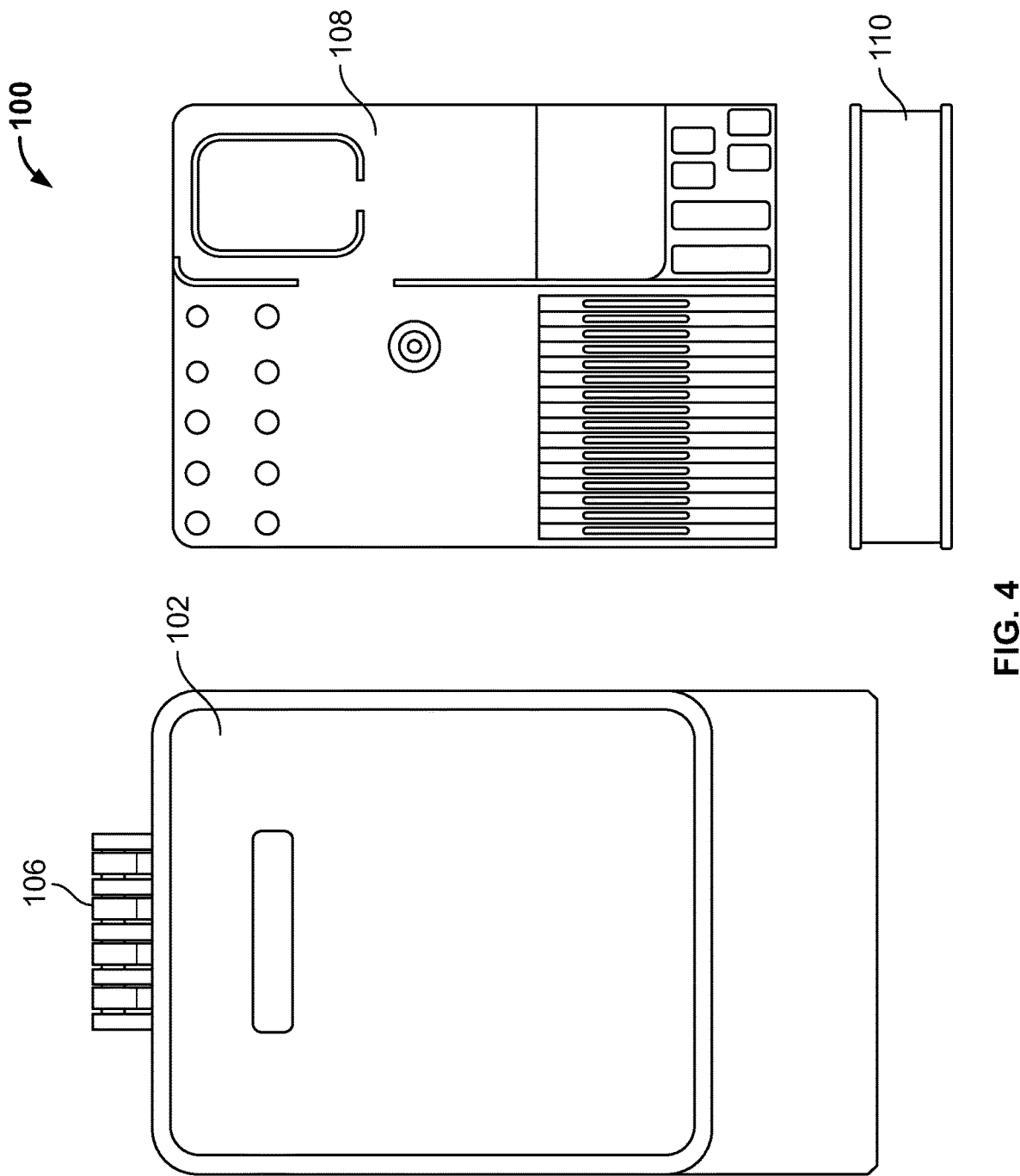
Figure 5:
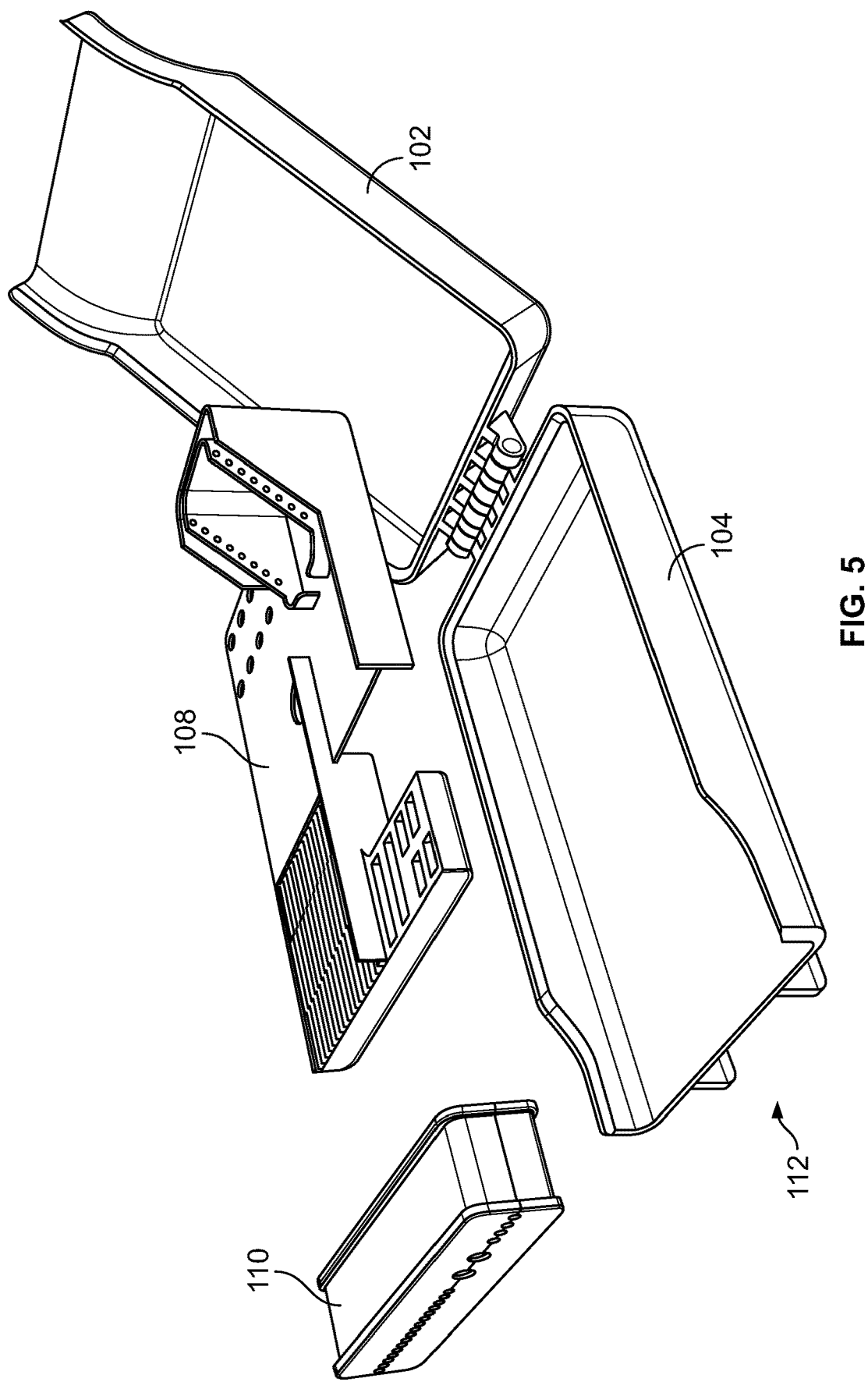

FIGS. 3-5 shows the box 100 opened, with the cover 102 positioned away from the base 104 for access to the interior of the box 100. Inside the box 100 is a tray 108 for positioning telecommunications equipment. In some embodiments, the tray 108 can be secured to the base 104 by a central screw 109.

Further, a gel seal 110 can be used at an entry 112 of the box 100 for environmentally sealing the interior of the box 100. Depending on the mounting location of the box 100, the gel seal may or may not be included in the box. For example, if installed on a wall indoors, the gel seal 110 may not be installed with the box 100. In some embodiments, the gel seal 110 can be combined with another material such as an elastomer. When a gel seal is used, the box 100, when closed, may be IP68 rated.

The gel of the gel seal 110 can be a soft gel or a generally hard gel. The gel of the gel seal 110 may comprise, for example, silicone gel, urea gel, urethane gel, thermoplastic gel, or any suitable gel or geloid sealing material. Gels are normally substantially incompressible when placed under a compressive force and normally flow and conform to their surroundings, thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments, and/or fungicides. In certain embodiments, sealing members in accordance with the principles of the present disclosure have ultimate elongations greater than 100 percent with substantially elastic deformation to an elongation of at least 100 percent.

Figure 6:
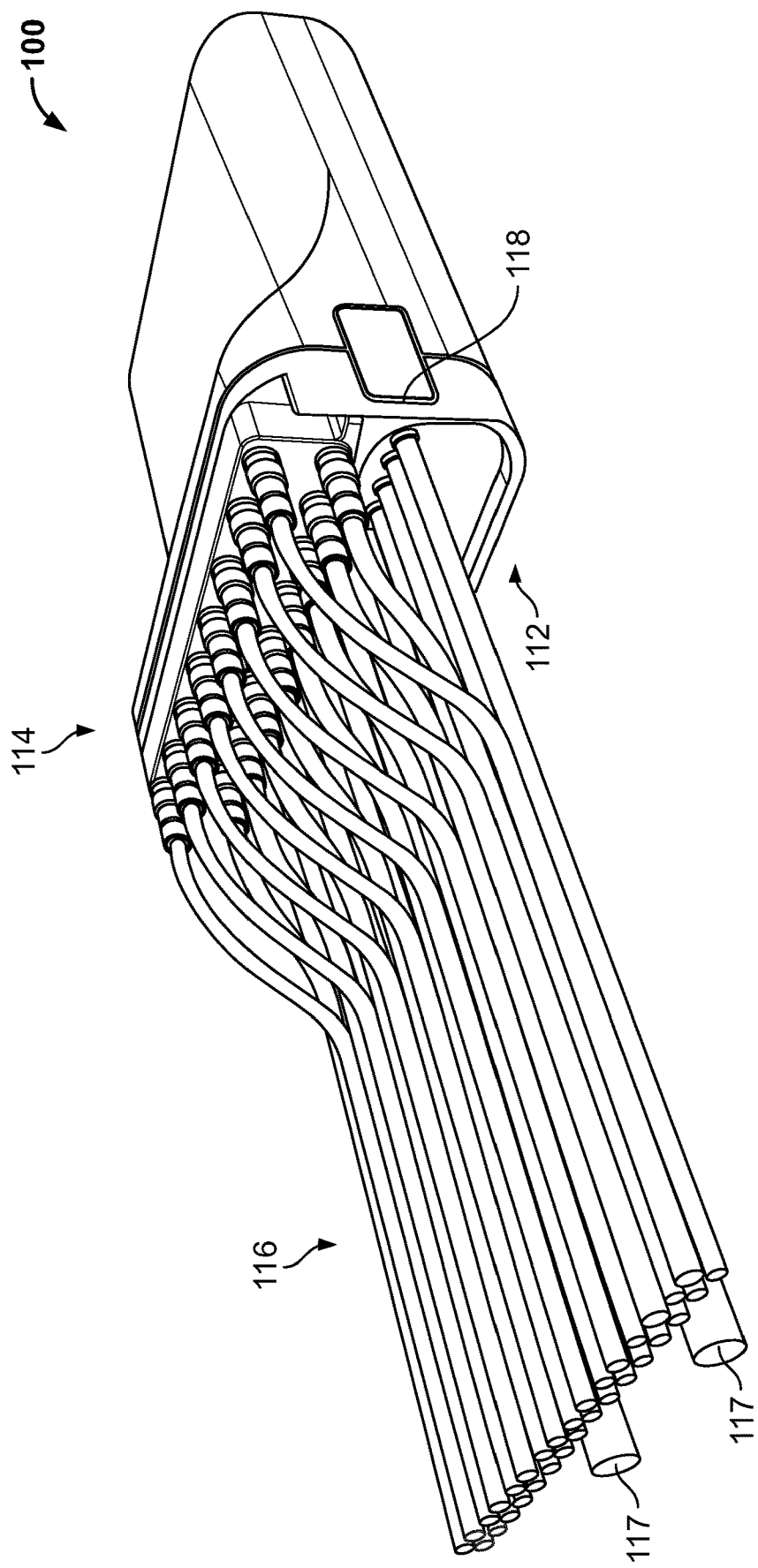
FIG. 6 shows a coax splitter mounted at a bottom of the box and a plurality of distribution cables.
Figure 7:
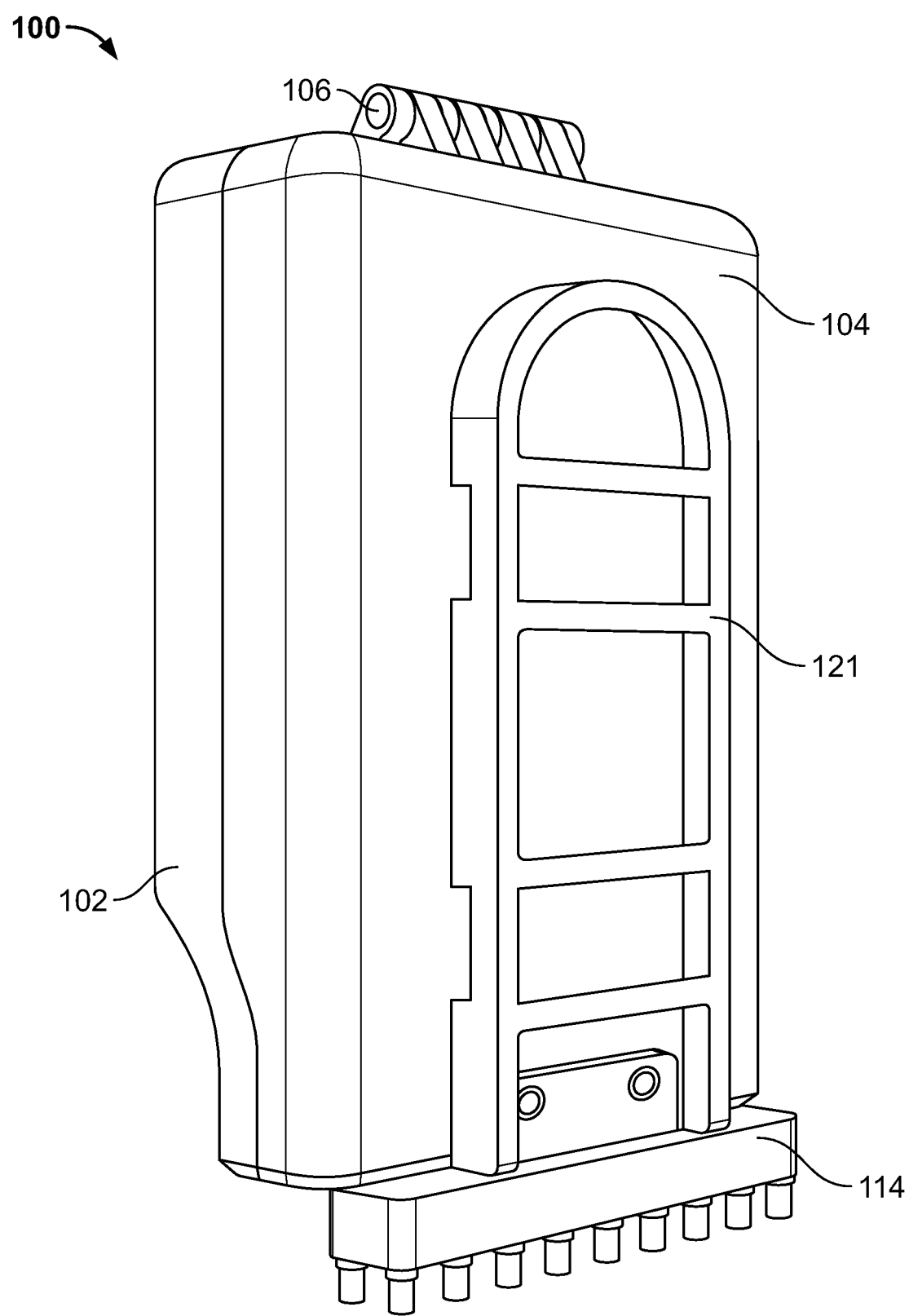
FIGS. 7-8 show the box including mounting features on the outside of the box, and the coax splitter mounted to the base of the box so as not to block fiber access to the box and to allow the cover to freely open.

FIGS. 6-7 show the box 100 with a coax splitter 114 and a plurality of distribution cables 116. As shown, each distribution cable 116 enters the box 100 at the entry 112 and is also connected to the coax splitter 114. In some embodiments, the entry 112 can be at the bottom of the box 100, and in other embodiments, the entry can be on a different side of the box 100. Further, a pair of feeder cables 117 is also shown entering the box 100 at an entry 112. As shown in FIG. 7, the box 100 includes mounting features 121 on the outside of the box 100. The mounting features 121 can be used to secure the box 100 to a wall, pole, or other mounting surface. For example, straps can be glided through the mounting features 121 to mount the box 100 to a pole.

Figure 8:
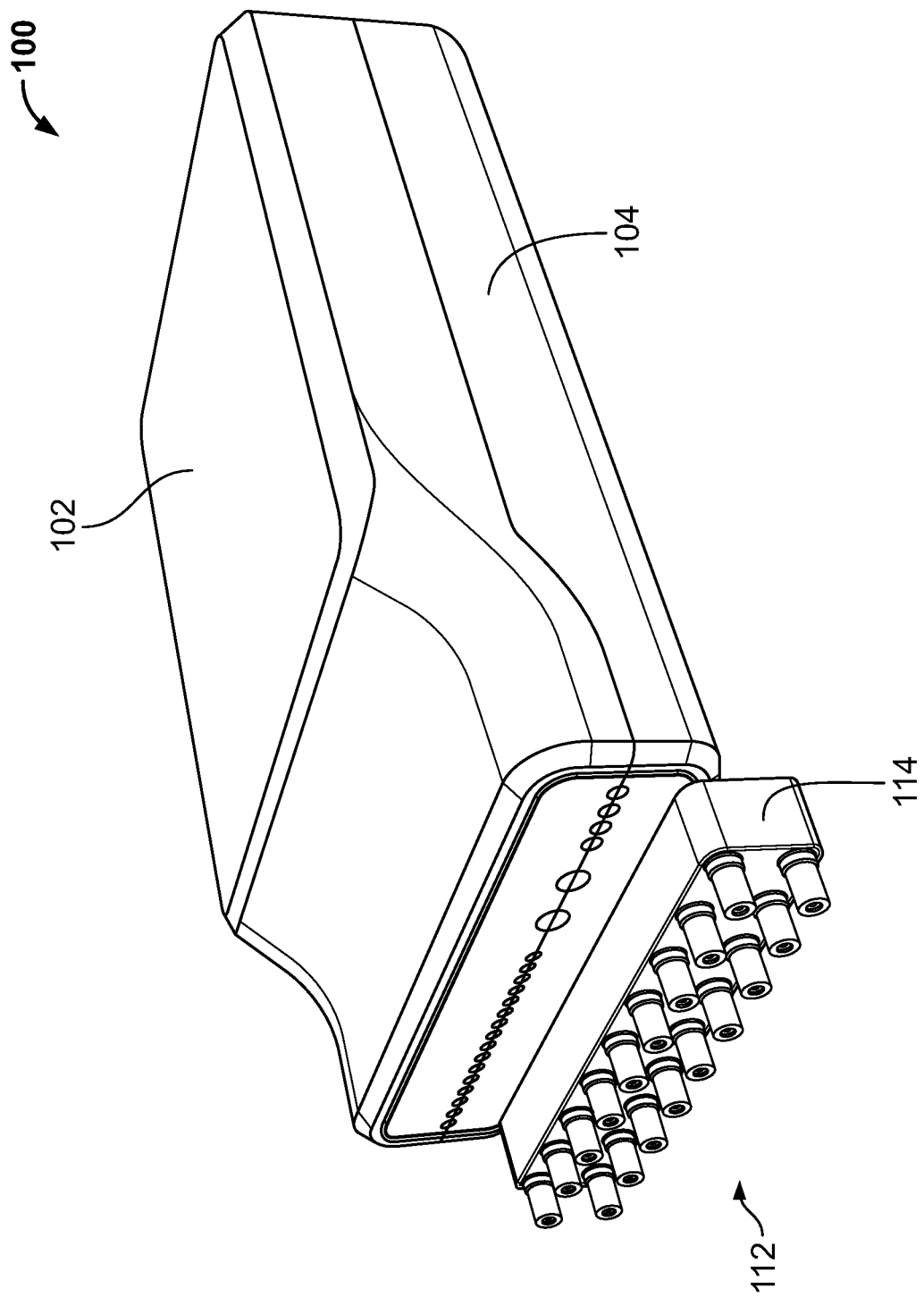
Figure 9:
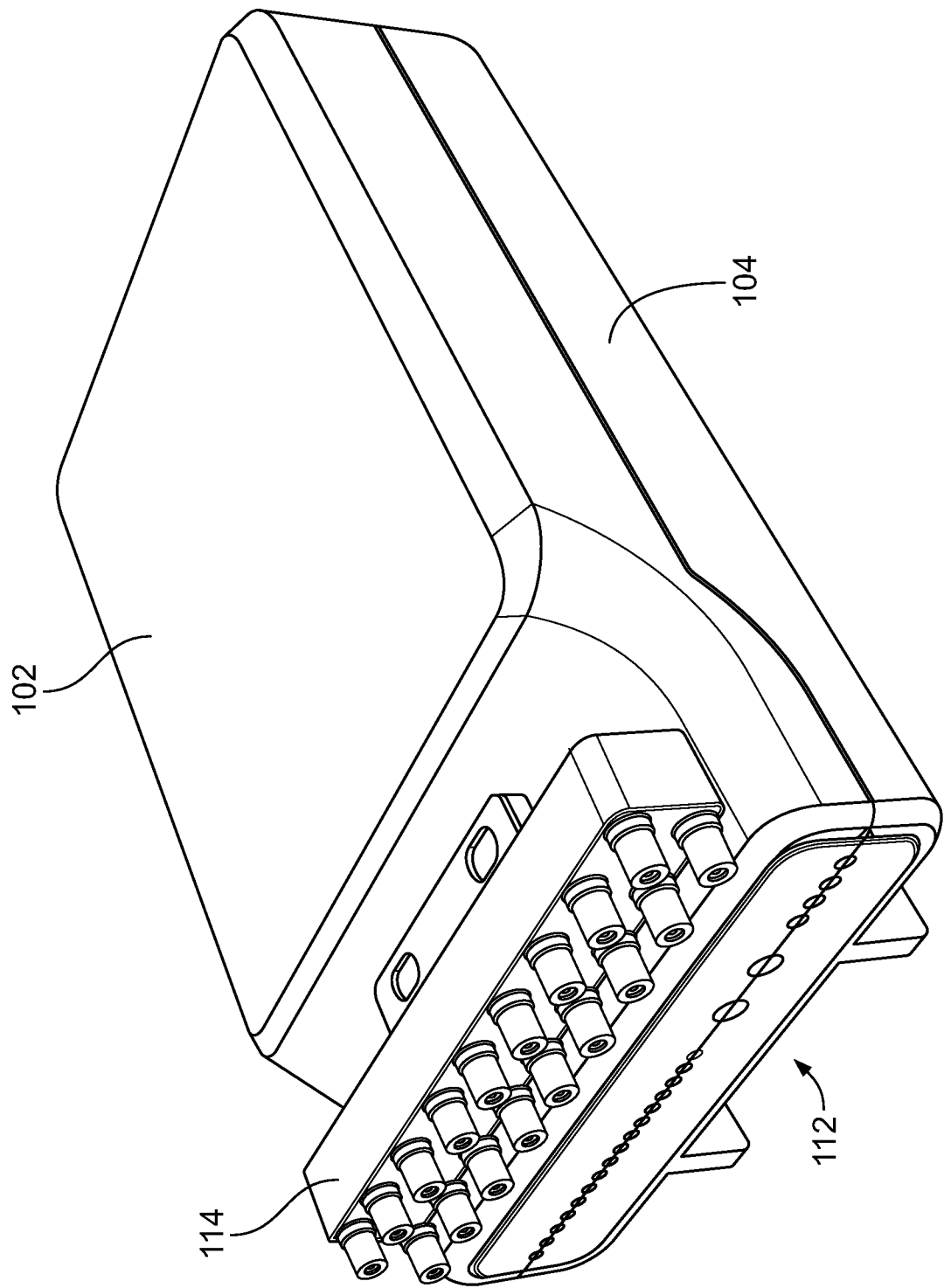
FIG. 9 shows the coax splitter mounted to the cover of the box.
Figure 10:
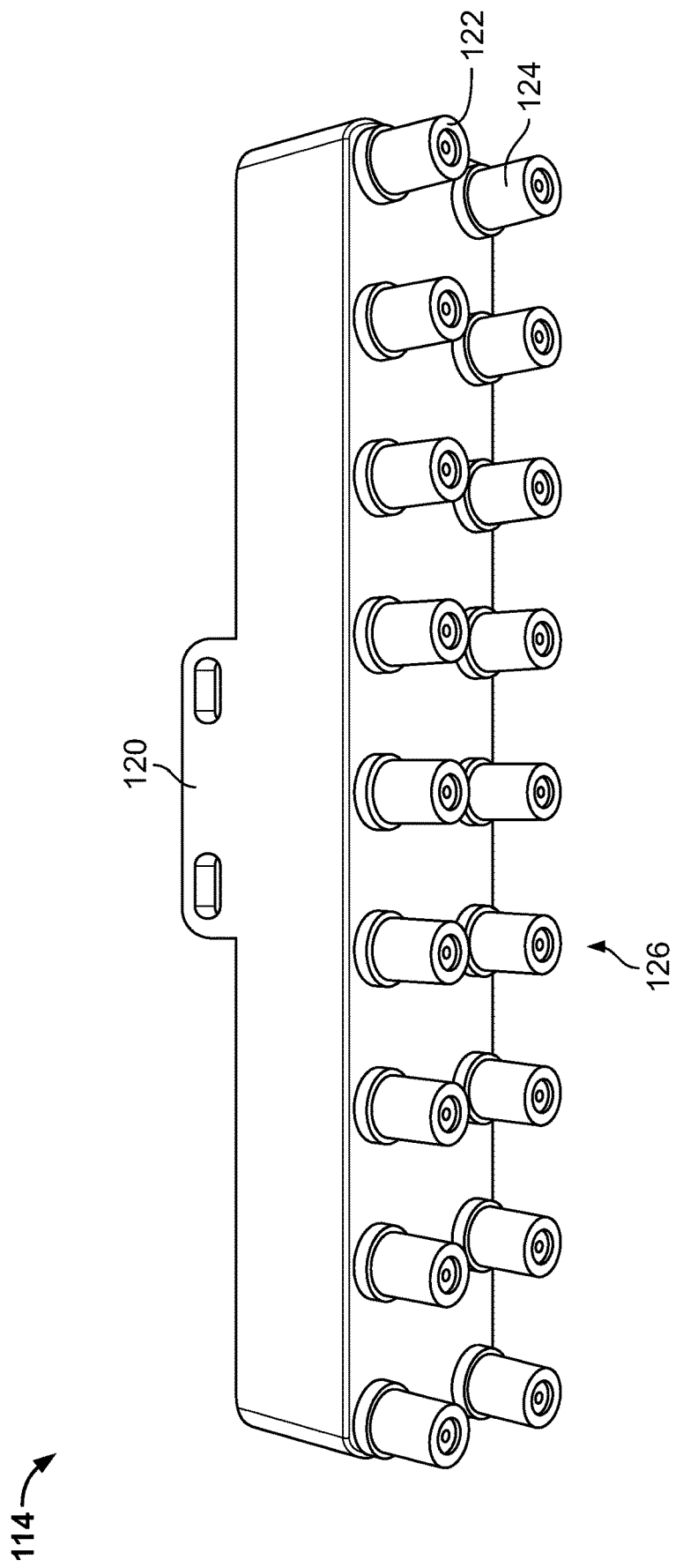
FIGS. 10-14 show various views of coax splitters, including a 1:4, a 1:8, or a 1:16 splitter; and the option each splitter including a jumper output for connecting other additional splitters, as shown in FIG. 14.
Figure 11:
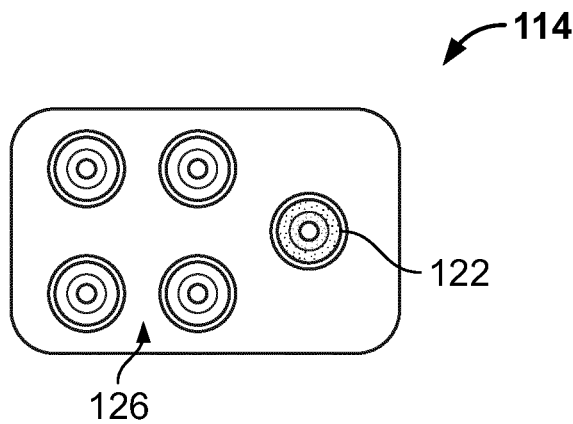
Figure 12:
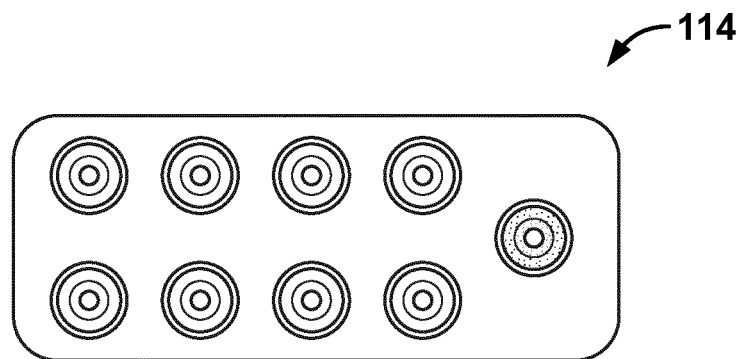
Figure 13:
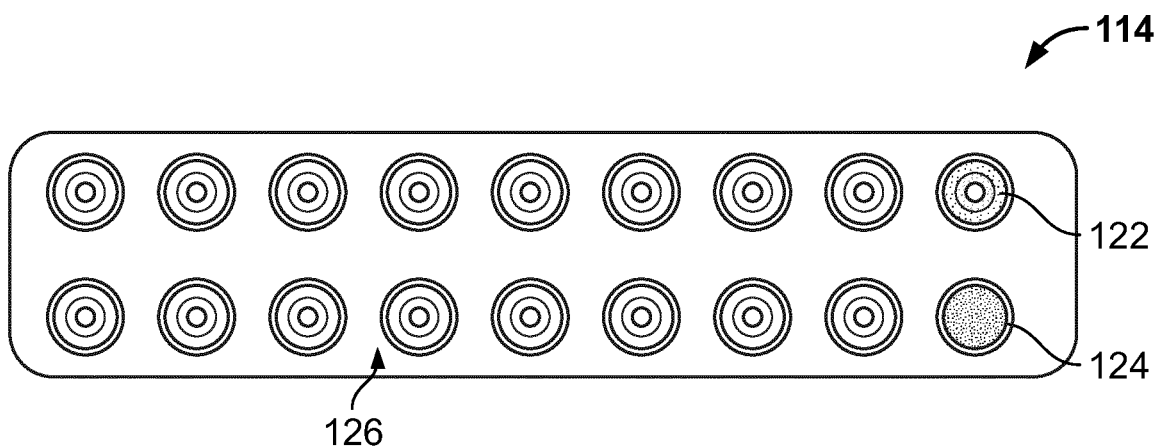

The coax splitter 114 is placed on the outside of the box 100 as the coax connections are environmentally resistant, therefore allowing the box 100 footprint to be smaller. The coax splitter 114 splits a single input coax signal into a plurality of output split signals. In some embodiments, the coax splitter 114 is passive and not powered. In some embodiments, the width W of the box 100 is equal to a width of the coax splitter 114. As shown in FIG. 6, the coax splitter 114 can be mounted at a bottom of the box 100. As shown in FIGS. 7-8, the coax splitter 114 is mounted to the base 104 of the box 100 so as not to block fiber access to the box 100 and to allow the cover 102 to freely open. FIG. 9 shows the coax splitter 114 mounted to the cover 102 of the box 100.

The distribution cables 116 can include both a copper cabling (i.e., coax) and optical fibers. In some embodiments, the distribution cables 116 include empty tubing for the optical fibers to be installed at a later date. In other embodiments, the distribution cables 116 can be siamese cables that include a coaxial connector and an over length tube or f-cable at one end. In some embodiments, the coax portion of the distribution cable 116 is removable entirely from the distribution cable 116. In still other embodiments, each distribution cable 116 includes up to four fibers, while only a maximum of two fibers will be used and any additional fibers will be stored.

Figure 14:
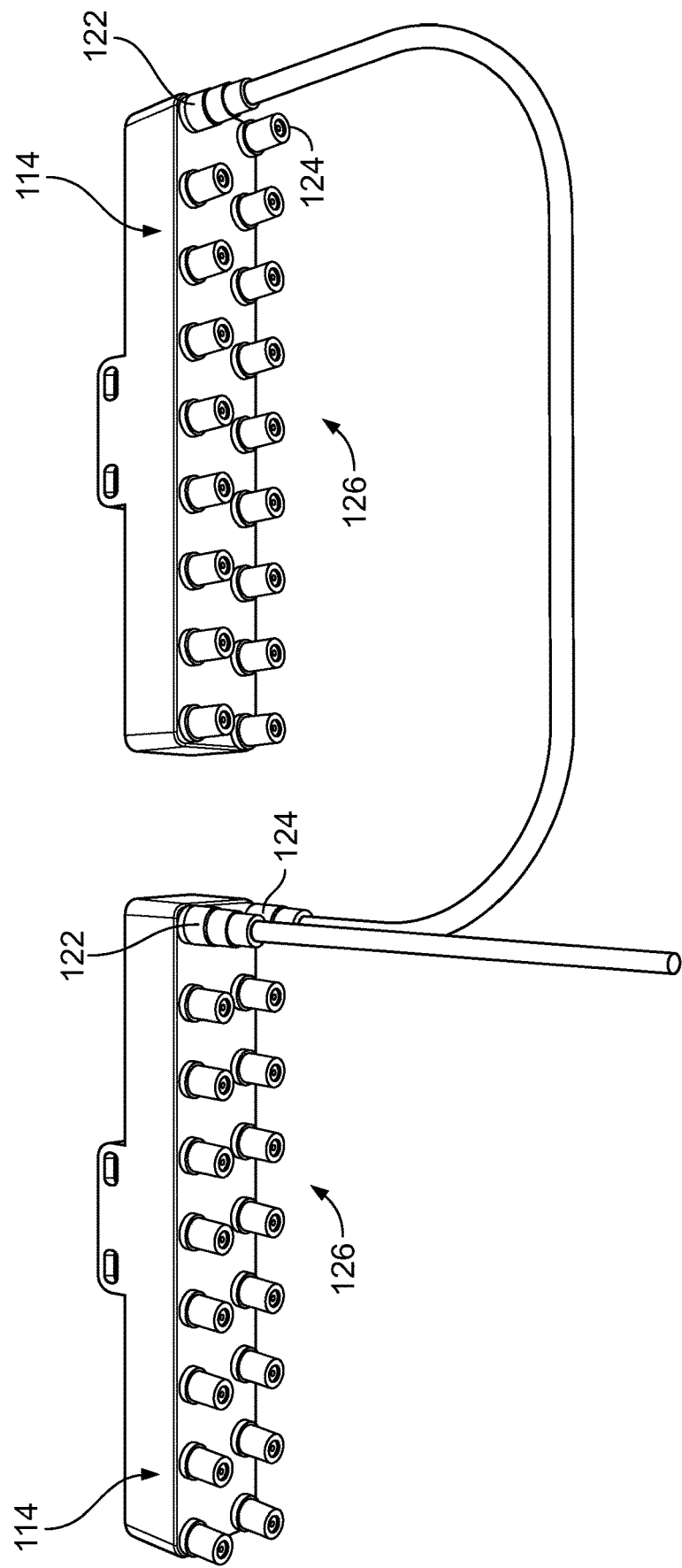

FIGS. 10-14 show the coax splitter 114. As shown, the coax splitter 114 includes a mounting flange 120, an input 122, a jumper output 124, and a plurality of split outputs 126. A shown in FIGS. 11-13, the coax splitter 114 can be a 1:4, a 1:8, or a 1:16 splitter. Each splitter 114 includes an input 122 and a plurality of split outputs 126. Additionally, each splitter 114 can include a jumper output 124 for connecting other additional splitters, as shown in FIG. 14. The coax splitter 114 can be EMEA certified. In other embodiments, the coax splitter 114 can be of a variety of different sizes. In the depicted embodiment, the coax splitter 114 consists of two rows of connectors.

Figure 15:
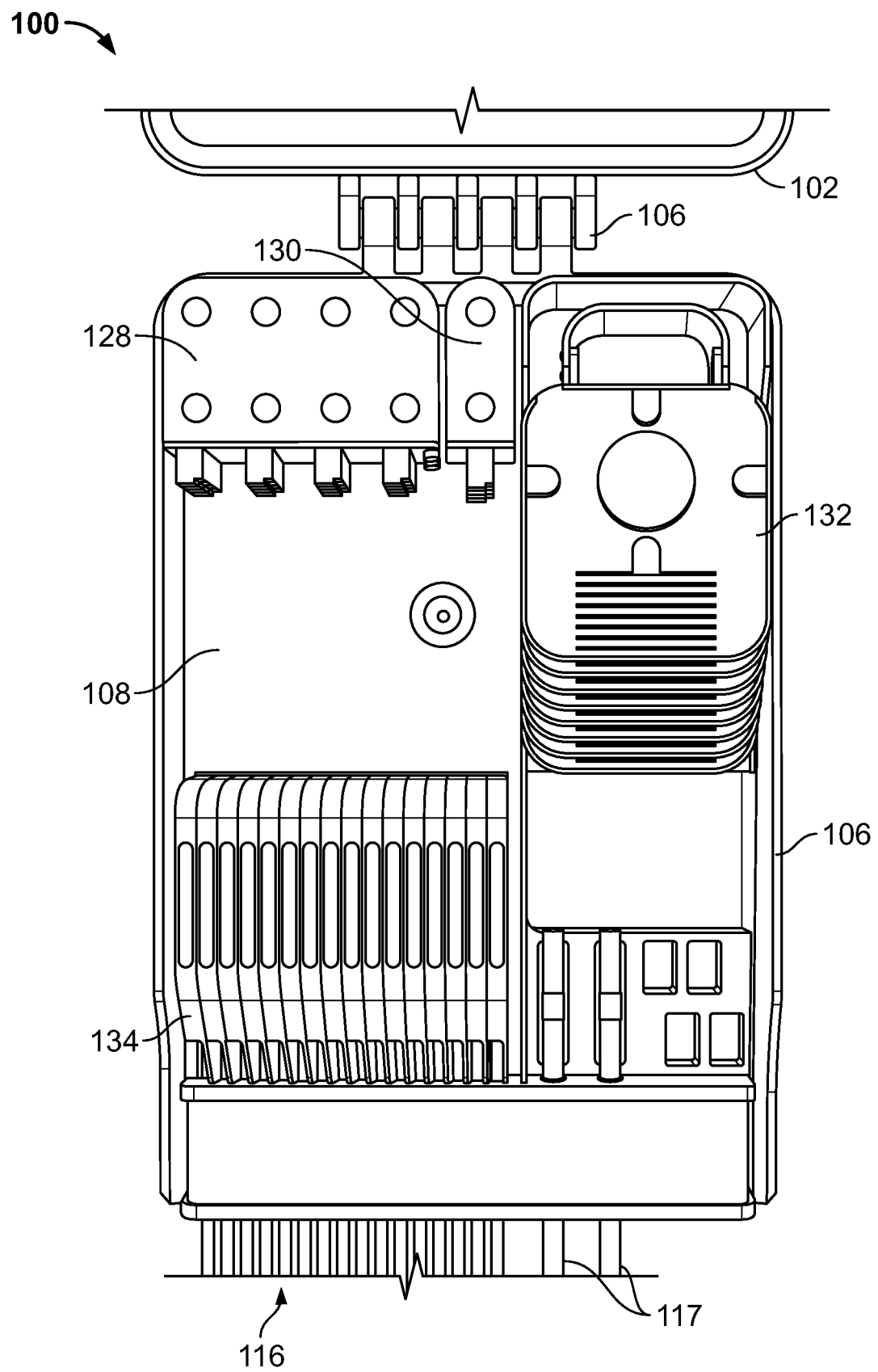
FIGS. 15-16 show the interior of the box when assembled with telecommunications equipment.
Figure 16:
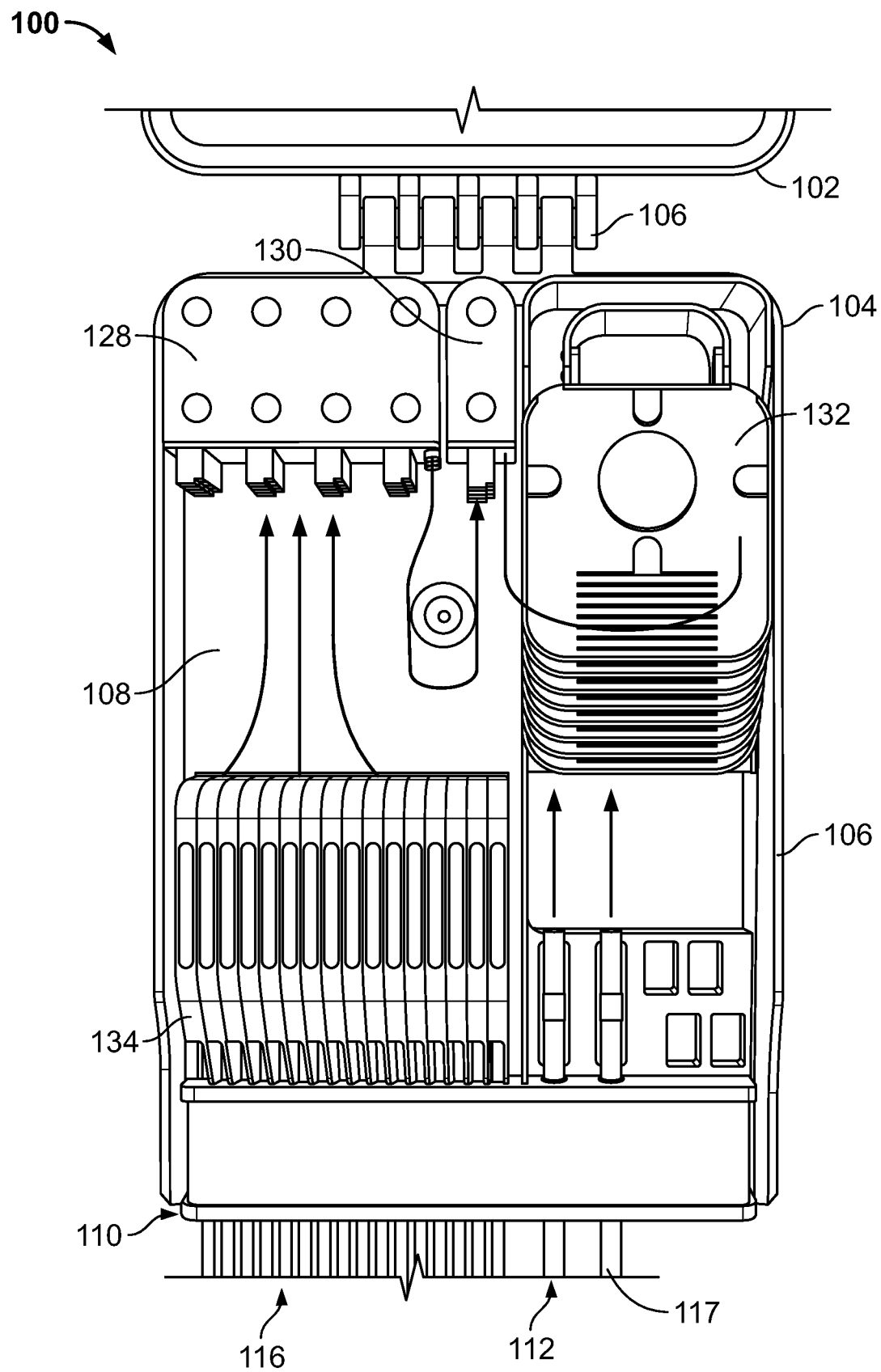

FIGS. 15-16 show the interior of the box 100 when assembled with telecommunications equipment. Mounted on the tray 108 are at least one splitter 128, a fan out 130, a splice tray 132, and a drop splice module 134. A variety of splitters 128 and fan outs 130 are shown mounted within the box 100. The splitters 128 used are for splitting of the signals of the fanned out feeder fibers at the splice trays 132. Within the interior of the splitter 128, the splitter input is split into a plurality of outputs. The box 100 can hold one or more splitters 128 and fan out devices 130. The preferred box 100 allows for: 1) split outputs of a feeder input cable 117; 2) point-to-point connections with distribution cables 116 via the drop splice modules 134; or 3) both split feeder signals and point-to-point feeder signals.

Each component within the box 100 can be organized within the box 100 so as to allow the system to be customized for particular applications. This allows the user to use similar components for a variety of differently sized applications. The box 100 allows for the later addition of splitters 128 and/or fan outs 130 to delay early cost if the system is small to start. At a later date, if the box 100 needs to expand, splitters and fan-outs can be added. Further, there is no overlength issues with pre-termination distribution cables as all distribution cables 116 are spliced at the drop splice modules 134 within the box 100.

FIG. 16 shows how each component within the box 100 interacts with one another. As shown, feeder cables 117 enter the box 100 via the entry point 112. In some embodiments, the feeder cables 117 pass through the gel seal 110. The feeder cable 117 is then spliced with an input of at least one fan out 130 at the splice tray 132. The inputs of the splitters 128 are then connected to outputs of the fan outs 130. Outputs of the splitters 128 are then connected to the inputs of the drop splice modules 134. Each drop splice module 134 is connected to a single distribution cable allowing for a split output to be sent via the distribution cable 116. When making a point-to-point connection, the inputs of the drop splice modules 134 are connected directly to the output of the fan out 130. Depending on the particular application, the components can be positioned in a variety of different ways within the box 100 on the tray 108.

Figure 17:
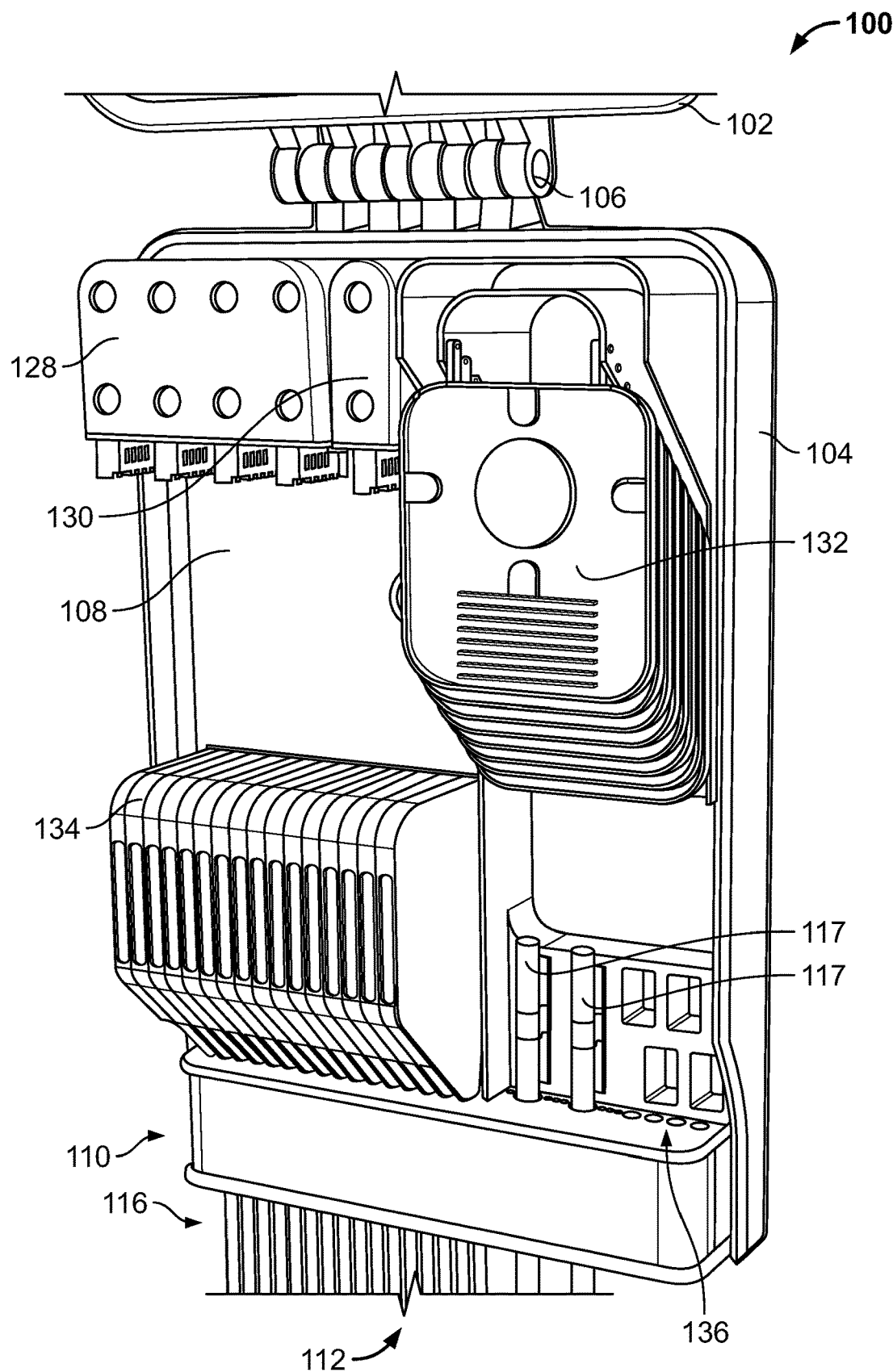
FIG. 17 shows a perspective view of the box opened.

FIG. 17 shows a perspective view of the box 100 opened. In the depicted embodiment, the box 100 is fully loaded for a purely split output configuration. As shown, two feeder cables 117 are entering the box 100 through the gel seal 110. The gel seal 110 also includes four auxiliary ports 136 for four satellite cables (not shown). Eight splice trays 132 are shown, each having eight splices per tray. The fan out 130 is shown having eight connections, and the splitters 128 are shown having thirty-two connections. There are sixteen drop splice modules 134, each splicing two fibers, for a total of thirty-two total splices.

Figure 18:
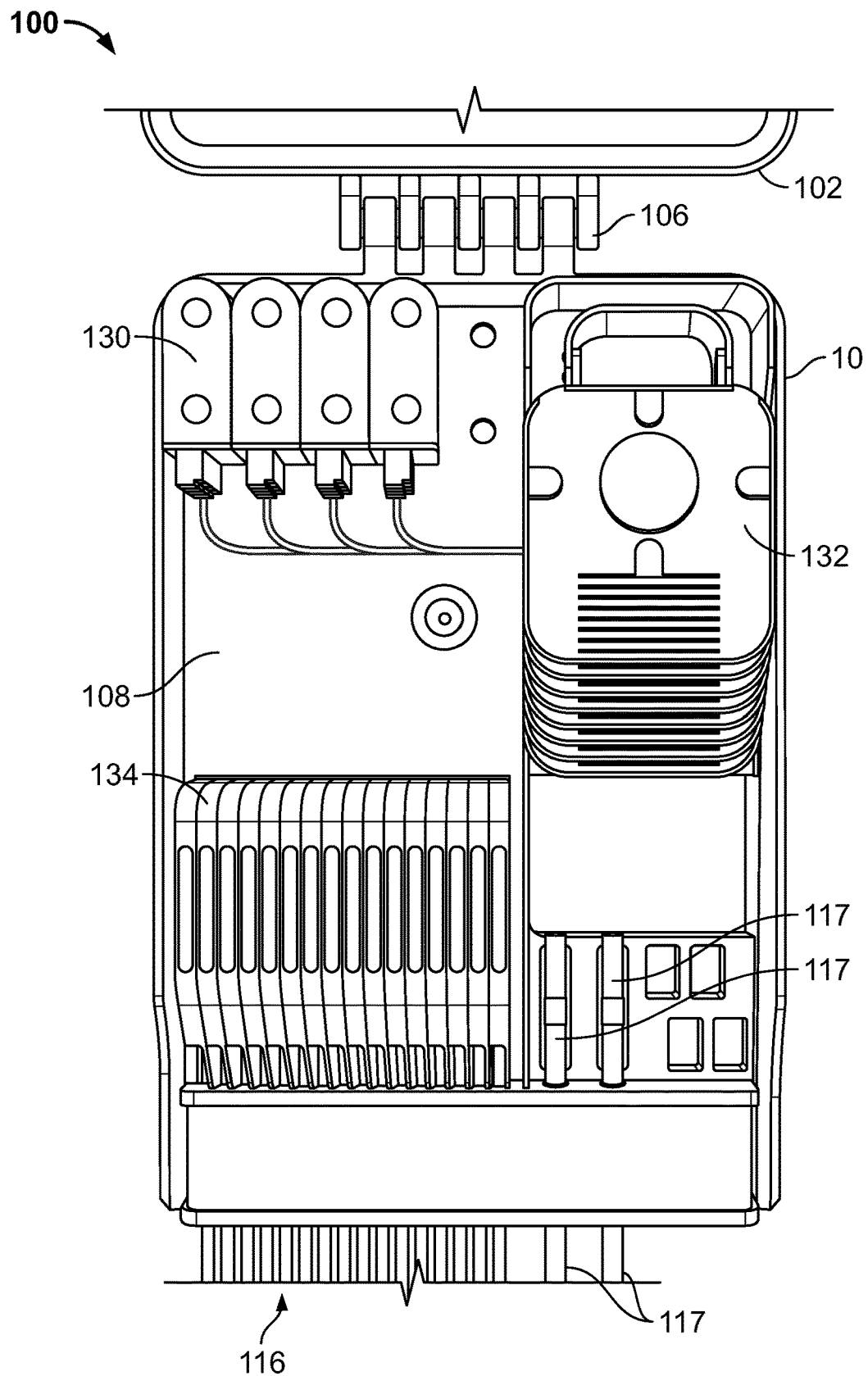
FIG. 18 shows the box equipped for only point-to-point connections.

FIG. 18 shows the box 100 equipped for only point-to-point connections. As shown, four fan outs 130 are connected to four splice trays 132. Each fan out output can be connected to drop splice module 134 input for point-to-point connections.

FIGS. 19-22 show examples of the box 100 when configured for split output only.

Figure 19:
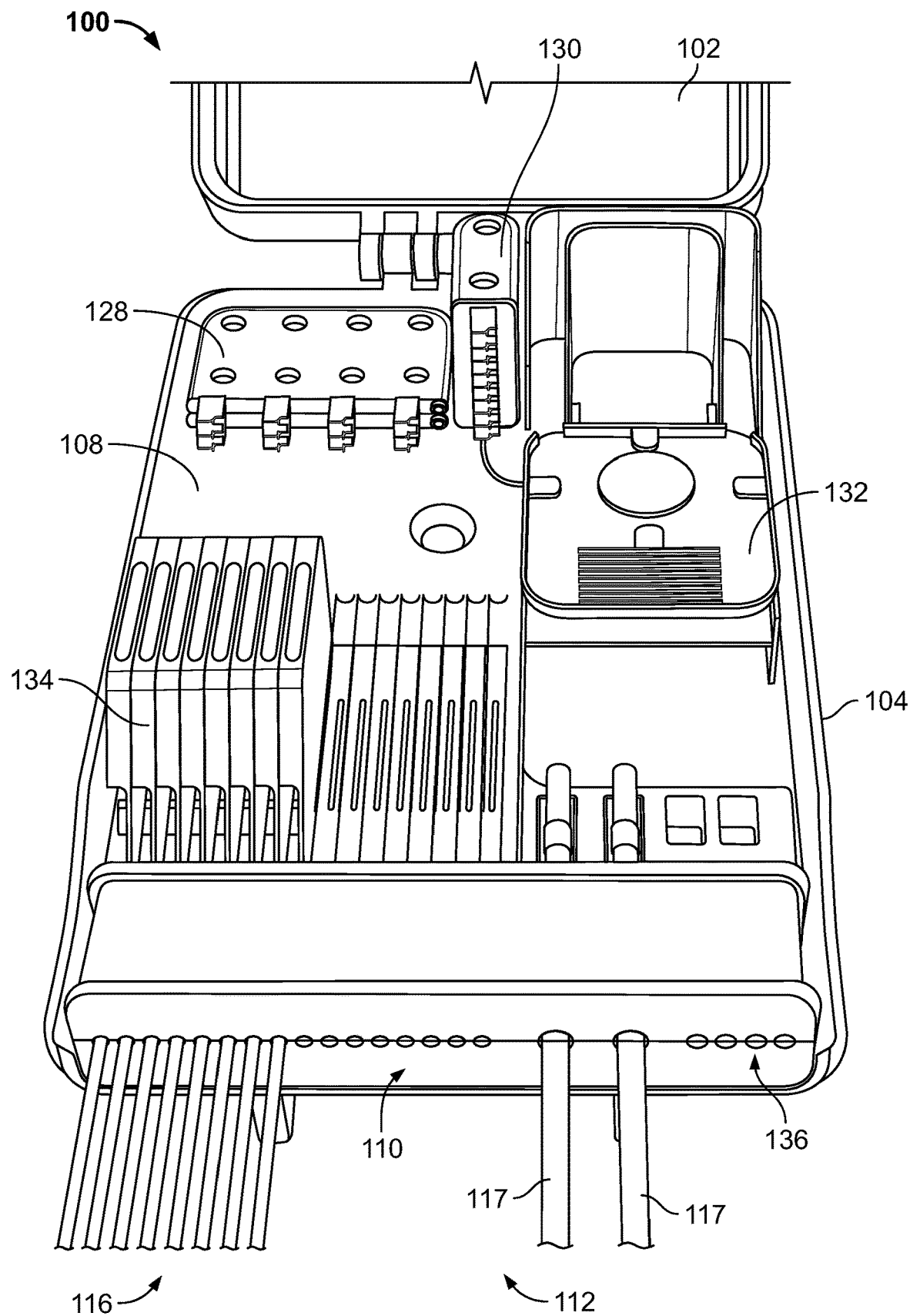
FIGS. 19-22 show examples of the box when configured for split output only.

FIG. 19 shows the box 100 configured for eight customers and sealed with a gel seal 110 so that the box is rated at IP68. Two splitters 128 are shown and each is configured to be 1:4. As shown, each distribution cable 116 includes one fiber.

Figure 20:
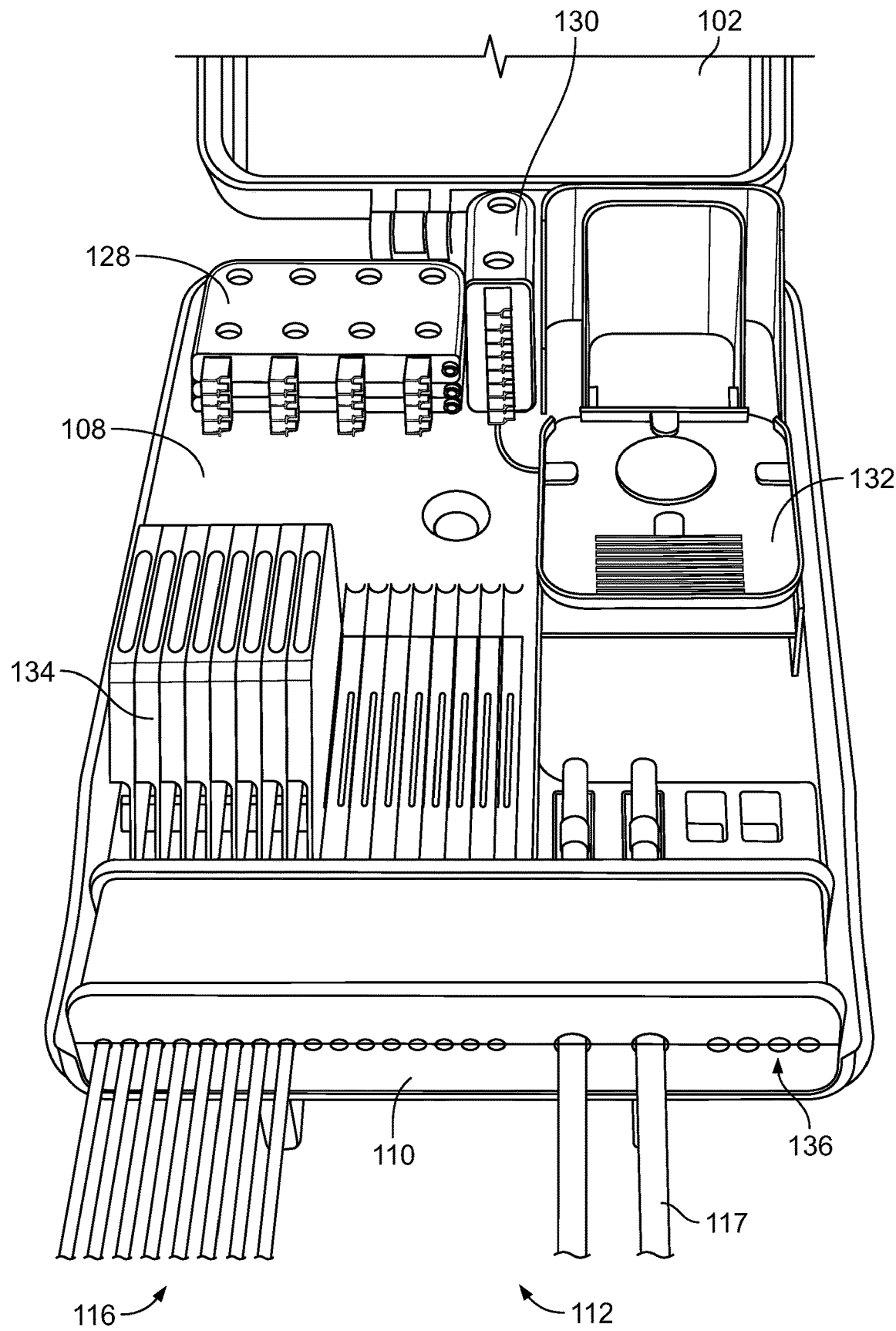

FIG. 20 shows the box 100 configured for eight customers and sealed with a gel seal 110 so that the box is rated at IP68. Three splitters 128 are shown. Two splitters are configured to be 1:4, and one splitter is configured to be 1:8. As shown, each distribution cable 116 includes two fibers.

Figure 21:
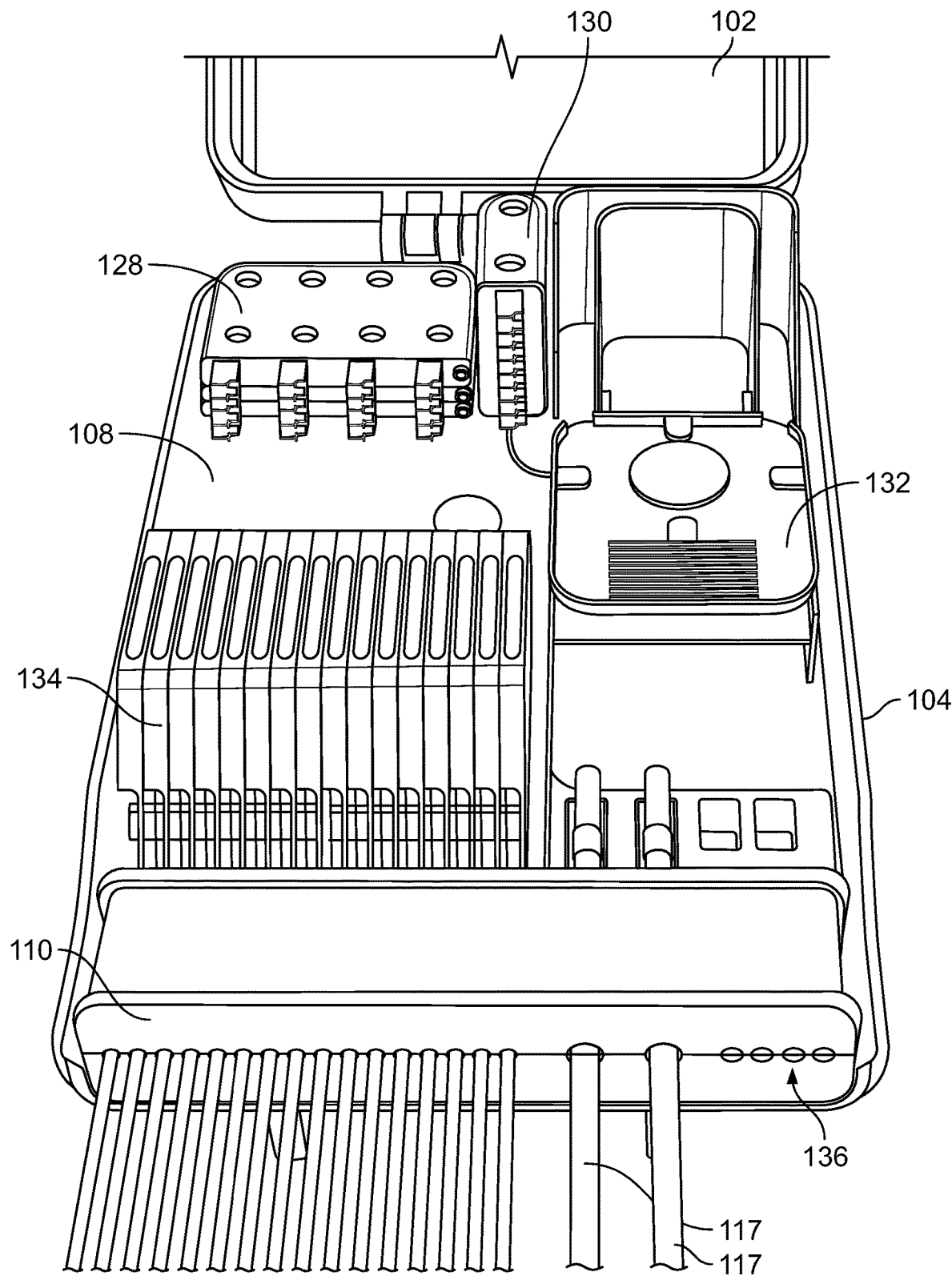

FIG. 21 shows the box 100 configured for sixteen customers and sealed with a gel seal 110 so that the box is rated at IP68. Two splitters 128 are shown and each is configured to be 1:8. As shown, each distribution cable 116 includes one fiber.

Figure 22:
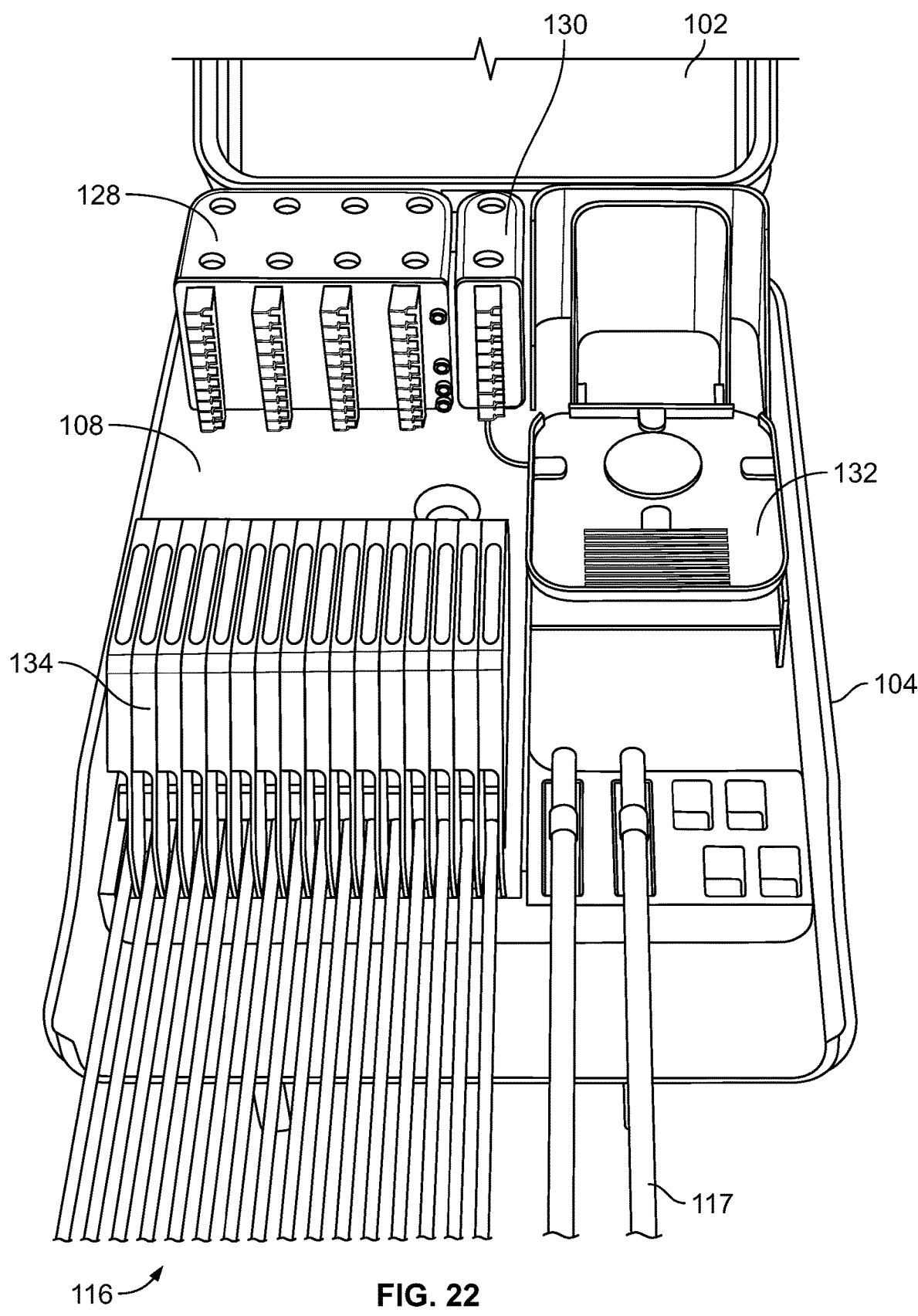

FIG. 22 shows the box 100 configured for sixteen customers and does not include a gel seal 110 so that the box is rated at IP54. Two splitters 128 are shown and each is configured to be 1:16. As shown, each distribution cable 116 includes two fibers.

Figure 23:
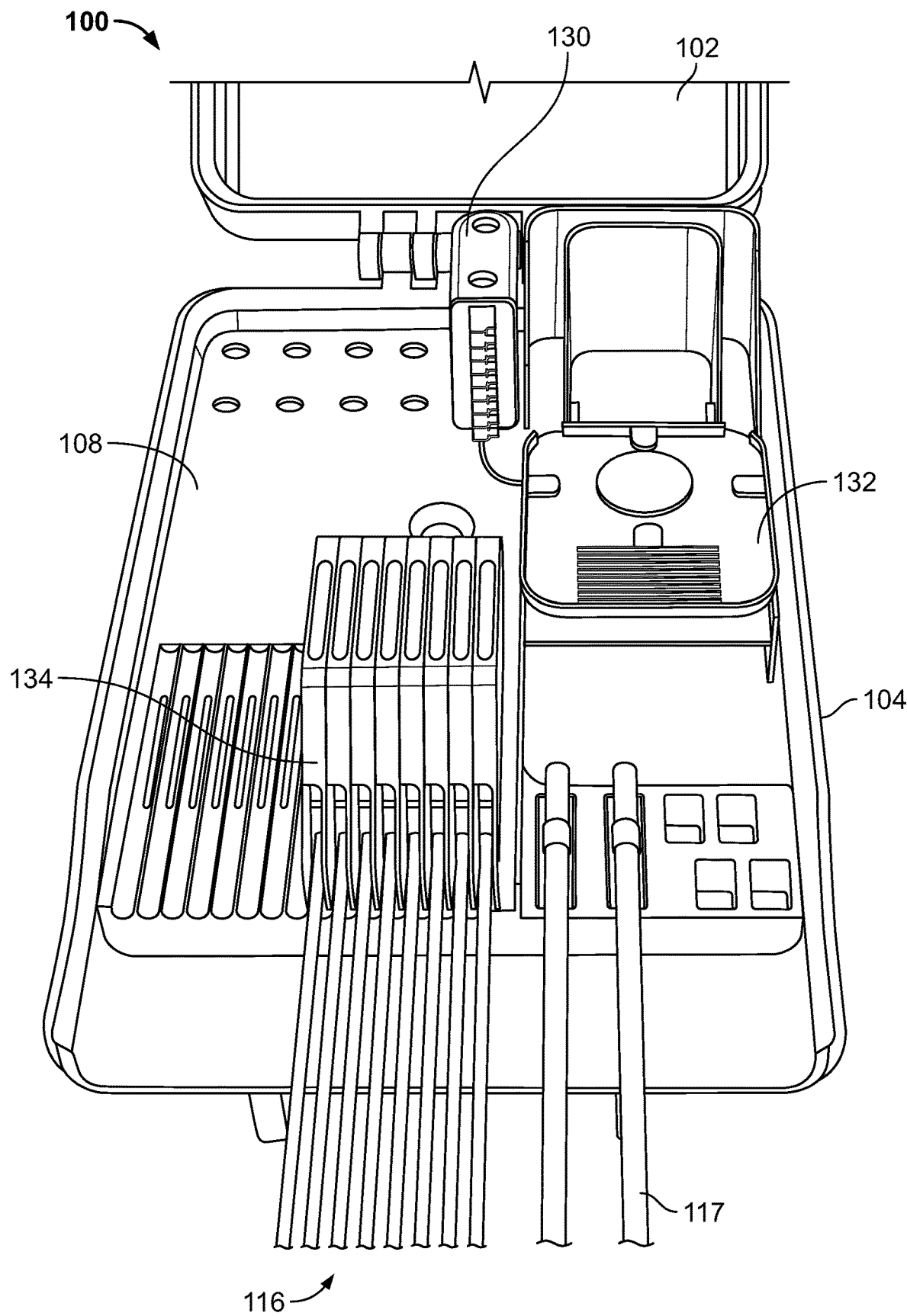
FIGS. 23-25 show examples of the box when configured for point-to-point connections only.
Figure 24:
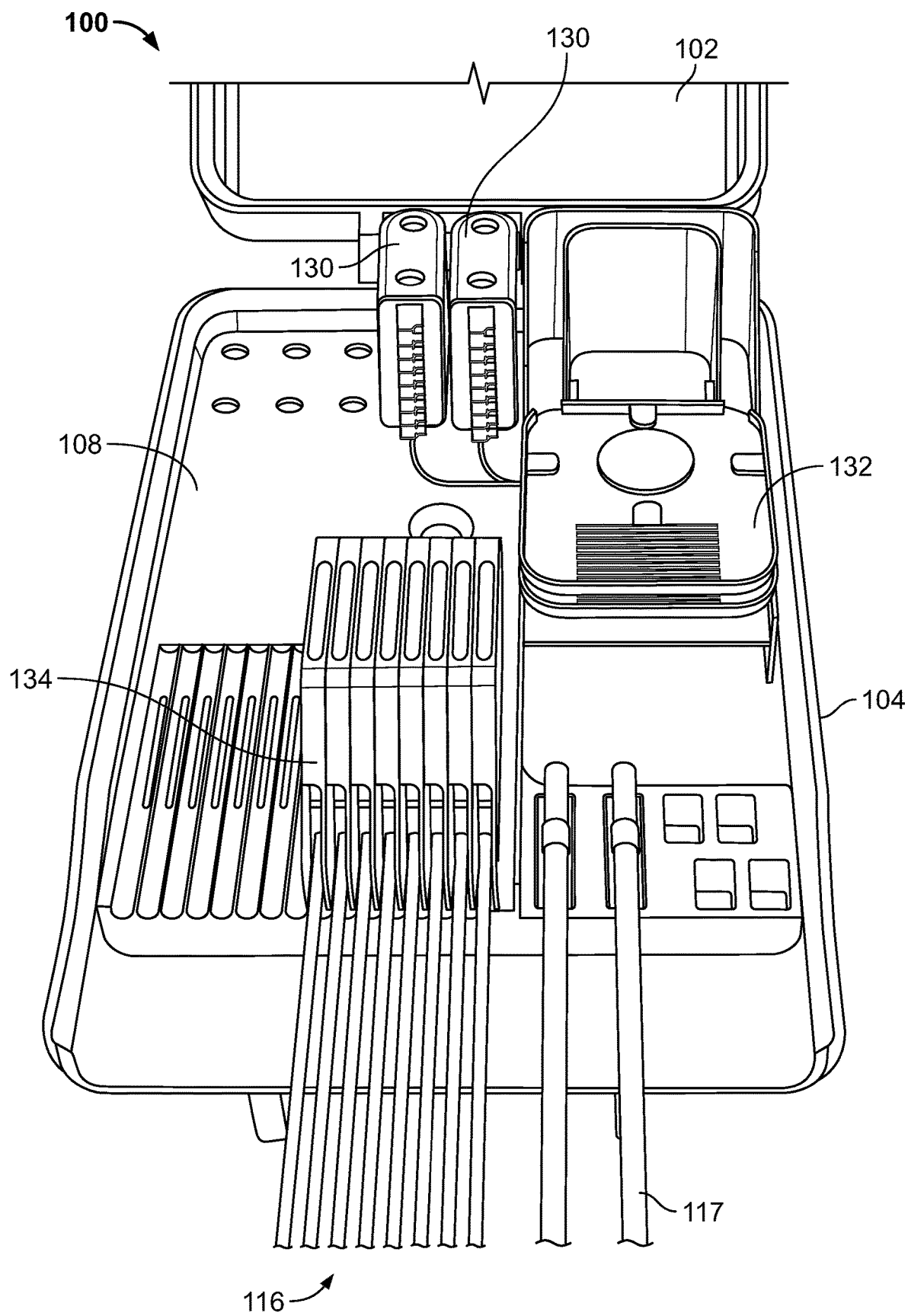
Figure 25:
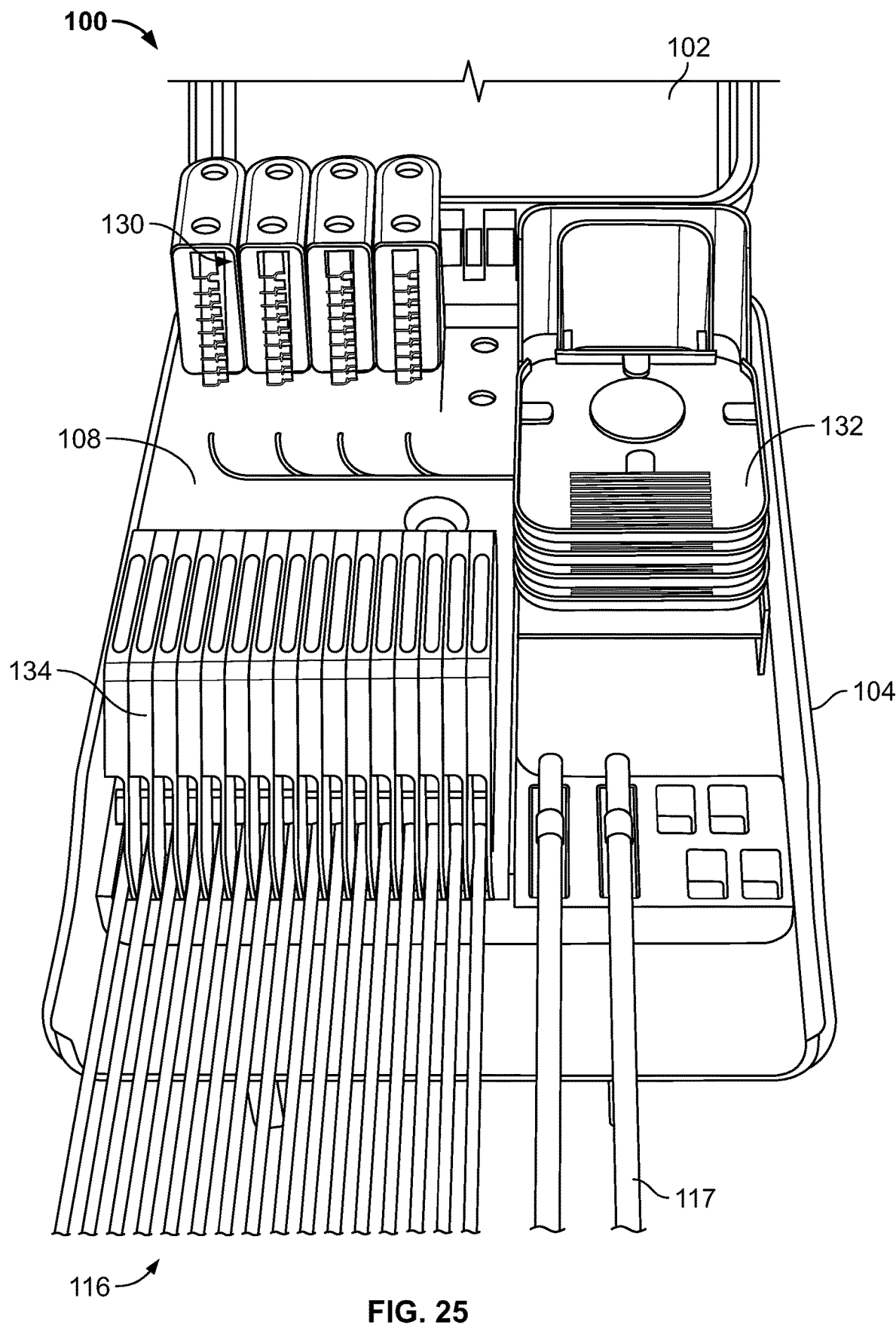

FIGS. 23-25 show examples of the box 100 when configured for point-to-point connections only.

FIG. 23 shows the box 100 configured for eight customers and does not include a gel seal 110 so that the box is rated at IP54. One fan out 130 is shown and is configured to be 1:8. As shown, each distribution cable 116 includes one fiber.

FIG. 24 shows the box 100 configured for eight customers and does not include a gel seal 110 so that the box is rated at IP54. Two fan outs 130 are shown and each is configured to be 1:8. As shown, each distribution cable 116 includes two fibers.

FIG. 25 shows the box 100 configured for sixteen customers and does not include a gel seal 110 so that the box is rated at IP54. Four fan outs 130 are shown and each is configured to be 1:8. As shown, each distribution cable 116 includes two fibers.

Figure 26:
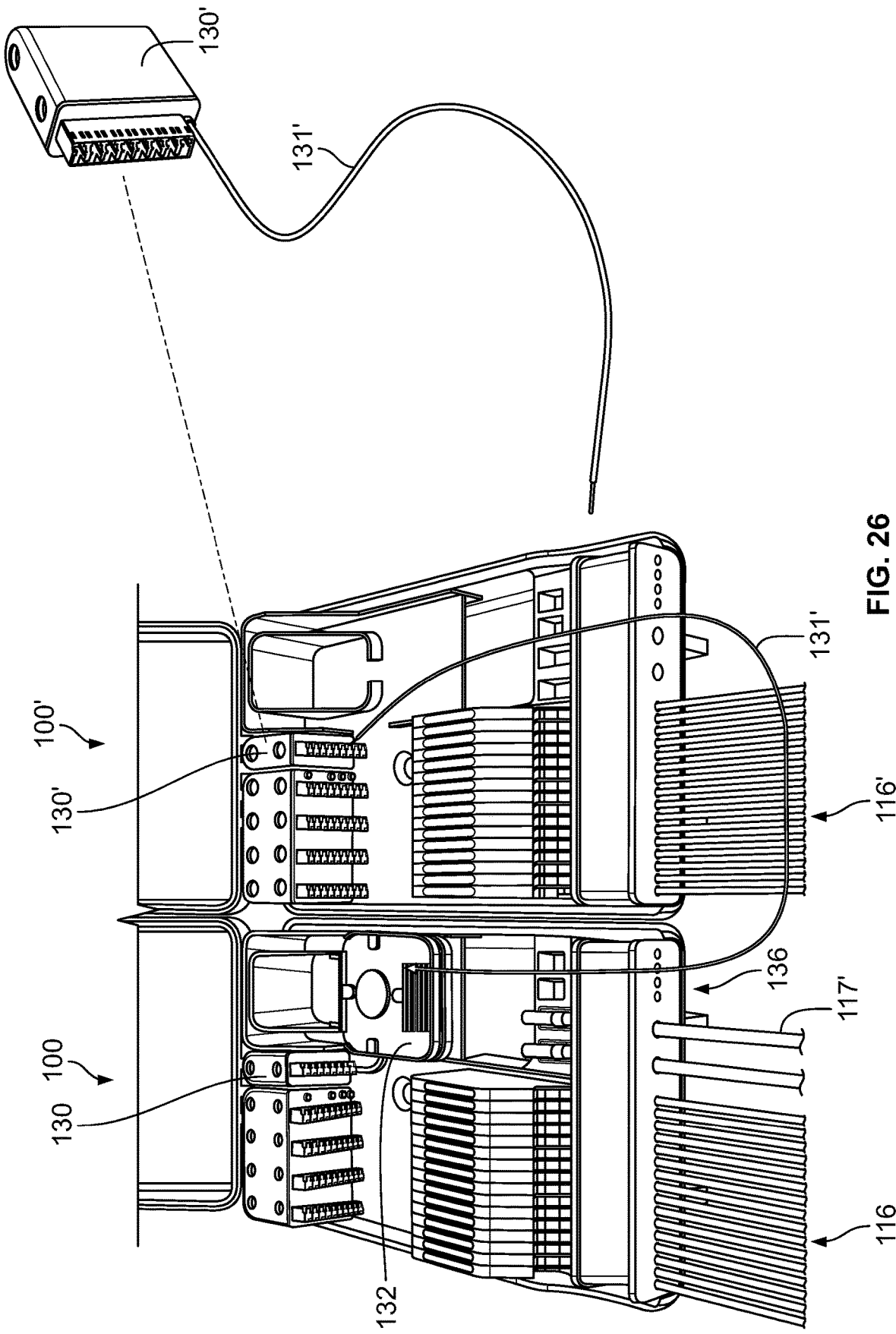
FIG. 26 shows a pair of boxes each being configured for sixteen customers a piece, for a total of thirty two customers, with each distribution cable having two fibers.

FIG. 26 shows a pair of boxes 100, 100' each being configured for 16 customers a piece, for a total of 32 customers, with each distribution cable 116, 116' having two fibers. Further, each box 100, 100' is configured for split outputs. Feeder cables 117 enter the first box 100 and the secondary box 100' can be positioned in either close proximity to, or in the general area of, the first box 100 (e.g., within the neighborhood). A fan out 130' from the second box 100' having a ruggedized stub input 131' exits from the second box 100' and enters through an auxiliary port 136 of the first box 100. Once inside the first box 100, the ruggedized input stub 131' is spliced with the feeder cable 117 at a splice tray 132 in a similar way as the fan out 130 in the first box 100.

Figure 27:
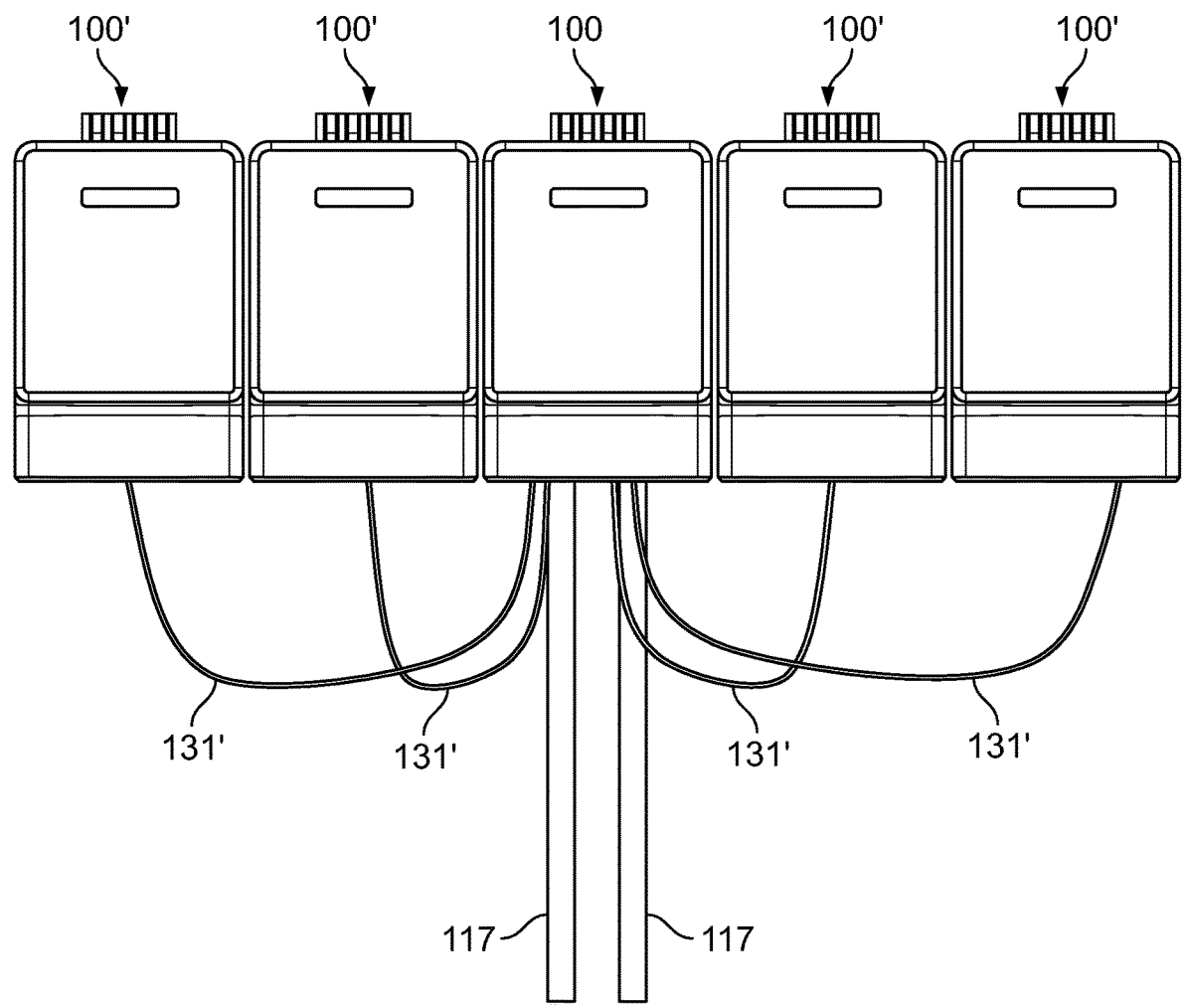
FIG. 27 shows a centralized solution including five boxes.
Figure 28:
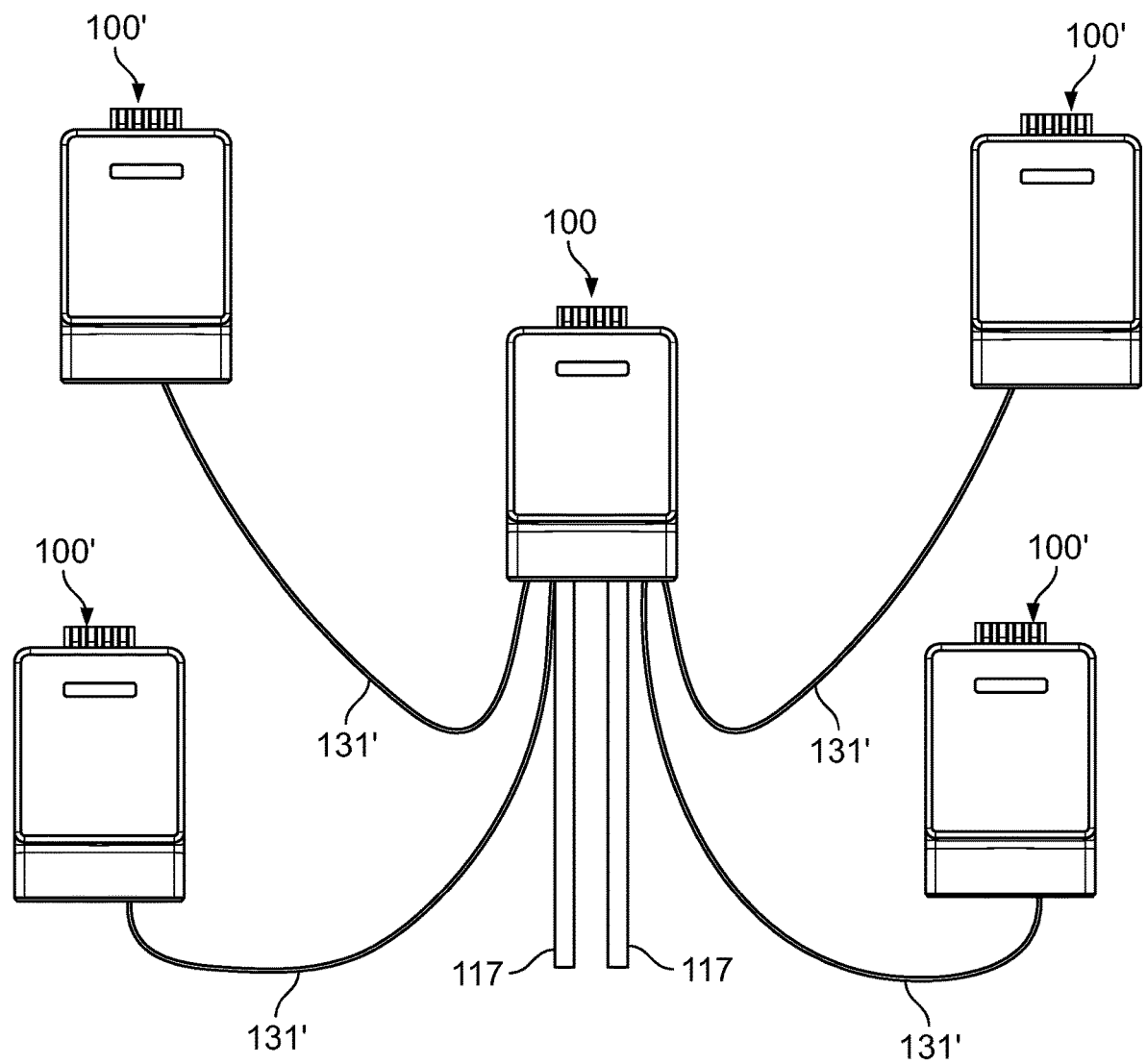
FIG. 28 shows the same system, with the boxes distributed from one another (e.g., in a neighborhood).

FIG. 27 shows a centralized solution including five boxes. As shown, a single primary box 100 is linked to four secondary boxes 100' via inputs 131' from fan outs. In the depicted embodiment, the total capacity for such a system is eighty customers. FIG. 28 shows the same system, with the boxes distributed from one another (e.g., in a neighborhood).

Figure 29:
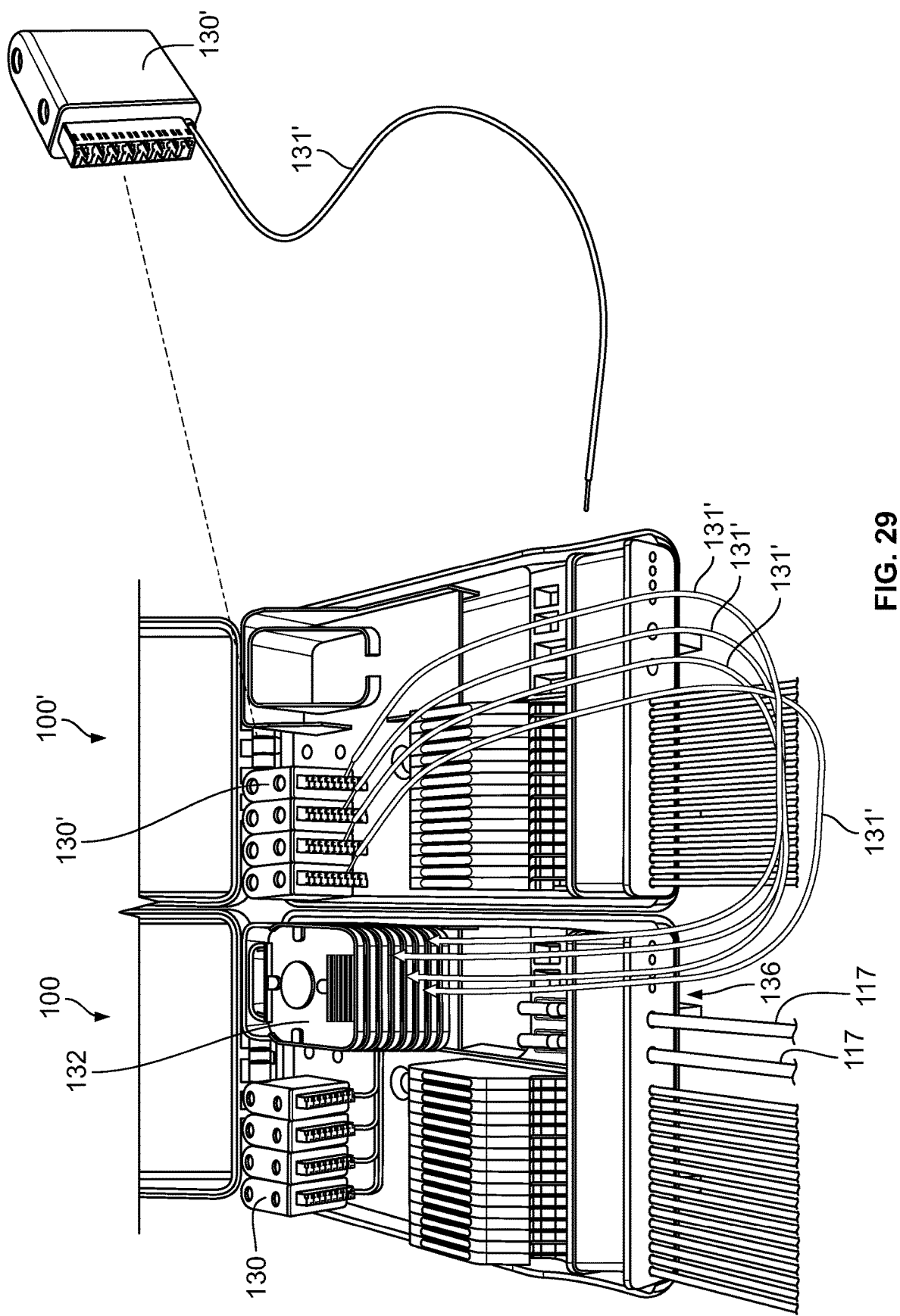
FIG. 29 shows a pair of boxes each being configured for sixteen customers a piece, for a total of thirty-two customers, with each distribution cable having two fibers.

FIG. 29 shows a pair of boxes 100, 100' each being configured for sixteen customers a piece, for a total of thirty-two customers, with each distribution cable 116, 116' having two fibers. Further, each box 100, 100' is configured for point-to-point outputs. Feeder cables 117 enter the first box 100, and the secondary box 100' can be positioned in either close proximity to or in the general area of the first box 100 (e.g., within the neighborhood). Four fan outs 130' from the second box 130', each having ruggedized stub inputs 131' exit from the second box 100' and enter through auxiliary ports 136 of the first box 100. Once inside the first box 100, the input stubs 131' are spliced with the feeder 117 at splice trays 132 in a similar way to the fan outs 130 in the first box 100.

Figure 30:
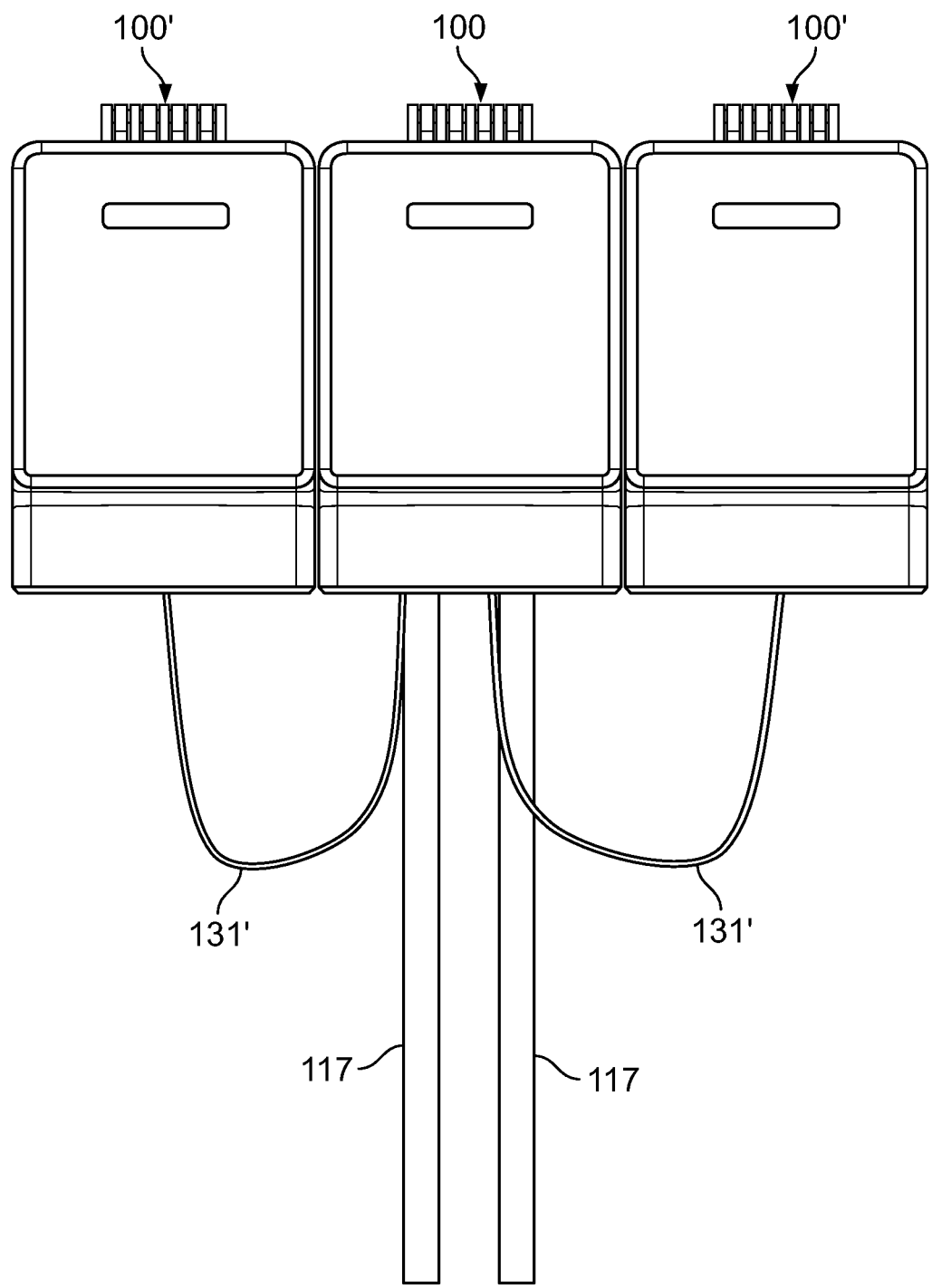
FIG. 30 shows a centralized solution including three boxes.
Figure 31:
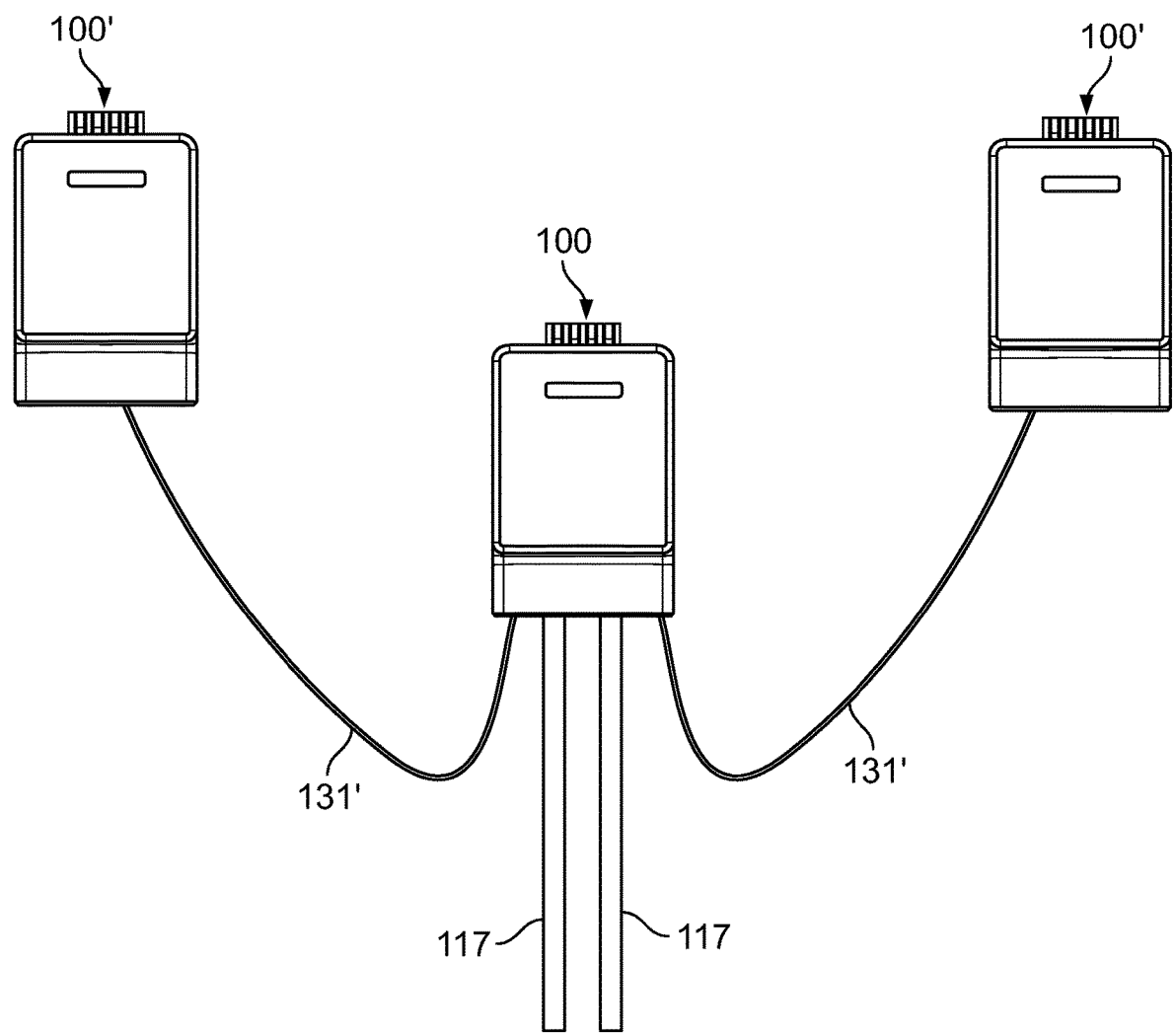
FIG. 31 shows the same system, with the boxes distributed from one another (e.g., in a neighborhood).

FIG. 30 shows a centralized solution including three boxes. As shown, a single primary box 100 is linked to two secondary boxes 100' via inputs 131' from fan outs. In the depicted embodiment, the total capacity for such a system with three boxes is sixty-four customers. FIG. 31 shows the same system, with the boxes distributed from one another (e.g., in a neighborhood).

Figure 32:
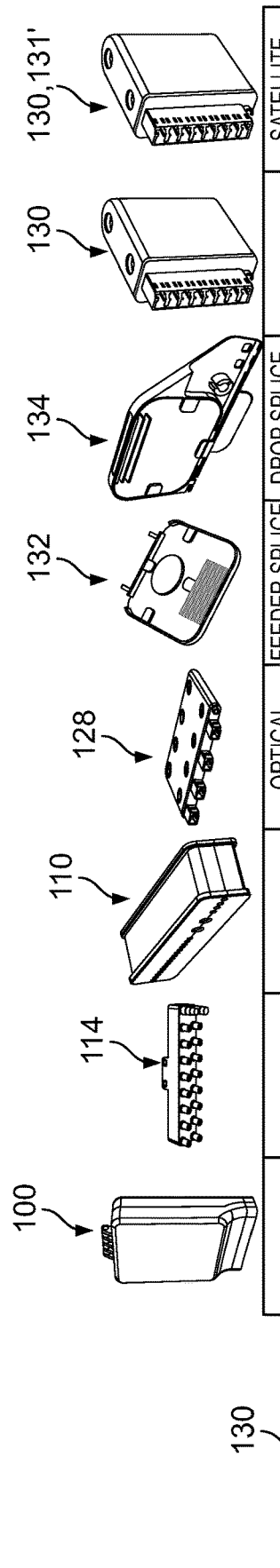
FIG. 32 shows a chart for various examples of the telecommunications equipment that the box, disclosed herein, can include.

FIG. 32 shows a chart for all the telecommunications equipment that the box 100, disclosed here, can include. A left hand vertical column 138 includes desired system characteristics, including the desired environmental rating, the amount of customers, the amount of fibers per customer, and whether the system will be a point-to-point (PtP) or split output (PON) system. Each subsequent column to the right is each individual component of the telecommunications system. Therefore, a user can select a system on the left column and then reference the associated row to the right to determine the amount and type of each component the user will need.

Figure 33:
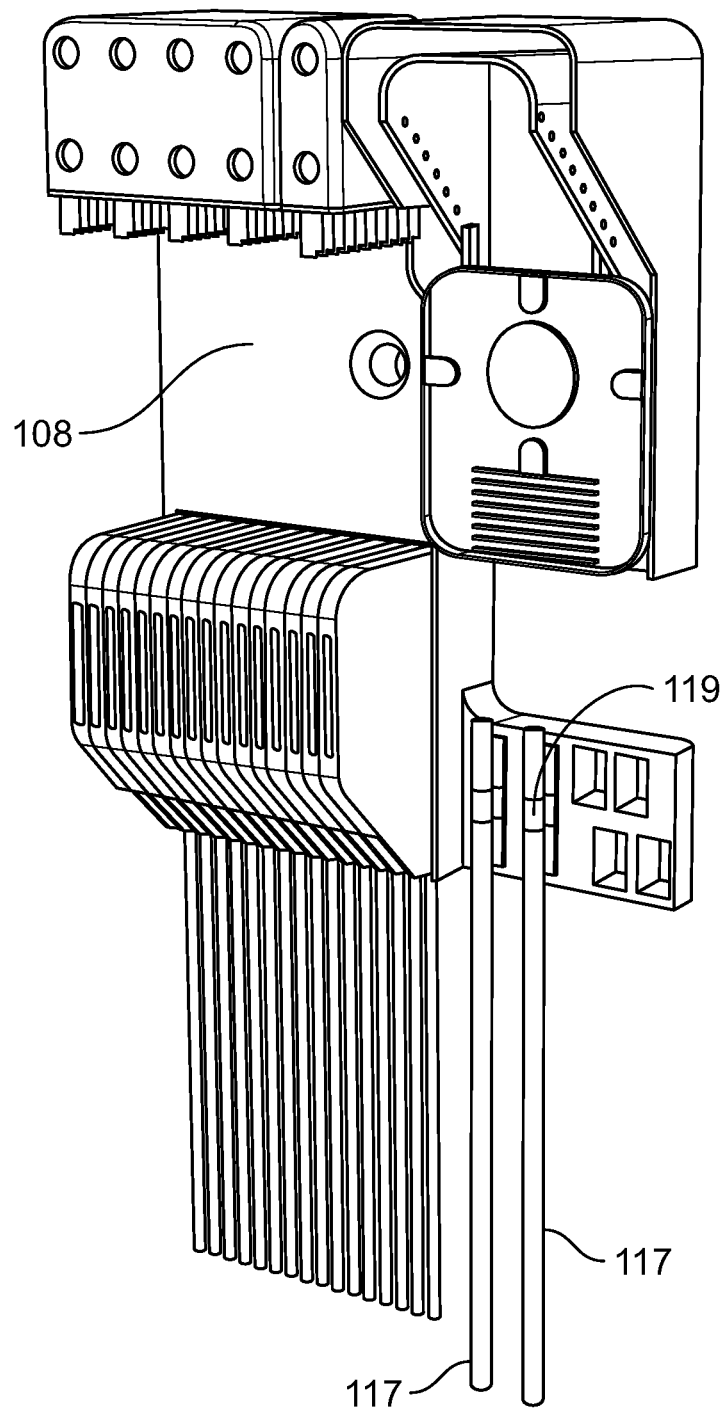
FIGS. 33-34 show a tray, according to one embodiment of the present disclosure.
Figure 34:
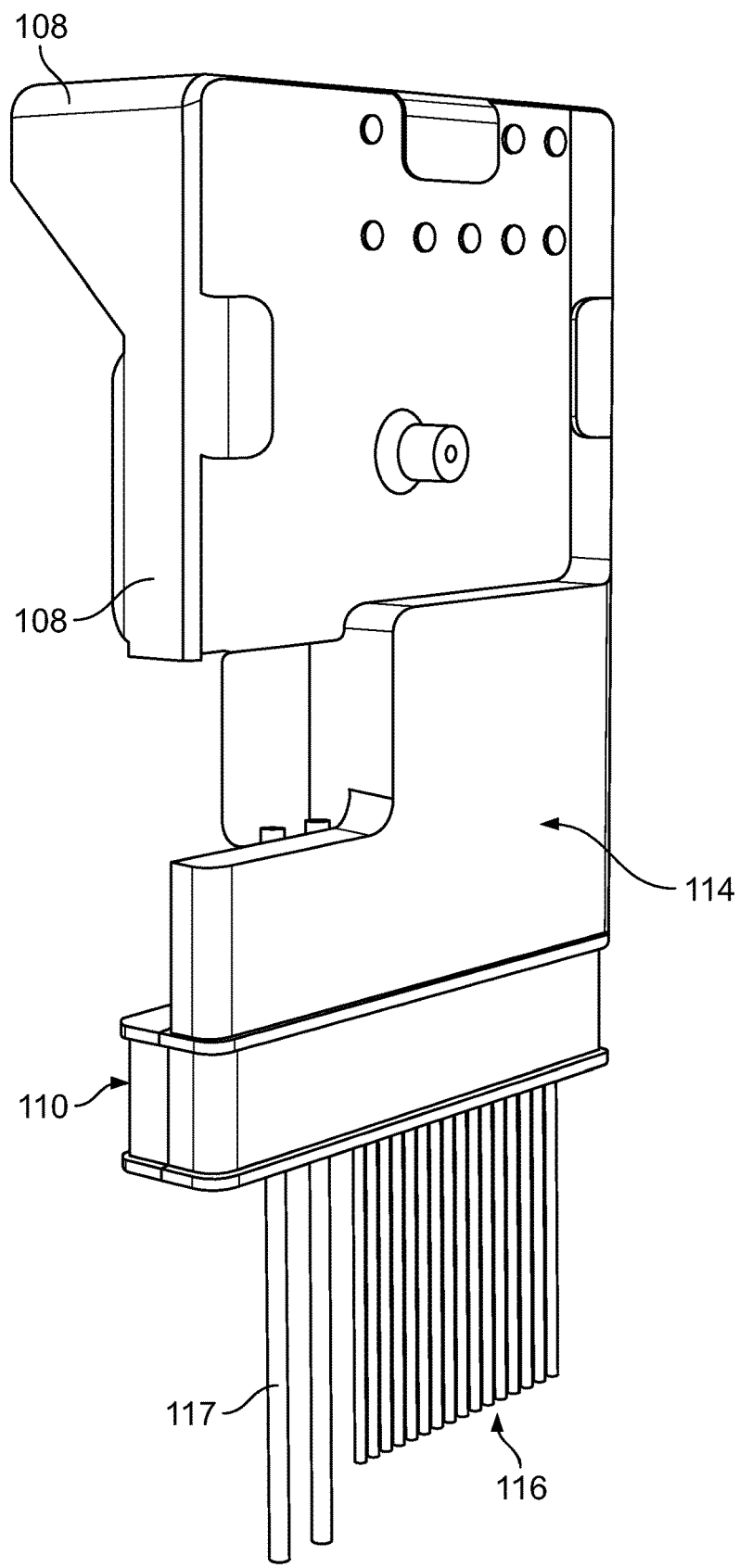

FIGS. 33 and 34 show the tray 108, according to one embodiment of the present disclosure. As shown, the tray 108 is a standalone piece and can be removed and mounted in places other than the box 100 (e.g., a cabinet without a cover). When installing the tray 108 into the box 100, the feeder cables 117 can be installed on the tray 108 first with clips 119. At a backside 140 of the tray 108, any overlength from the feeder cables 117 can be stored.

Figure 35:
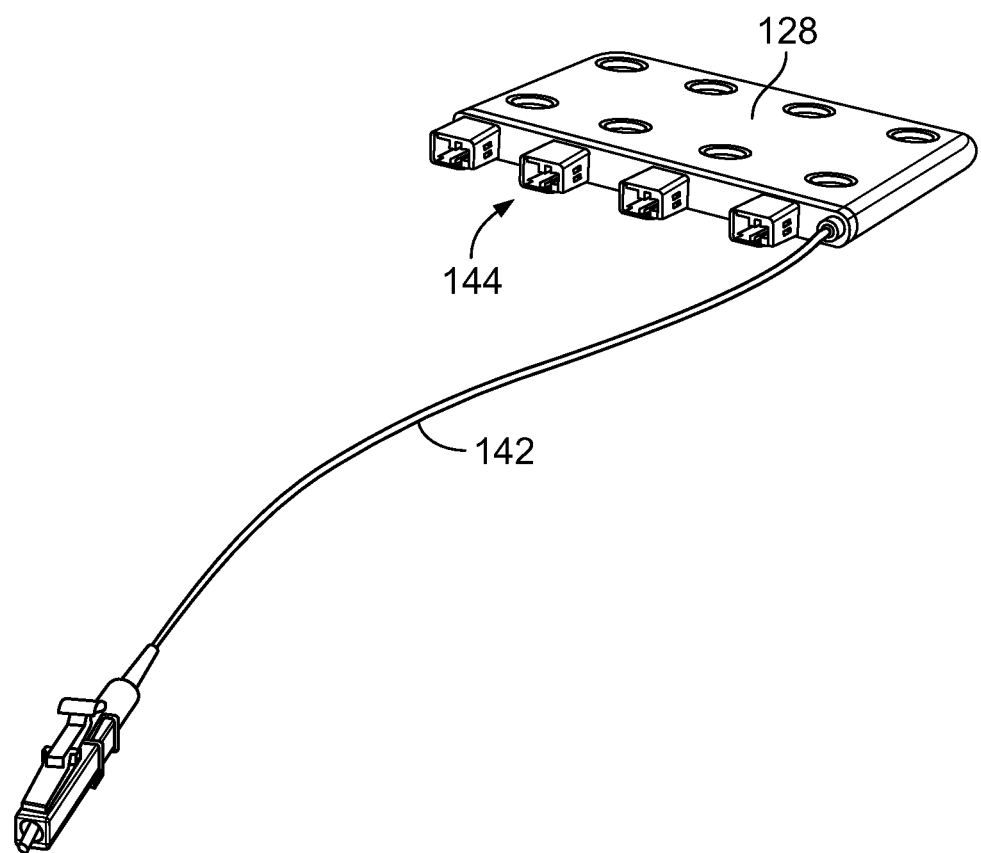
FIGS. 35-36 show example splitters.
Figure 36:
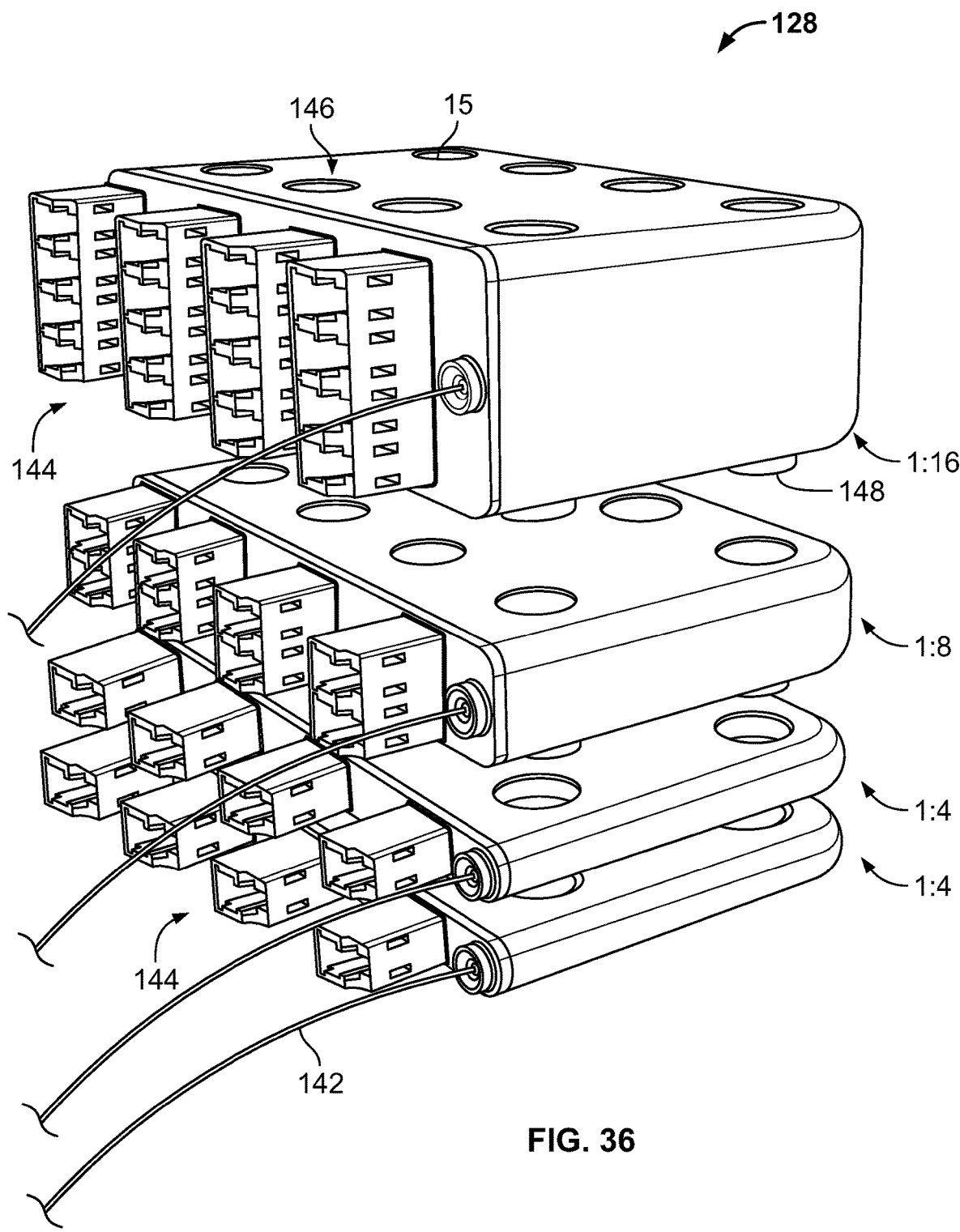
Figure 37:
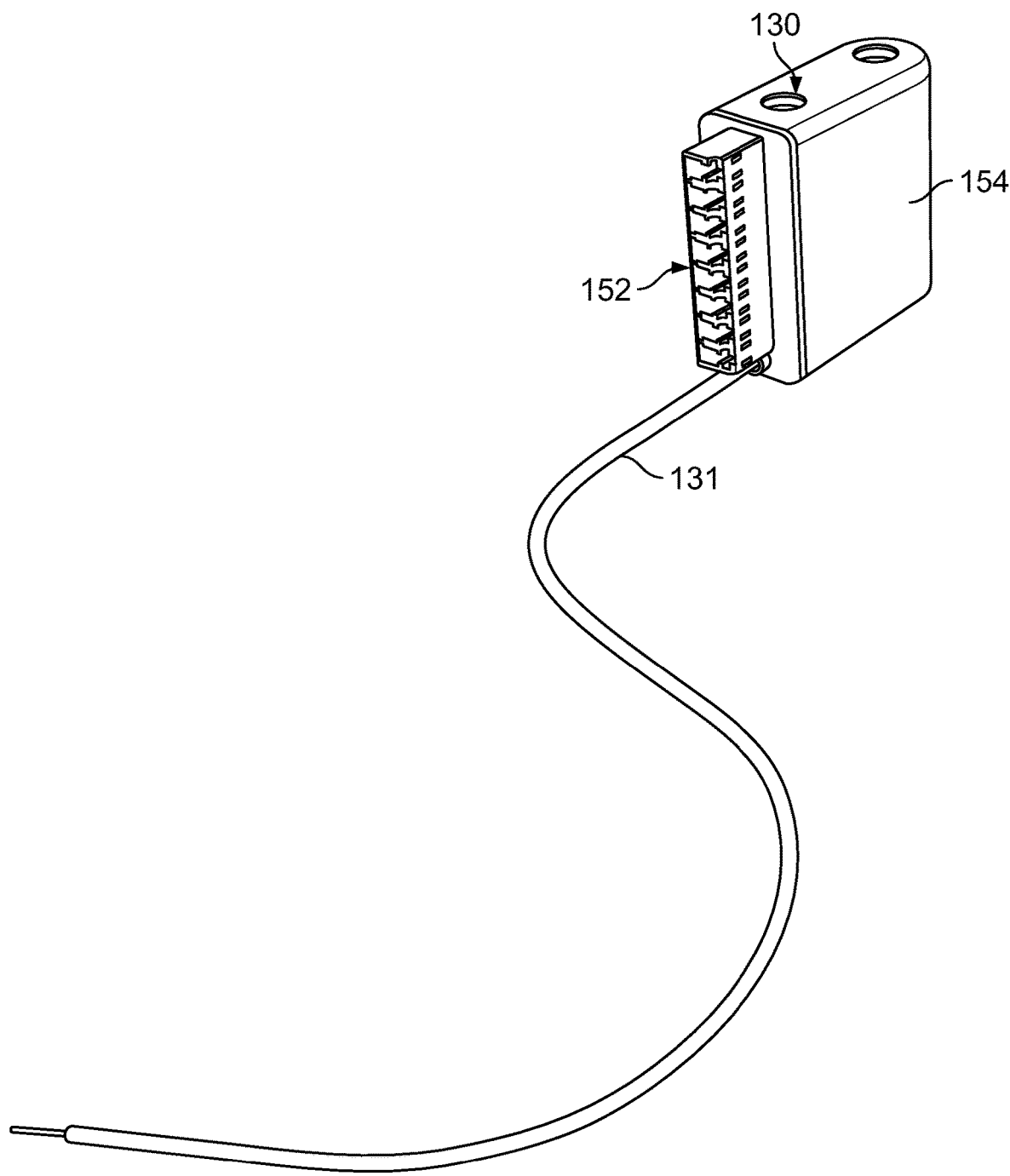
FIG. 37 shows a fan out.

FIGS. 35 and 36 show example splitters 128. Each splitter 128 includes an input 141 that is connectorized to match an adaptor output on a fan out 130. The splitter 128 shown includes a plurality of outputs 144 spaced so as to allow for the easy connecting and removal of cables. In FIG. 35, a 1:4 splitter is shown. However, other sized splitters 128 can also be used with more outputs or less outputs. FIG. 37 shows 2×1:4, 1×1:8, and 1×1:16 splitters. The splitter outputs 144 can be SC or LC connectors, in addition to multi-fiber connectors, such as MPO connectors. The splitters 128 can include port identifiers, a splitter identifier, and an RFID tag, if desired. The splitter inputs 141 are connected to the outputs of the fan out devices 130, which are spliced to the feeder cable 117. The splitter 128 takes the feeder cables 117 and splits them into splitter outputs. The splitter outputs 144 are shown as fiber optic connectors disposed within a housing 146 of each splitter 128. The housing 146 of each splitter 128 can be configured so that they are interconnectable and stackable, with one side including protrusions 148 and the other side including recesses 150.

FIG. 37 shows the fan out 130. The fan out 130 is configured to receive a signal from the input stub 131 of a feeder cable 117 from which it is spliced. The fan out 130 operates to separate the individual optical fibers of a multi-fiber feeder cable 117 in a manner such that the fibers are not damaged so as to maintain a quality transmission link. As shown, the fan out 130 includes a plurality of outputs 152 spaced so as to allow for the easy connecting and removal of cables. However, the fan out 130 can be configured with more or less outputs. The outputs 152 can be SC or LC connectors, in addition to multi-fiber connectors, such as MPO connectors. The fan out 130 can include port identifiers, a splitter identifier, and an RFID tag, if desired. Each fan out 130 has a housing 154 that is similar to the housing of the splitter 128. The housings 154 are configured so that they are interconnectable and stackable.

Figure 38:
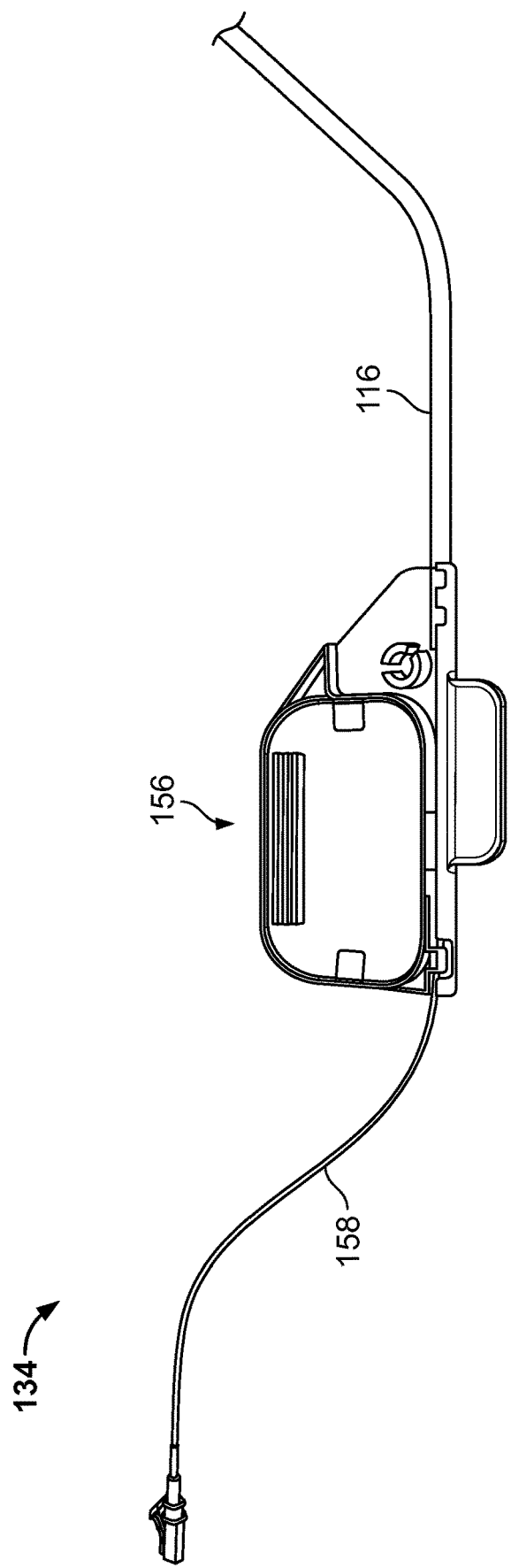
FIG. 38 shows drop splice module.

FIG. 38 shows the drop splice module 134. The drop splice module 134 includes a tray body 156 and an input 158. A distribution cable 116 is spliced at the tray body 156 with the input 158. The tray body 156 is configured to hold the splice and fit within the box 100. The input 158 can be connectorized so as to be connectable with the outputs of a fan out 130 or outputs of a splitter 128. The drop splice module 134 allows for splicing to be completed out of the box 100, giving the installer flexibility. For example, splicing can be completed in an install vehicle, or at the ground level (in the case where the box 100 is going to be mounted high on a pole). The drop splice module 134 is also suited for use with multi-fiber cabling and blown tubes. In some embodiments, the drop splice module 134 includes a gel seal around the distribution cable 116.

Figure 39:
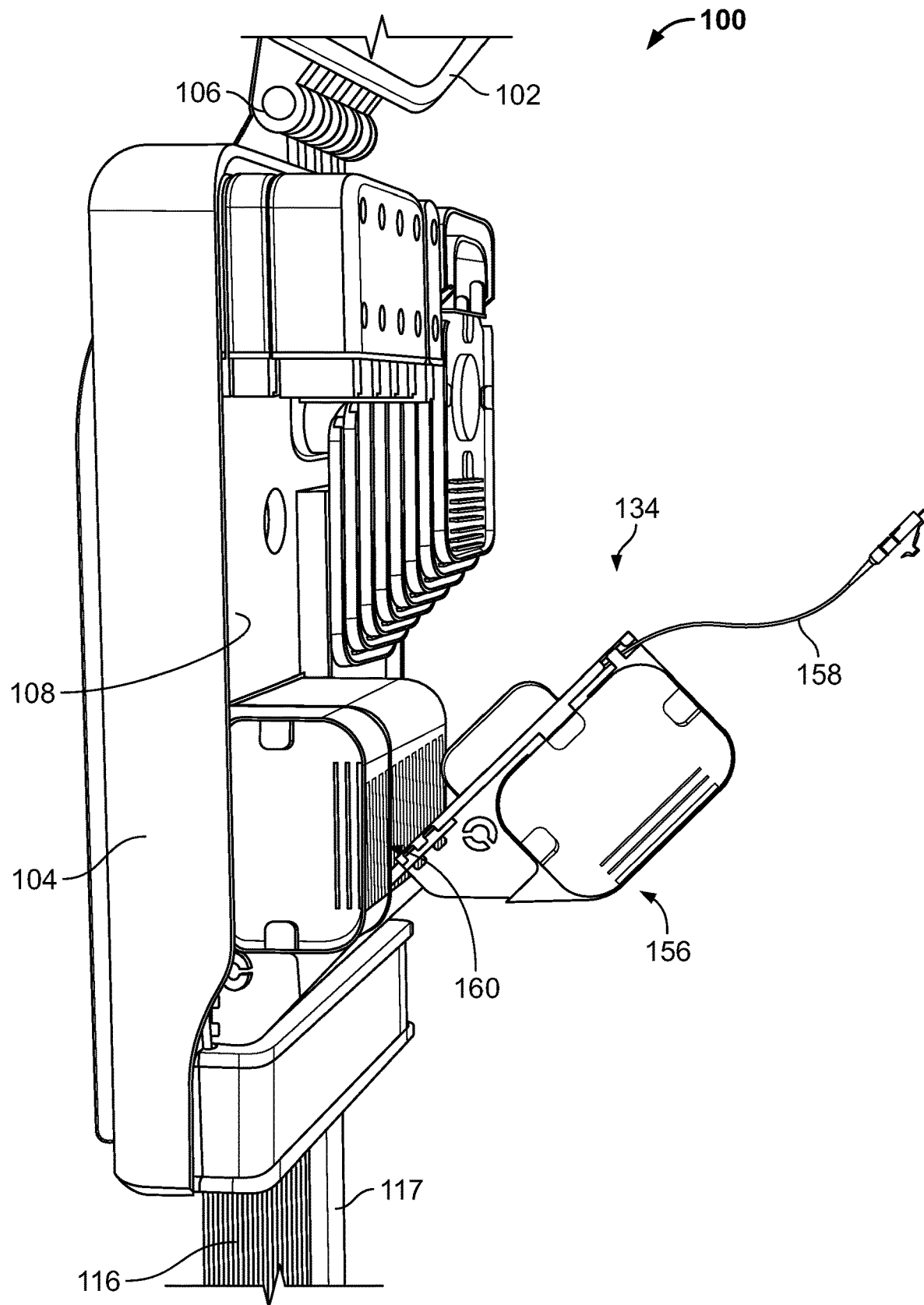
FIG. 39 shows the drop splice module partially removed from the box.

FIG. 39 shows the drop splice module 134 partially removed from the box 100. As shown, the drop splice module 134 is received by a slot 160 in the tray 108. This allows the user to quickly install and remove particular drop splice modules 134. Further, each drop splice module 134 is positioned in a horizontal row so as to allow the installer to freely remove or add drop splice modules 134 without having to move other modules 134. In some embodiments, the drop splice modules 134 can be connected to the tray 108 by a removable hinge. This allows the user to partially pivot the drop splice module 134 away from the tray 108 and box 100 for service.

Figure 40:
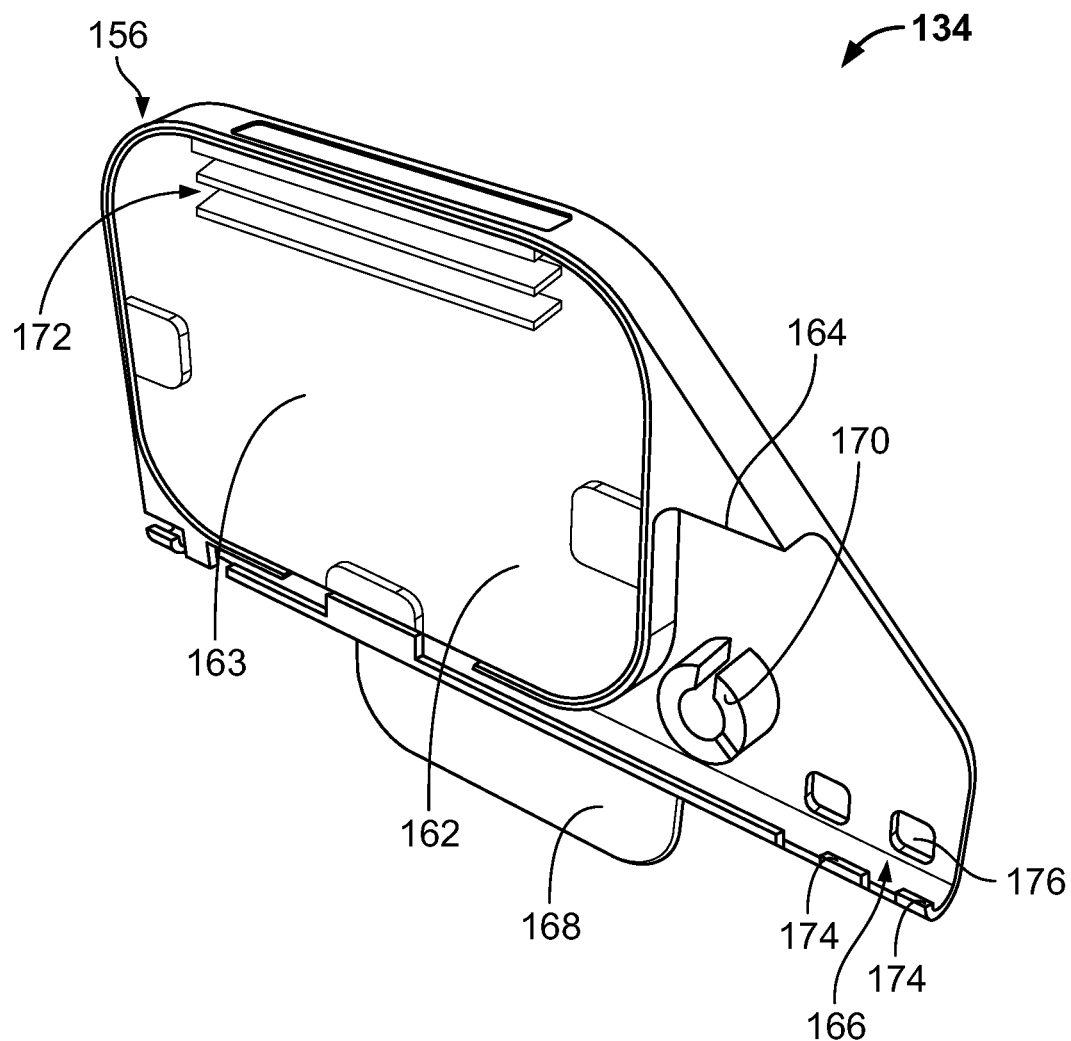
FIGS. 40-41 show a tray body of the drop splice module.
Figure 41:
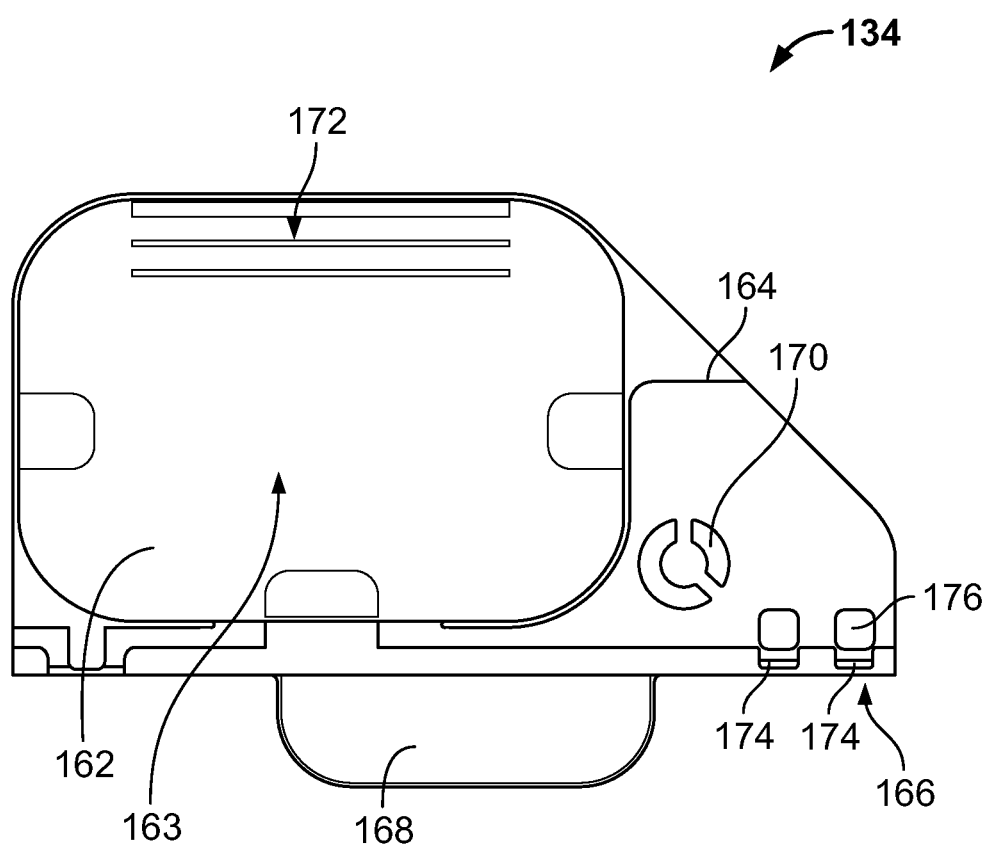

FIGS. 40 and 41 show the tray body 156 of the drop splice module 134. The tray body 156 includes a cover 162, a splice area 163, a finger lifter 164, a cable fixation area 166, a box fixation fin 168, and a yarn fixation 170. The cover 162 can be configured to enclose the splice area 163, and also be translucent so as to allow the user to maintain a visual confirmation of the splice. The splice area 163 can have two splice positions 172 so as to be configured to allow two fibers per distribution cable 116. Further, the splice area 163 provides storage for overlength of two fibers.

The finger lifter 164 allows the user to easily lift the drop splice module 134 from a seated position on the tray 108. In other embodiments, the finger lifter 164 can be a tab or knob.

The cable fixation area 166 allows the distribution cable 116 to be fixedly secured to the drop splice module 134. In the depicted embodiments the cable fixation area 166 includes flexible protrusions 174 that allow the distribution cable 116 to snap in place and be fixedly held by the tray body 156. In some embodiments, the distribution cables 116 can be secured to the tray body 156 by way of an attachment device such as a clamp or zip-tie. In such an embodiment, the attachment device can pass through a hole 176 in the tray body 156, and be fixed around the distribution cable 116 at the cable fixation area 166.

The box fixation fin 168 is integral to the tray body 156. The fin 168 is configured to mate with the tray 108 of the box, specifically in the slot 160. The fin 168 permits the drop splice module 134 to be properly positioned by the installer and also helps to retain the drop splice module 134 within the box 100.

The yarn fixation portion 170 is configured to hold excess aramid yard around a spool. After being wrapped around the spool, the aramid yarn can be secured by use of a screw.

The drop splice module 134 can include port identifiers, a module identifier, and an RFID tag, if desired.

Figure 42:
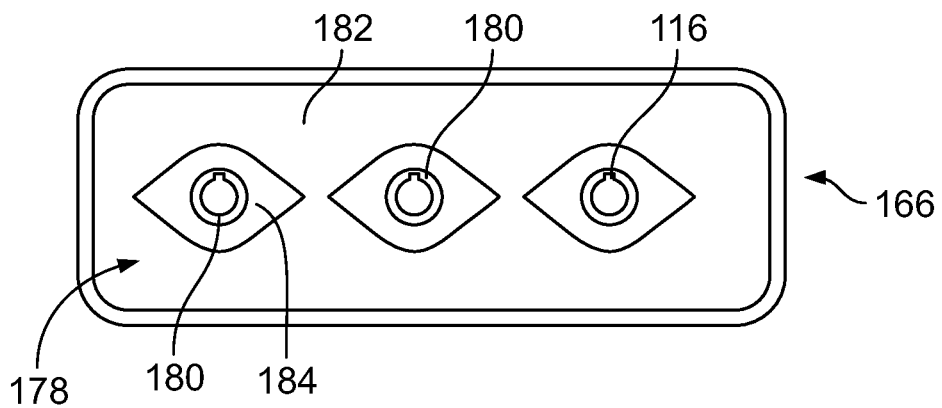
FIGS. 42-43 show the drop splice module including a seal; a three cable seal is shown in FIG. 42 for illustration purposes.
Figure 43:
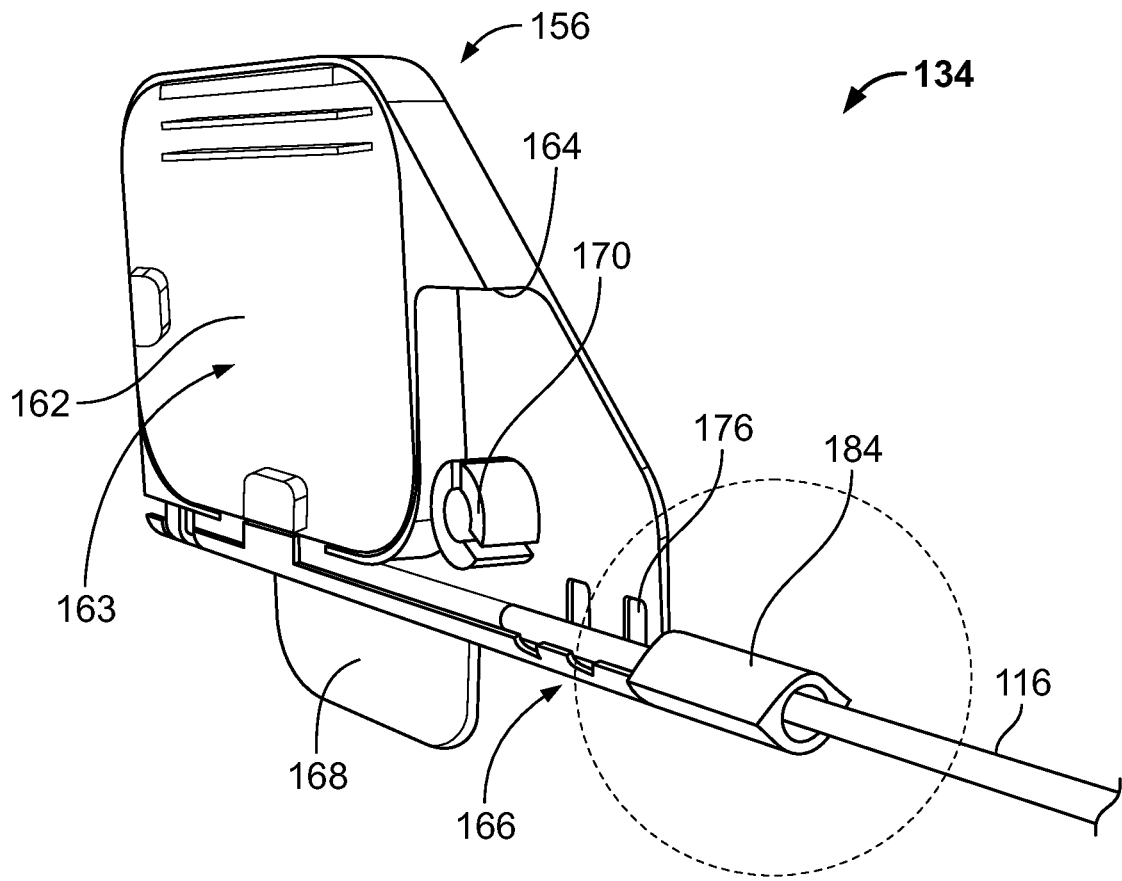

FIGS. 42 and 43 show the drop splice module 134 including a seal 178. The seal can include a tacky soft-gel portion 180 and a non-tacky hard gel portion 182. A three cable seal is shown in FIG. 42 for illustration purposes. As shown, the drop splice module 134 includes a hard plastic portion 184 surrounding the cable 116. Between the hard plastic portion 184 and the distribution cable 116 is the soft-gel portion 180. Surrounding the hard plastic portion 184 of the drop splice module 134 is hard gel portion 182 that is suitable for re-entry of the drop splice module 134, thereby allowing the installer to remove the drop splice module 134 from the hard gel portion 182 multiple times. In some embodiments, the hard gel portion 182 can be the gel seal 110 in the box 100, as described above.

Figure 44:
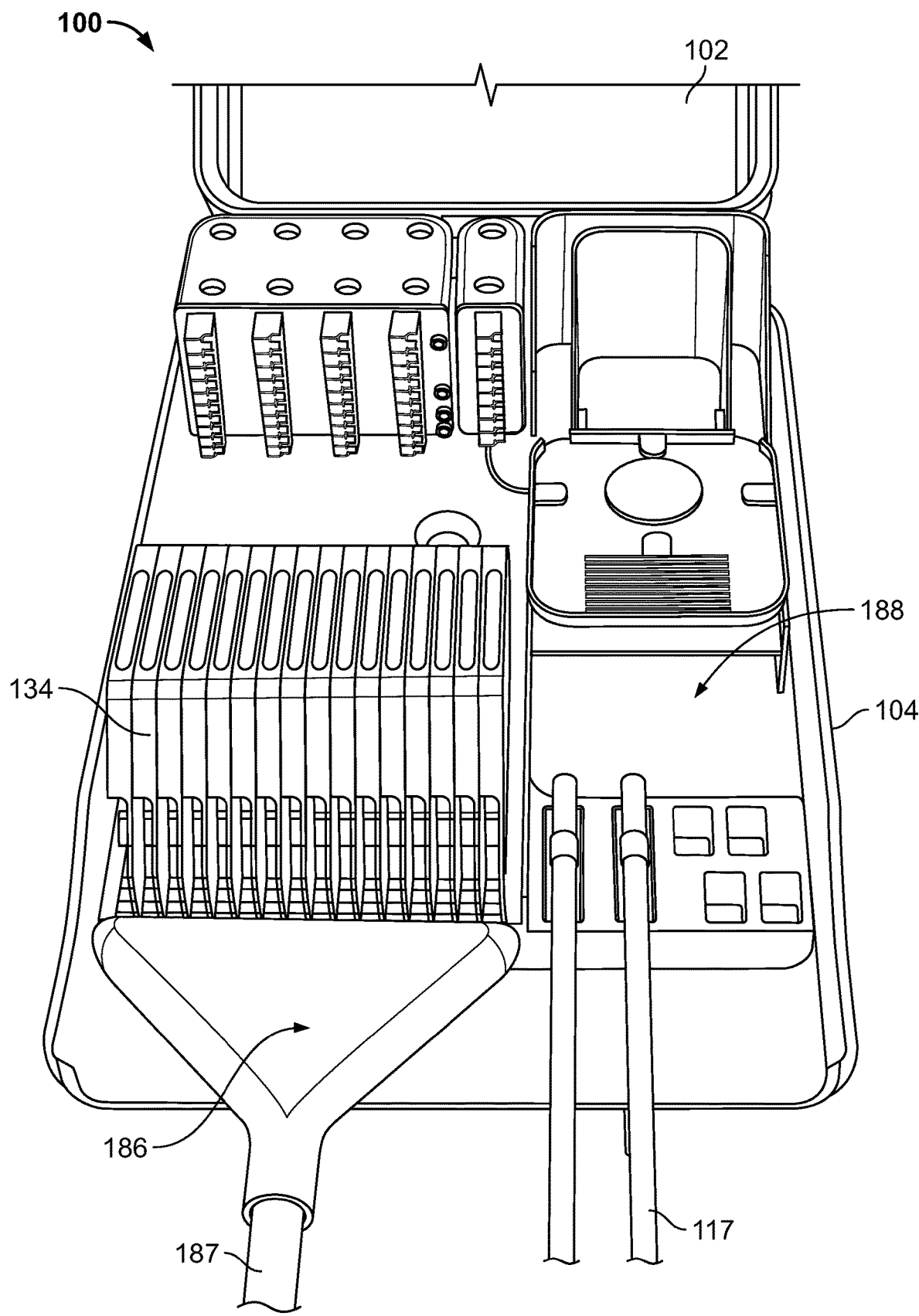
FIG. 44 shows the box including a riser fan out.

FIG. 44 shows the box 100 including a riser fan out 186. The riser fan out 186 can combine the outputs of the drop splice modules into a single cable 187. In some embodiments, a single drop splice module having multiple inputs can be used as an alternative to multiple individual drop spice modules 134. Users can also store un-connected customers as fiber-only in an area 188 in an SC splice cassette.

Figure 45:
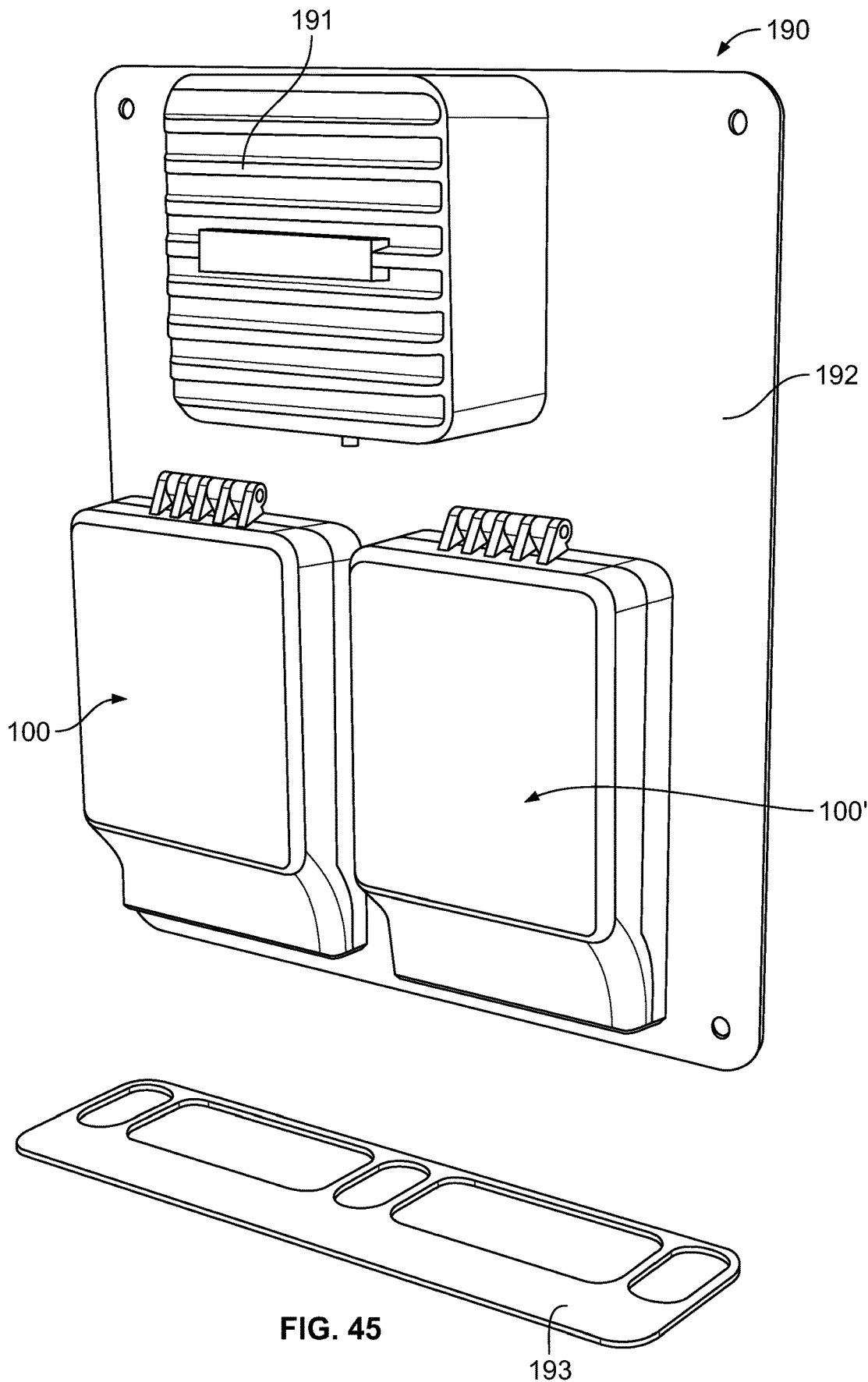
FIGS. 45-46 show the box incorporated into a cabinet solution.
Figure 46:
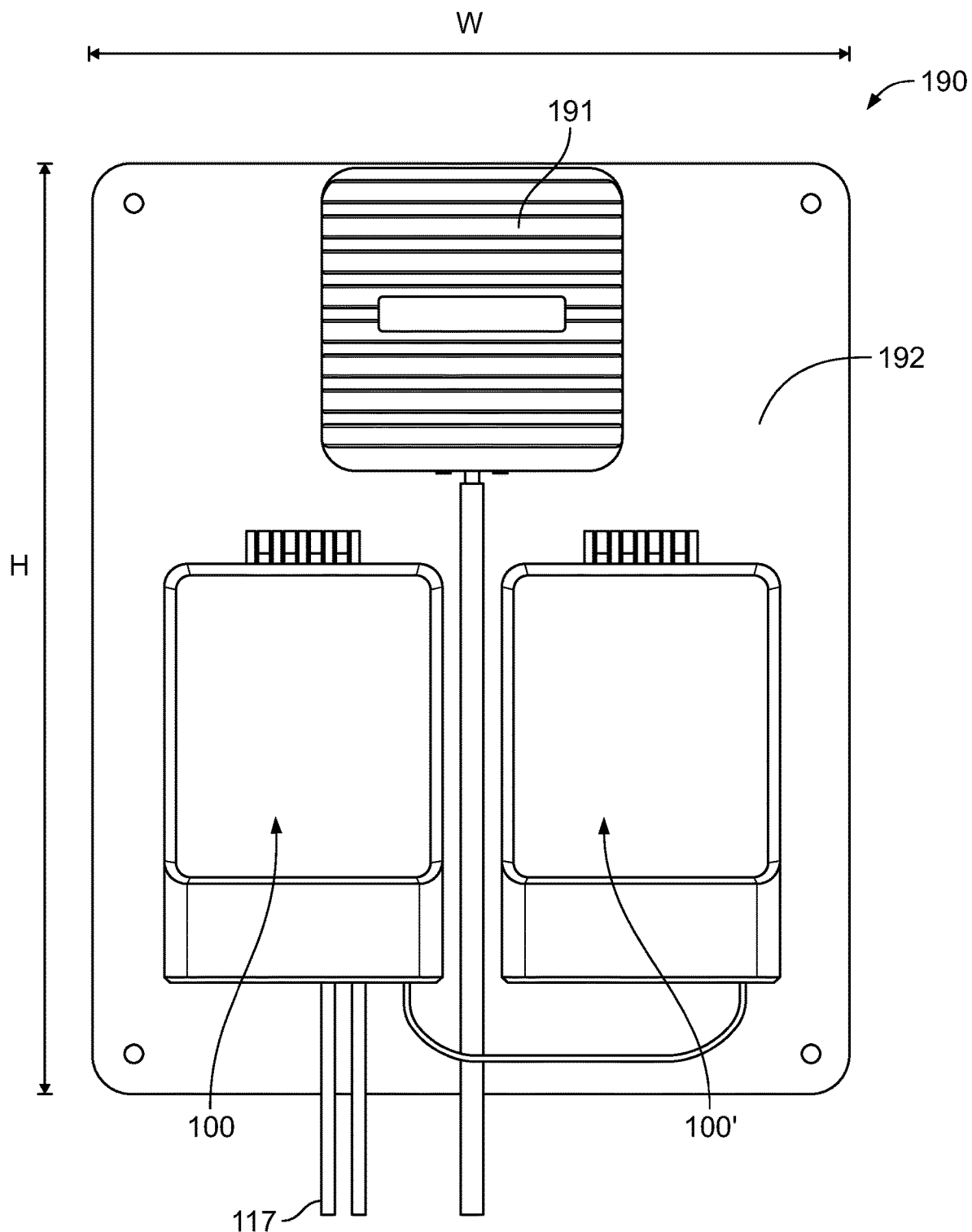
Figure 47:
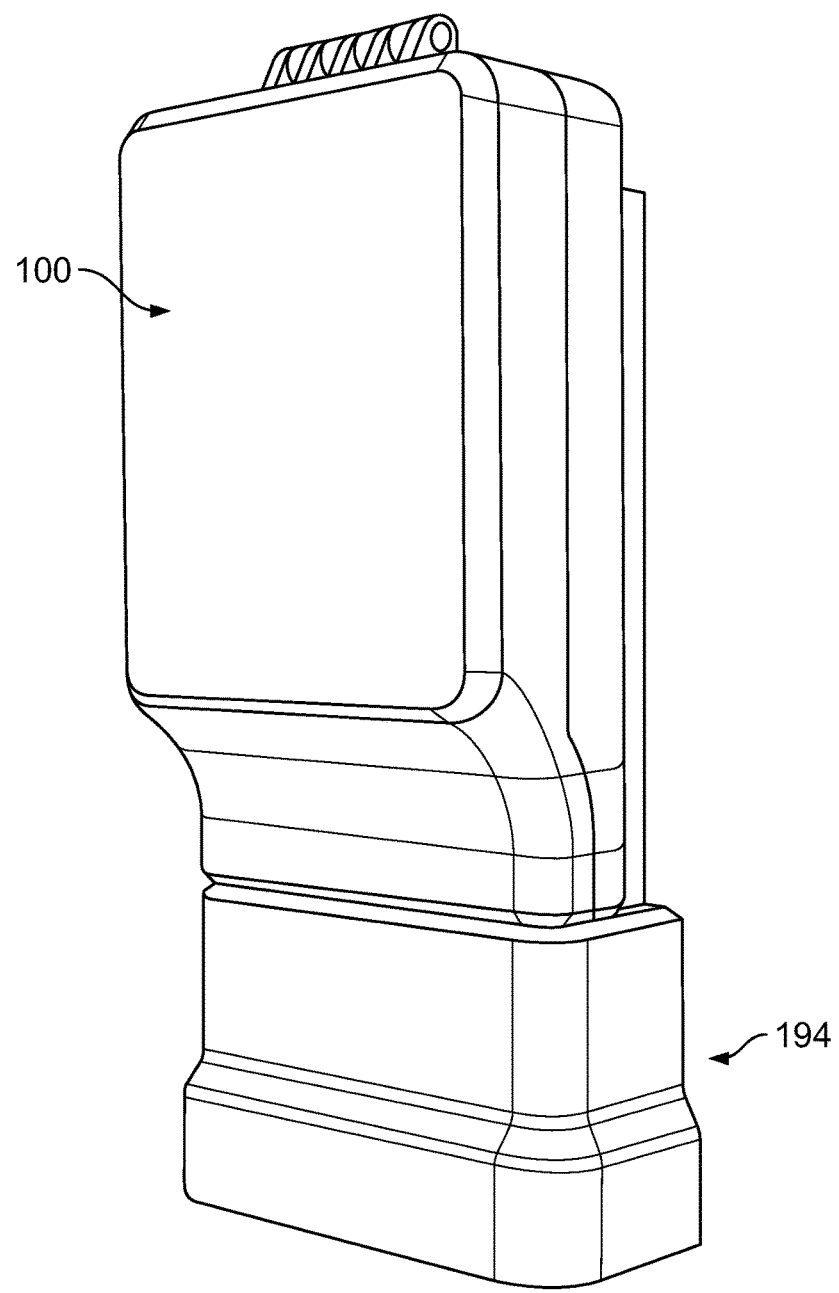

FIGS. 45 and 46 show the box 100 incorporated into a cabinet solution. A cabinet 190 includes multiple boxes 100, 100' and a coax power amplifier 191 mounted to a base 192. The base 192 can have a height H of between about 50 centimeters and about 80 centimeters. The base can also have a width W of about 65 centimeters, and the overall system can have a depth of about 20 centimeters. In the depicted embodiment, the cabinet 190 can service up to thirty-two coax customers and thirty-two fiber customers with up to two fibers per customer. As shown, the boxes 100, 100' can be interlinked with one another, as described above with respect to FIGS. 26-31. The cabinet 190 can also include an entry plate 193 for assuring proper positioning of any input feeder cables and output distribution cables.

The coax amplifier 191 can function to increase the strength of received coax signals to a level that is greater than the signal losses associated with the distribution system. This is to ensure that coax outputs receive proper strength signals.

Figure 49:
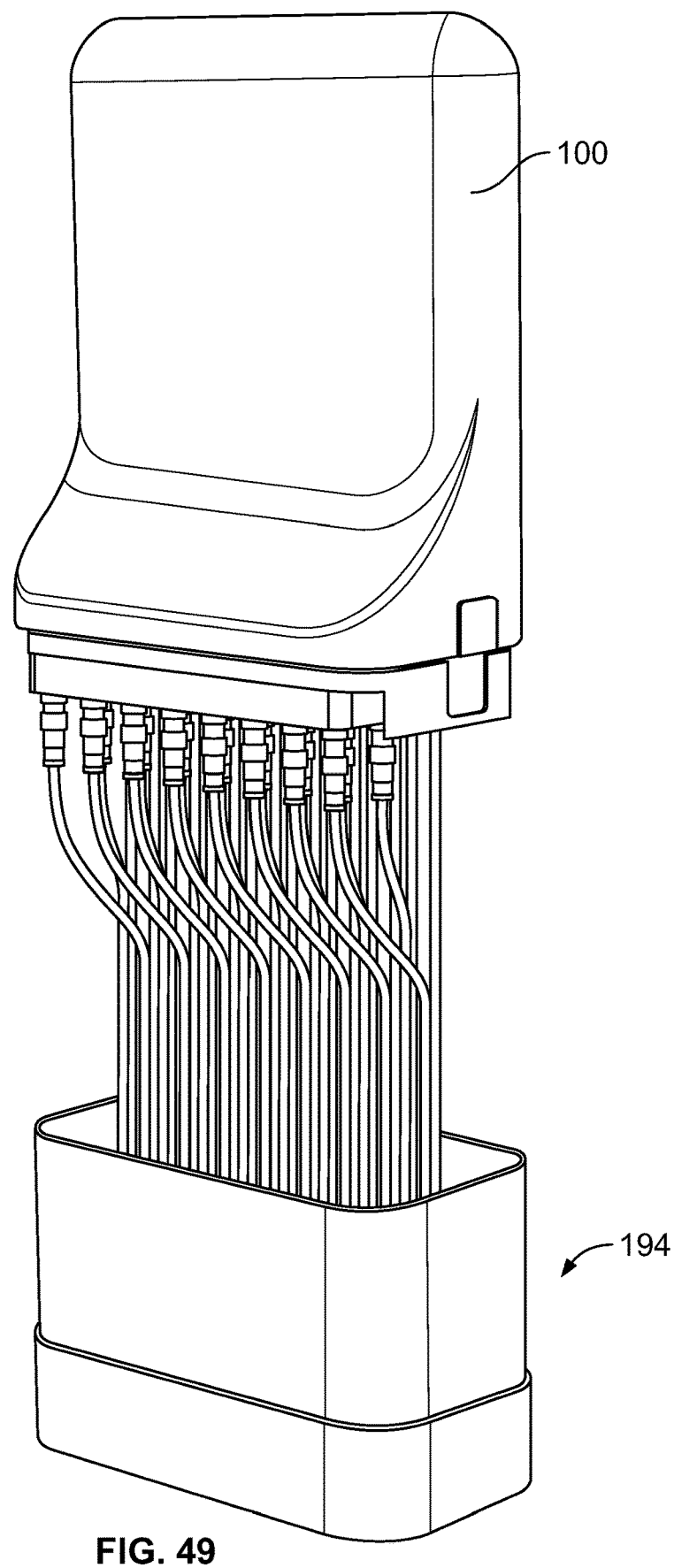
Figure 50:
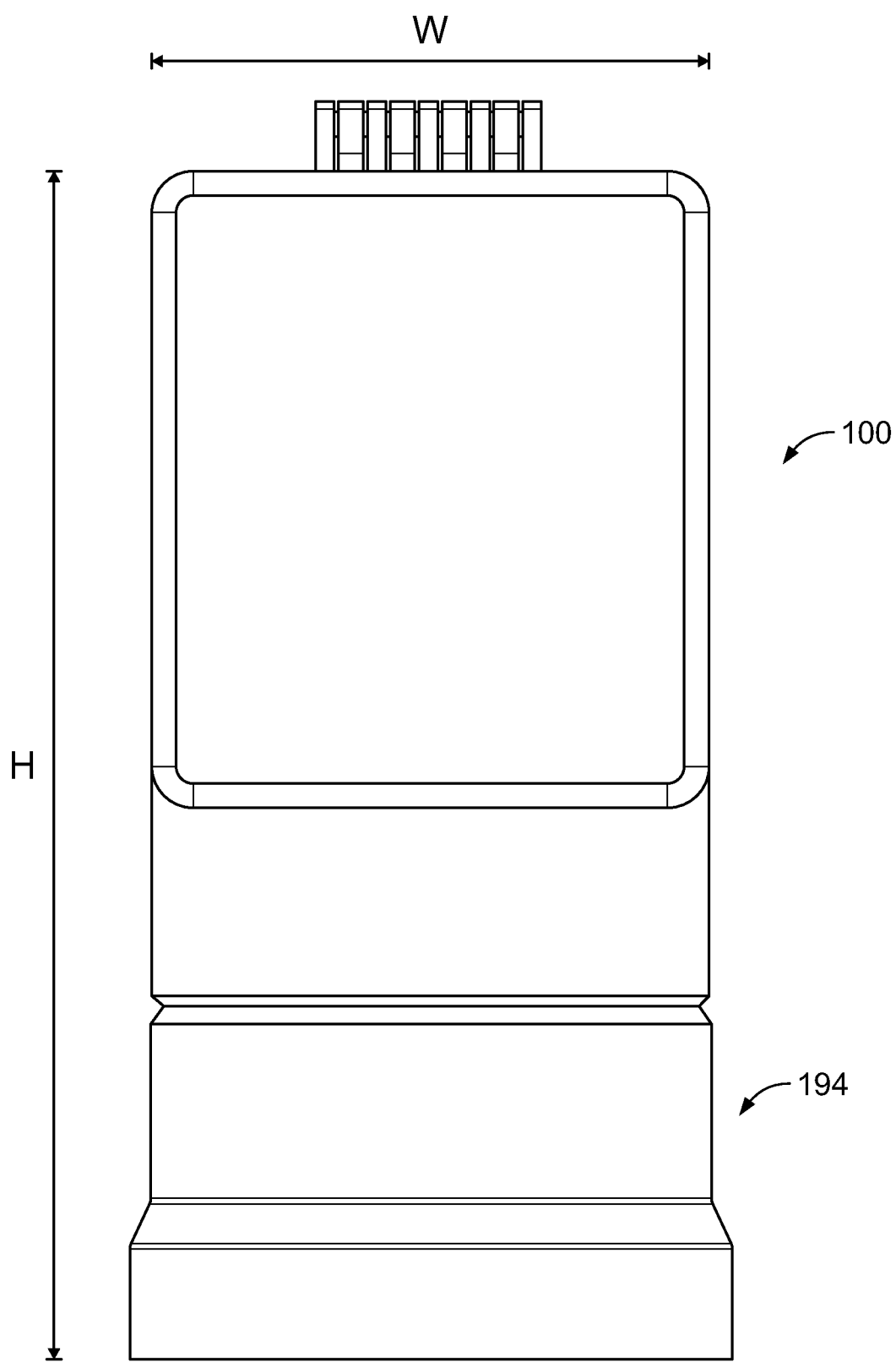

FIGS. 47-50 show the box 100 mounted on a pedestal 194. The pedestal 194 includes a frame 195 that is configured to accept the box 100. Such an embodiment is especially suited for an application where the box 100 is installed into a system that is purely fiber optic transmission from day one. As shown in FIG. 49, any cable slack can be stored under the pedestal 194. Once installed on the pedestal 194, the box 100 and pedestal 194 can have a height H of about 50 centimeters, a width W of about 24 centimeters, and a depth of about 13 centimeters.

FIG. 51 shows a box 200 according to one embodiment of the present disclosure. As shown, the box 200 receives feeder cables 117 at sides of the box 200, instead of at the bottom of the box, as shown and described above.

As noted, various implementations of the systems are provided for adding capacity over time. One implementation is to add the splitters or fan out devices as needed over time. Another implementation for adding capacity uses two or more boxes. Another implementation for increasing capacity includes adding a second (or more) distribution box at a remote location.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

PARTS LIST

100 First box
100' Secondary box
102 Cover
104 Base
106 Hinge
108 Tray
109 Central screw
110 Gel seal
112 Entry
114 Coax splitter
116 Distribution cable
116' Distribution cable
117 Feeder cable
119 Clip
120 Mounting flange
121 Mounting feature
122 Input
124 Jumper output
126 Split output
128 Splitter
130 Fan out device
130' Fan out device
131 Input
131' Ruggedized stub input
132 Splice tray
134 Drop splice module
136 Auxiliary port
138 Left hand vertical column
140 Backside of tray
141 Splitter input
144 Splitter output
146 Splitter housing
148 Protrusion
150 Recess
152 Output
154 Fan out housing
156 Tray body
158 Input
160 Slot
162 Cover
163 Splice area
164 Finger lifter
166 Cable fixation area
168 Box fixation fin
170 Yarn fixation
172 Splice position
174 Flexible protrusion
176 Hole
178 Seal
180 Soft gel portion
182 Hard gel portion
184 Hard plastic portion
186 Riser fan out
187 Single cable
188 Fiber-only area
190 Cabinet
191 Coax amplifier
192 Base
193 Entry plate
194 Pedestal
195 Frame
200 Box

What is claimed is:

1. A telecommunications system comprising:
a first enclosure defining a first enclosed interior housing at least one splice tray spliced to a feeder cable; and
a second enclosure, separate from the first enclosure, defining a second enclosed interior housing at least one fan out device,
wherein the at least one splice tray of the first enclosure has an output connected to the at least one fan out device of the second enclosure.

2. The telecommunications system of claim 1, wherein the first enclosure includes a plurality of splice trays spliced to the feeder cable, wherein the system further includes a third enclosure, separate from the first and second enclosures, defining a third enclosed interior housing at least one fan out device, wherein the at least one fan out device of the third enclosure is connected to an output of at least one of the plurality of splice trays of the first enclosure.

3. The telecommunications system of claim 1, wherein the first and second enclosures each have a substantially identical construction, the enclosures including an internal tray including:
a first storage location for receiving a plurality of splice trays;
a second storage location for receiving a plurality of fan out modules and/or a plurality of splitter modules; and
a third storage location for receiving a plurality of drop splice modules.

4. A telecommunications enclosure comprising:
an outer shell having a first half and a second half;
a tray positioned within at least one of the first and second halves of the outer shell, the tray including:
  at least one splice tray, the splice tray being connected to a feeder cable;
  at least one fan out module connected to the at least one splice tray; and
  at least one drop splice module, the at least one drop splice module being connected to a distribution cable and being connectable to an output of the at least one fan out module to provide a point-to-point connection.

5. The telecommunication enclosure of claim 4, wherein the drop splice module includes an input pig-tail attached to a main body, a splice area disposed on the main body, and a cable fixation area configured for connection to a distribution cable.

6. A telecommunication drop splice cassette comprising:
a main body configured for removable installation into an enclosure assembly, the main body defining a single lengthwise fixation fin for insertion into a slot of an enclosure assembly;
an input pig-tail attached to the main body;
a splice area disposed on the main body; and
a cable fixation area configured for connection to a distribution cable.

7. The telecommunication drop splice cassette of claim 6, further including a cover configured to enclose the splice area.

8. The telecommunication drop splice cassette of claim 7, wherein the cover is translucent.

9. The telecommunication drop splice cassette of claim 6, wherein the splice area has a plurality of splice positions so as to be configured to allow at least two fibers per distribution cable.

10. The telecommunication drop splice cassette of claim 6, wherein the splice area provides storage for overlength fibers.

11. The telecommunication drop splice cassette of claim 6, further comprising a yarn fixation portion configured to hold excess aramid yard around a spool.

* * * * *